(12) United States Patent
Tsunoda et al.

(10) Patent No.: US 7,707,283 B2
(45) Date of Patent: Apr. 27, 2010

(54) INFORMATION PROCESSING APPARATUS, INFORMATION PROCESSING METHOD, PROGRAM, AND RECORDING MEDIUM

(75) Inventors: Tomohiro Tsunoda, Tokyo (JP); Masaaki Hoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 1024 days.

(21) Appl. No.: 10/914,436

(22) Filed: Aug. 9, 2004

(65) Prior Publication Data

US 2005/0144295 A1 Jun. 30, 2005

(30) Foreign Application Priority Data

Aug. 7, 2003 (JP) .............................. P2003-289468

(51) Int. Cl.
*G06F 15/173* (2006.01)
(52) U.S. Cl. ..................... 709/224; 709/223; 725/9; 725/10
(58) Field of Classification Search ............... 709/223, 709/224; 715/716, 738, 745, 747; 700/87, 700/135, 145; 725/9, 10, 11; 707/102
See application file for complete search history.

(56) References Cited

U.S. PATENT DOCUMENTS

| | | | | |
|---|---|---|---|---|
| 5,758,259 | A * | 5/1998 | Lawler | 725/45 |
| 6,463,428 | B1 * | 10/2002 | Lee et al. | 707/3 |
| 6,934,964 | B1 * | 8/2005 | Schaffer et al. | 725/46 |
| 7,075,994 | B2 * | 7/2006 | Ihara | 375/240.28 |
| 7,146,627 | B1 * | 12/2006 | Ismail et al. | 725/47 |
| 2002/0077907 | A1 * | 6/2002 | Ukai et al. | 705/14 |
| 2003/0154482 | A1 * | 8/2003 | Tsukamoto et al. | 725/53 |
| 2004/0083490 | A1 * | 4/2004 | Hane | 725/46 |
| 2007/0033531 | A1 * | 2/2007 | Marsh | 715/738 |
| 2008/0147650 | A1 * | 6/2008 | Marsh | 707/5 |
| 2008/0209325 | A1 * | 8/2008 | Suito et al. | 715/719 |

FOREIGN PATENT DOCUMENTS

JP 2000-013708 1/2001

(Continued)

OTHER PUBLICATIONS

Ardissono et al., "Architecture of a system for the generation of personalized Electronic Program Guides," Proceedings of the UM2001 Workshop on Personalization in Future TV, 2001, XP-002379147, [online].

(Continued)

*Primary Examiner*—William C Vaughn, Jr.
*Assistant Examiner*—Mohamed Ibrahim
(74) *Attorney, Agent, or Firm*—K&L Gates LLP

(57) ABSTRACT

An information processing apparatus is provided which includes: a first managing part for managing first data about preferences of a user; a second managing part for managing second data about information; a retrieving part for retrieving the second data about the information used by the user; and an updating part for updating the first data by use of the second data retrieved by the retrieving part. If the second data are found to exist within the first data, then the updating part updates the first data using the second data; if the second data are not found to exist within the first data, then the updating part adds the second data to the first data.

18 Claims, 50 Drawing Sheets

FOREIGN PATENT DOCUMENTS

| | | |
|---|---|---|
| JP | 2001-057543 | 2/2001 |
| JP | 2002-142160 | 5/2002 |
| JP | 2002-215669 | 8/2002 |
| WO | 01/24047 | 4/2001 |

OTHER PUBLICATIONS

Cotter et al., "PTV: Intelligent Personalized TV Guides," Proceedings of the National Conference on Artificial Intelligence and the Innovative Applications of Artificial Intelligence Conference, pp. 957-964, 2000, XP008020497, [online].

XP-002379715, Index of /~kobsa/courses/ICS206/notes, available since Dec. 6, 2003.

Sullivan et al., "Improving the Quality of the Personalized Electronic Program Guide," Kluwer Academic Publishers, pp. 1-33, 2003, XP-002289741, [online].

Yagawa et al., "TV Program Planning Agent using Analysis Method of User's Taste," The Institute of Electronics, Information and Communication Engineers, Technical Report of IEICE. A198-55 (Dec. 1998).

* cited by examiner

FIG. 2

RECOMMENDATIONS

PROGRAM A-1

COMMENT: ----------------------------------------

----------------------------------------

----------------------------------------

PROGRAM D-5

COMMENT: ----------------------------------------

----------------------------------------

----------------------------------------

11

F I G. 3
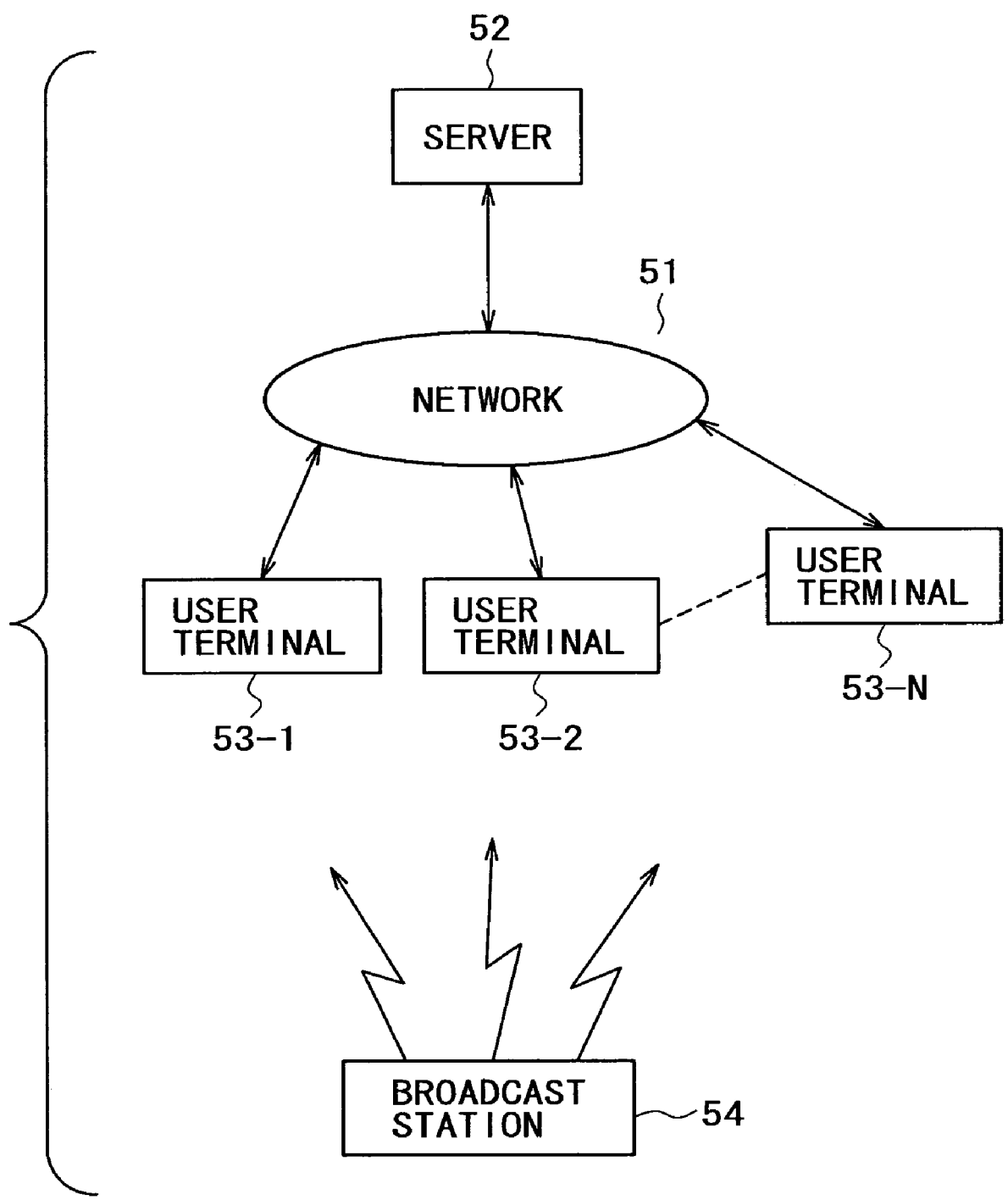

FIG. 8

| | |
|---|---|
| PROGRAM A-1 | ~151 |
| 16:00-17:00, 06/01/2003, BROADCAST STATION A | ~152 |
| TODAY'S EVENTS, TOMORROW'S SCHEDULE | ~153 |
| [CAST] PERSON A, PERSON B | ~154 |
| FREQUENTLY WATCHED PERFORMERS: "PERSON A," "PERSON C," "PERSON D"<br>REGISTERED GENRE: "VARIETY SHOWS, GENERAL,"<br>FREQUENTLY USED KEYWORDS: "KEYWORD A," "KEYWORD B"<br>INTERESTS OF THE USERS WHO HAVE RECORDED THE SAME PROGRAM: "PERSON X" | ~155 |
| [RECOMMENDATION LEVEL] 63 POINTS | ~156 |

101

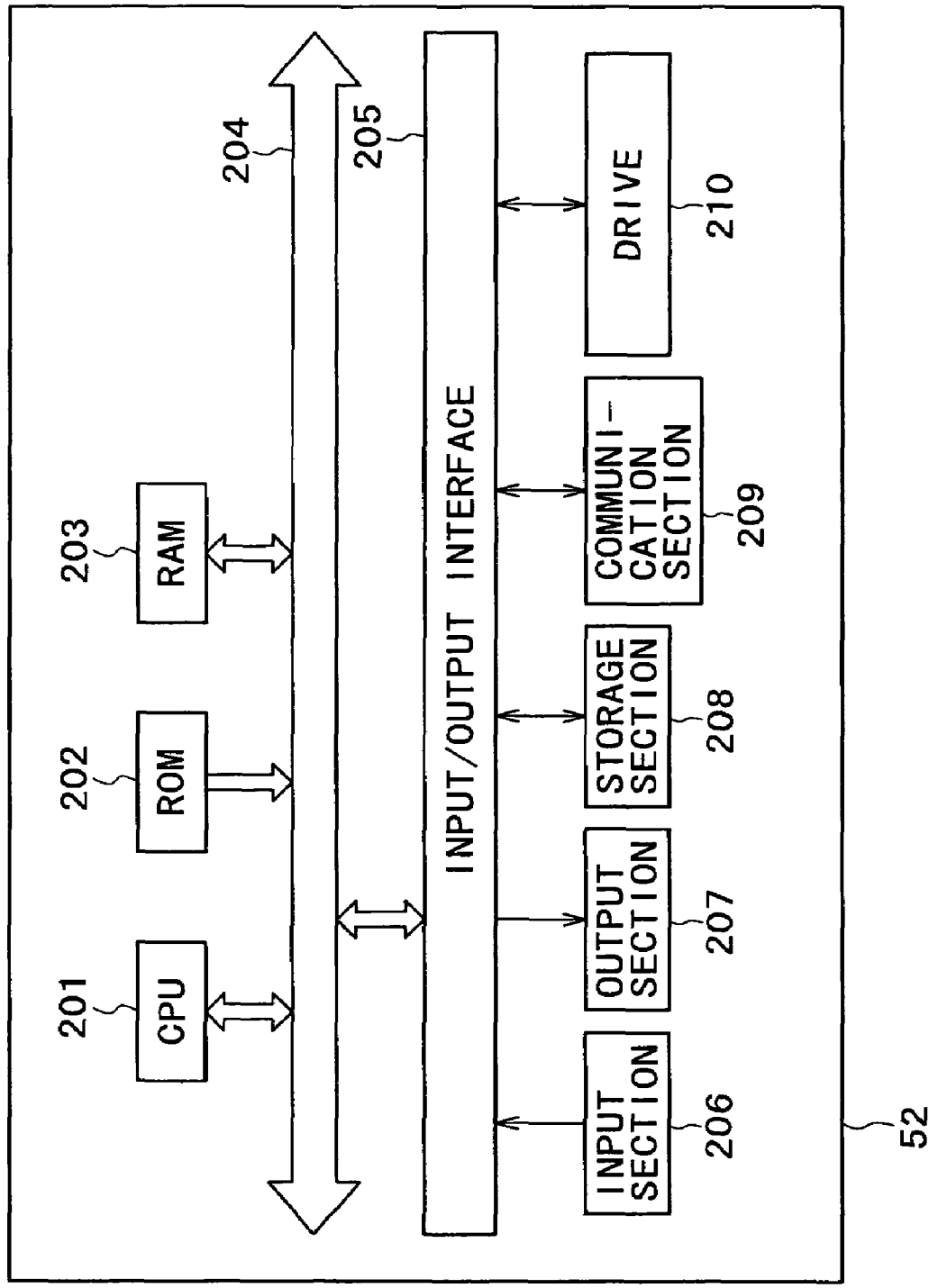

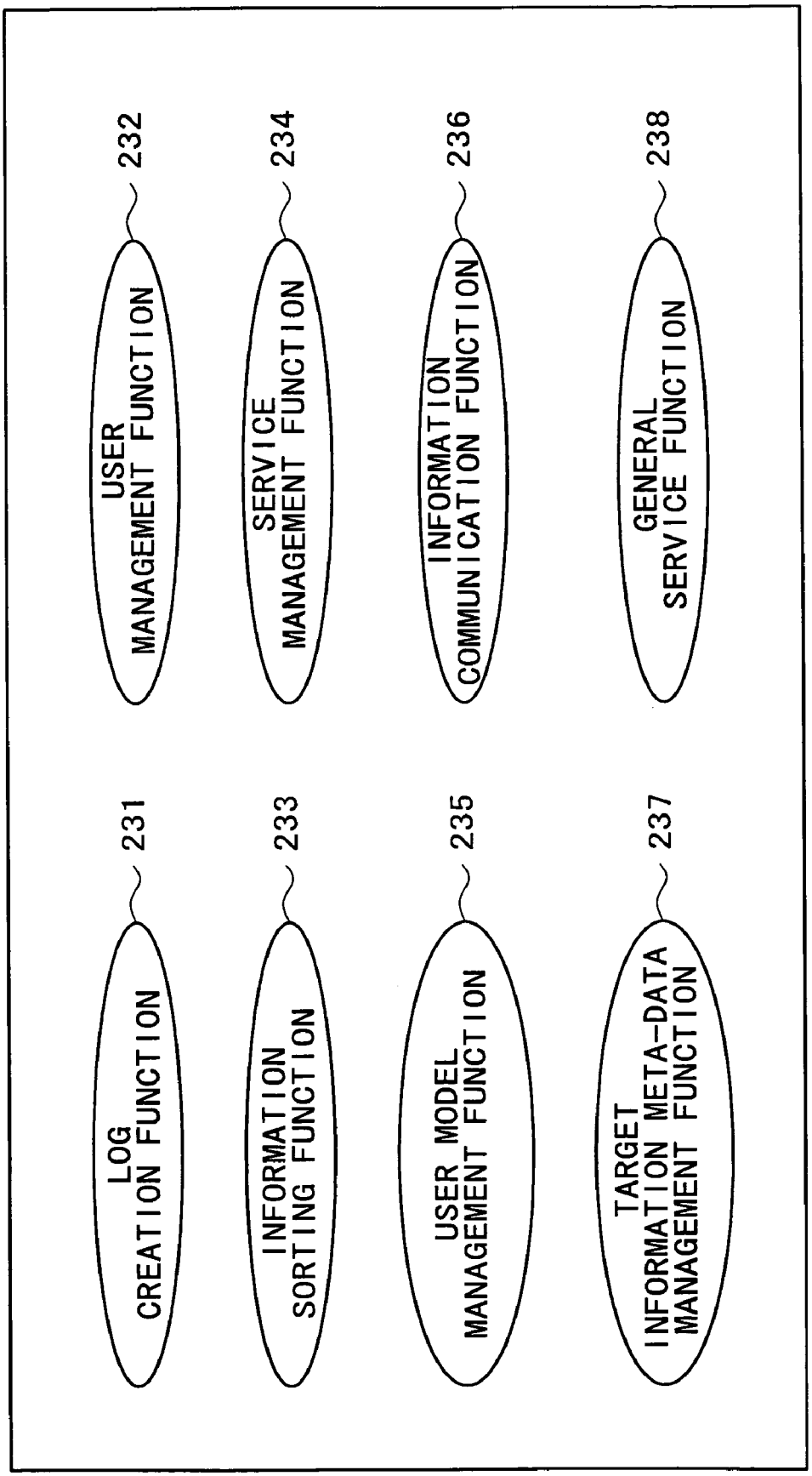

FIG. 12

| M_CATEGORY | 001 |
|---|---|
| CATEGORY ID | CATEGORY |
| 1000 | SPORTS |
| 1001 | SPORT: BASEBALL |
| 1002 | SPORT: SOCCER |
| 1003 | SPORT: GOLF |

| M_PERSON | | 002 |
|---|---|---|
| PERSON ID | NAME | KANA NAME |
| 0000000001 | PERSON A | JINBUTSU-EE |
| 0000000002 | PERSON B | JINBUTSU-BII |
| 0000000003 | PERSON C | JINBUTSU-SHII |
| 0000000004 | PERSON D | JINBUTSU-DEE |
| 0000000005 | PERSON E | JINBUTSU-II |
| 0000000006 | PERSON F | JINBUTSU-EFU |
| 0000000007 | PERSON G | JINBUTSU-JII |
| 0000000008 | PERSON H | JINBUTSU-EICHI |

| M_PERSON_CHARACTER | 003 |
|---|---|
| CHARACTER ID | CHARACTER |
| 001 | PRESENTER-LIKE |
| 002 | ROMANTIC |
| 003 | INTELLIGENT |
| 004 | FRIENDLY |
| 005 | PASSIONATE |
| 006 | COOL |

| M_VIEW_TYPE | | 004 |
|---|---|---|
| VIEW ID | VIEW TYPE | |
| 001 | LAUGHTER-SEEKING TYPE | |
| 002 | TREND-CHASING TYPE | |
| 003 | ROMANCE/FICTION TYPE | |
| 004 | LAZY ZAPPING TYPE | |

| M_KEYWORD | | 005 |
|---|---|---|
| KEYWORD ID | KEYWORD | |
| 0000000001 | INFORMATION | |
| 0000000002 | PURCHASES | |
| 0000000003 | TV | |
| 0000000004 | NEWS | |
| 0000000005 | SHOPPING | |
| 0000000006 | EROTIC | |
| 0000000007 | SPORTS | |
| 0000000008 | ADVANTAGEOUS | |
| 0000000009 | SUPERMARKETS | |
| 0000000010 | TRIPS | |

| M_KEYWORD_1 | | 005 |
|---|---|---|
| KEYWORD ID | KEYWORD | REASON |
| 0000000001 | INFORMATION | INFORMATION |
| 0000000002 | PURCHASES | PURCHASES |
| 0000000003 | TV | TV |
| 0000000004 | NEWS | NEWS |
| 0000000005 | SHOPPING | SHOPPING |
| 0000000006 | EROTIC | |
| 0000000007 | SPORTS | SPORTS |
| 0000000008 | ADVANTAGEOUS | ADVANTAGEOUS INFORMATION |
| 0000000009 | SUPERMARKETS | SUPERMARKETS |
| 0000000010 | TRIPS | TRIPS |

| M_KEYWORD_2 | | 005 |
|---|---|---|
| KEYWORD ID | KEYWORD | DISPLAY |
| 0000000001 | INFORMATION | 1 |
| 0000000002 | PURCHASES | 1 |
| 0000000003 | TV | 1 |
| 0000000004 | NEWS | 1 |
| 0000000005 | SHOPPING | 1 |
| 0000000006 | EROTIC | 0 |
| 0000000007 | SPORTS | 1 |
| 0000000008 | ADVANTAGEOUS | 0 |
| 0000000009 | SUPERMARKETS | 1 |
| 0000000010 | TRIPS | 1 |

| M_AGE | | | 006 |
|---|---|---|---|
| AGE ID | AGENAME | STARTAGE | ENDAGE |
| 001 | FROM 0 TO 4 | 0 | 4 |
| 002 | FROM 5 TO 9 | 5 | 9 |
| 003 | FROM 10 TO 14 | 10 | 14 |
| 004 | FROM 15 TO 19 | 15 | 19 |
| 005 | FROM 20 TO 24 | 20 | 24 |
| 006 | FROM 25 TO 29 | 25 | 29 |
| 007 | FROM 30 TO 34 | 30 | 34 |
| 008 | FROM 35 TO 39 | 35 | 39 |
| 009 | FROM 40 TO 44 | 40 | 44 |
| 010 | FROM 45 TO 49 | 45 | 49 |
| 011 | FROM 50 TO 54 | 50 | 54 |
| 012 | FROM 55 TO 59 | 55 | 59 |
| 013 | FROM 60 ON | 60 | 100 |

| M_GENDER | | 007 |
|---|---|---|
| GENDER ID | GENDER TYPE | |
| 001 | MALE | |
| 002 | FEMALE | |
| 003 | MALE AND FEMALE | |

| M_REASON | | |
|---|---|---|
| ATTRIBUTEID | VALUEID | REASON |
| 001 | 1000 | SPORTS |
| 001 | 1001 | SPORT: BASEBALL |
| 001 | 1002 | SPORT: SOCCER |
| 001 | 1003 | SPORT: GOLF |
| 002 | 0000000001 | PERSON A |
| 002 | 0000000002 | PERSON B |
| 002 | 0000000003 | PERSON C |
| 002 | 0000000004 | PERSON D |
| 002 | 0000000005 | PERSON E |
| 002 | 0000000006 | PERSON F |
| 002 | 0000000007 | PERSON G |
| 002 | 0000000008 | PERSON H |
| 003 | 001 | PRESENTER-LIKE |
| 003 | 002 | ROMANTIC |
| 003 | 003 | INTELLIGENT |
| 003 | 004 | FRIENDLY |
| 003 | 005 | PASSIONATE |
| 003 | 006 | COOL |
| 004 | 001 | LAUGHTER-SEEKING TYPE |
| 004 | 002 | TREND-CHASING TYPE |
| 004 | 003 | ROMANCE/FICTION TYPE |
| 004 | 004 | LAZY ZAPPING TYPE |
| 006 | 0000000001 | INFORMATION |
| 006 | 0000000002 | PURCHASES |
| 006 | 0000000003 | TV |
| 006 | 0000000004 | NEWS |
| 006 | 0000000005 | SHOPPING |
| 006 | 0000000007 | SPORTS |
| 006 | 0000000008 | ADVANTAGEOUS INFORMATION |
| 006 | 0000000009 | SUPERMARKETS |
| 006 | 0000000010 | TRIPS |

280

F I G. 2 4

| T_PERSON_TARGET_GENDER ||| 
|---|---|---|
| PERSON ID | GENDER ID | SCORE |
| 0000000001 | 001 | .3333333333333331483 |
| 0000000001 | 003 | .6666666666666662966 |
| 0000000002 | 001 | .3333333333333331483 |
| 0000000002 | 002 | .6666666666666662966 |
| 0000000003 | 002 | .3333333333333331483 |
| 0000000004 | 003 | .3333333333333331483 |
| 0000000005 | 001 | .3333333333333331483 |
| 0000000006 | 003 | .3333333333333331483 |
| 0000000007 | 001 | .3333333333333331483 |
| 0000000008 | 003 | .6666666666666662966 |

| T_PERSON_TARGET_AGE |||
|---|---|---|
| PERSON ID | AGE ID | SCORE |
| 0000000001 | 005 | .6666666666666662966 |
| 0000000002 | 006 | .6666666666666662966 |
| 0000000002 | 007 | .6666666666666662966 |
| 0000000002 | 013 | .6666666666666662966 |
| 0000000003 | 007 | .3333333333333331483 |
| 0000000003 | 008 | .3333333333333331483 |
| 0000000004 | 002 | .3333333333333331483 |
| 0000000004 | 003 | .3333333333333331483 |
| 0000000004 | 004 | .3333333333333331483 |
| 0000000005 | 011 | .6666666666666662966 |
| 0000000005 | 012 | .6666666666666662966 |
| 0000000005 | 013 | .6666666666666662966 |
| 0000000005 | 007 | .3333333333333331483 |
| 0000000006 | 008 | .3333333333333331483 |
| 0000000006 | 009 | .3333333333333331483 |
| 0000000006 | 010 | .3333333333333331483 |
| 0000000006 | 011 | .3333333333333331483 |
| 0000000006 | 012 | .3333333333333331483 |
| 0000000007 | 013 | .3333333333333331483 |
| 0000000008 | 006 | .3333333333333331483 |

| T_PERSON_VIEW_TYPE ||| 
|---|---|---|
| PERSON ID | VIEW ID | SCORE |
| 0000000001 | 003 | 1.6666666666666674068 |
| 0000000002 | 006 | .3333333333333331483 |
| 0000000003 | 006 | .6666666666666662966 |
| 0000000004 | 001 | 1.3333333333333325932 |
| 0000000004 | 004 | .6666666666666662966 |
| 0000000004 | 005 | 1.6666666666666674068 |
| 0000000005 | 001 | .6666666666666662966 |
| 0000000005 | 003 | .3333333333333331483 |
| 0000000005 | 006 | .3333333333333331483 |
| 0000000006 | 003 | .6666666666666662966 |
| 0000000007 | 006 | .3333333333333331483 |
| 0000000008 | 001 | .6666666666666662966 |

| T_PERSON_CHARACTER | | |
|---|---|---|
| PERSON ID | CHARACTER ID | SCORE |
| 0000000001 | 006 | 1.3333333333333325932 |
| 0000000001 | 007 | .6666666666666662966 |
| 0000000002 | 004 | 1.3333333333333325932 |
| 0000000002 | 005 | 1.3333333333333325932 |
| 0000000002 | 007 | 1.3333333333333325932 |
| 0000000003 | 010 | .3333333333333331483 |
| 0000000004 | 001 | .3333333333333331483 |
| 0000000004 | 002 | .3333333333333331483 |
| 0000000004 | 014 | 1.3333333333333325932 |
| 0000000005 | 003 | .6666666666666662966 |
| 0000000005 | 004 | .6666666666666662966 |
| 0000000005 | 014 | 1.3333333333333325932 |
| 0000000006 | 006 | .3333333333333331483 |
| 0000000007 | 012 | .3333333333333331483 |
| 0000000007 | 013 | .3333333333333331483 |
| 0000000008 | 003 | .6666666666666662966 |
| 0000000008 | 004 | .6666666666666662966 |

| T_PRG_VALUE | | |
|---|---|---|
| PROGRAM ID | ATTRIBUTE | VALUE ID |
| 1000000030000029 | Person | 0000082163 |
| 1000000030000029 | Person | 0000216595 |
| 1000000030000029 | Person | 0000244529 |
| 1000000030000029 | Person | 1000001790 |
| 1000000030000029 | Person | 1000002204 |
| 1000000030000029 | Keyword | 0000006833 |
| 1000000030000029 | Keyword | 0000016317 |
| 1000000030000029 | Keyword | 0000016365 |
| 1000000030000029 | Keyword | 0000017540 |
| 1000000030000029 | Keyword | 0000026674 |

| T_PRG_VALUE | | | |
|---|---|---|---|
| PROGRAM ID | ATTRIBUTE ID | VALUE ID | SCORE |
| 1000000030000029 | 001 | 1000 | 1.6519336599597207 0000 |
| 1000000030000029 | 002 | 0000082163 | 9.2640233088923680 0000 |
| 1000000030000029 | 002 | 0000216595 | 9.9571704894523130 0000 |
| 1000000030000029 | 002 | 0000244529 | 8.1654110202242580 0000 |
| 1000000030000029 | 002 | 1000001790 | 8.1654110202242580 0000 |
| 1000000030000029 | 002 | 1000002204 | 9.9571704894523130 0000 |
| 1000000030000029 | 003 | 002 | 2.7389936510489052 0000 |
| 1000000030000029 | 003 | 003 | 2.5480340455321850 0000 |
| 1000000030000029 | 004 | 001 | 2.6452843253751480 0000 |
| 1000000030000029 | 004 | 004 | 2.4434612416126080 0000 |
| 1000000030000029 | 005 | 006 | 2.0070206018002947 0000 |
| 1000000030000029 | 005 | 007 | 1.9584991284365365 0000 |
| 1000000030000029 | 005 | 008 | 1.9568209941276290 0000 |
| 1000000030000029 | 006 | 0000006833 | 4.9009246841040040 0000 |
| 1000000030000029 | 006 | 0000016317 | 7.5592752166539420 0000 |
| 1000000030000029 | 006 | 0000016365 | 8.5708761283324220 0000 |
| 1000000030000029 | 006 | 0000017540 | 4.6996751174245315 0000 |
| 1000000030000029 | 006 | 0000026674 | 5.3824595109489300 0000 |

| T_UM_VALUE | | | | |
|---|---|---|---|---|
| MENBER ID | UM TYPE ID | ATTRIBUTE ID | VALUE ID | SCORE |
| 200241723056783 | 1 | 001 | 1000 | .84296419427714530000 |
| 200241723056783 | 2 | 001 | 1002 | .66461444765003500000 |
| 200241723056783 | 3 | 002 | 0000000001 | 2.18230298324329500000 |
| 200241723056783 | 1 | 002 | 0000000173 | 1.99001971135882830000 |
| 200241723056783 | 1 | 002 | 0000004651 | 2.19931634905454900000 |
| 200241723056783 | 1 | 002 | 0000088887 | 2.05991592691361850000 |
| 200241723056783 | 1 | 002 | 014 | 6.94115864459585000000 |
| 200241723056783 | 1 | 003 | 001 | .88080951593773930000 |
| 200241723056783 | 1 | 003 | 0000007863 | 1.13958606003961480000 |
| 200241723056783 | 1 | 006 | 0000021755 | 2.26681335996475970000 |
| 200241723056783 | 1 | 006 | 0000020568 | 1.90854932820777700000 |
| 200241723056783 | 1 | 006 | 0000018543 | 3.13485633400288370000 |
| 200241723056783 | 1 | 006 | 0000015737 | 1.69909282252661780000 |
| 200241723056783 | 1 | 006 | 0000015705 | 1.98230965083122500000 |
| 200241723056783 | 1 | 006 | 0000013050 | 3.43226393316623570000 |

317

F I G. 3 1
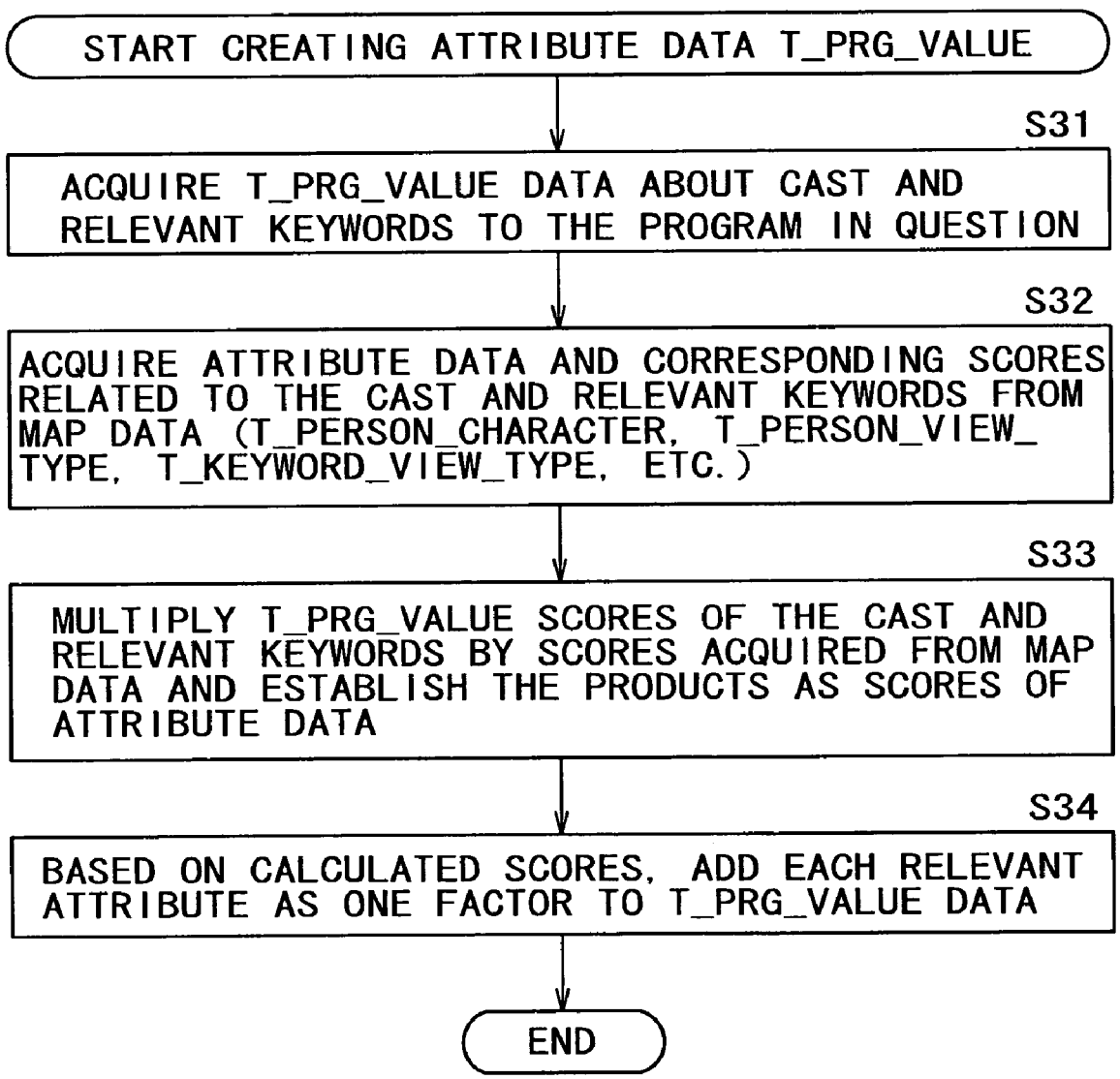

F I G. 47

```
1  ## Key = Reason Type For Each[UM Type,Attribute]
2   ReasonType.Normal.Category=4
3   ReasonType.Normal.Person=3
4   ReasonType.Normal.PersonCharacter=8
5   ReasonType.Normal.ViewType=7
6  #ReasonType.Normal.Age=
7   ReasonType.Normal.Keyword=2
8  #ReasonType.Normal.BranchStation=
9   ReasonType.Normal.Time=5
10  ReasonType.Normal.Authority=9
11 #ReasonType.Normal.Gender=
12  ReasonType.Prior.Category=1
13  ReasonType.Prior.Person=0
14  ReasonType.Prior.PersonCharacter=8
15  ReasonType.Prior.ViewType=7
16 #ReasonType.Prior.Age=
17  ReasonType.Prior.Keyword=0
18  ReasonType.Prior.Gender=
19  ReasonType.Expected.Person=6
20  ReasonType.Expected.keyword=6
```

FIG. 48

```
#  # Set Reason Display Count for Each Reason Type
#[0]Registered Keywords,Persons(5 entries max.)
Num.ReasonType.0=5
#[1]Registered Genre, (1 entry max.)
Num.ReasonType.1=1
#[2]Frequently Used Keywords(5 entries max.)
Num.ReasonType.2=5
#[3]Frequently Watched Performers(5 entries max.)
Num.ReasonType.3=5
#[4]Frequently Watched Genre(1 entry max.)
Num.ReasonType.4=1
#[5]Frequently Watched Time Zone(1 entry max.),i.e.,time zone
    between two highly scored times of day in 24-hour format
Num.ReasonType.5=1
#[6]Keyword,Performers from Coordinated Filtering(5 entries max.)
Num.ReasonType.6=5
#[7]View Type by Viewed Performer(1 entry max.)
Num.ReasonType.7=1
#[8]Character Name by Viewed Performer(1 entry max.)
Num.ReasonType.8=1
#[9]Recommendation by Authority(1 entry max.)
Num.ReasonType.9=1
```

INFORMATION PROCESSING APPARATUS, INFORMATION PROCESSING METHOD, PROGRAM, AND RECORDING MEDIUM

BACKGROUND OF THE INVENTION

The present invention relates to an information processing apparatus, an information processing method, a program, and a recording medium. More particularly, the present invention relates to an information processing apparatus, an information processing method, a program, and a recording medium for providing users with information based on their preferences.

Recent years have seen the ever-growing use by the general public of apparatuses capable of connecting to networks such as the Internet. Concurrently, services that were previously unheard of are being offered to, and accepted by, an increasing number of users of such apparatuses. Illustratively, some of the TV sets currently marketed have their conventional ability to receive TV programs supplemented with capabilities of connecting to a network and acquiring electronic program guide (EPG) information from specific servers over the network. Also available today with TV sets is the function of reserving desired TV programs for subsequent unattended recording based on the acquired EPG.

EPG can be acquired not only by TV sets but also by other apparatuses such as personal computers for viewing by their users.

FIG. 1 shows a typical EPG screen. EPG, obtained by TV sets and personal computers, as mentioned, is displayed on their display area 11. Typically, EPG is furnished in the form of a matrix-like table in which broadcast stations, broadcast times and broadcast programs are properly associated with one another. FIG. 1, for example, provides information that a program A-1 is broadcast by a broadcast station A starting at 12 o'clock. EPG is offered in a display format enabling the user to see clearly broadcast stations, broadcast times, and broadcast programs as they are suitably associated with one another.

Whereas EPG is displayed basically in a manner in which broadcast stations, broadcast times and broadcasts programs are in correspondence with one another, the EPG-providing party (EPG provider) may also present users with additional information so as to enhance their convenience. For example, the typical display of FIG. 1 shows a "RESERVE" button 21 in each display area where a broadcast program name is indicated. The RESERVE button 21 in a particular area is operated on by the user who wants to reserve the corresponding program for unattended recording. Where the terminal displaying EPG is an apparatus such as a personal computer equipped with a storage section (not shown), operating on the RESERVE button 21 causes the corresponding broadcast program to be preset in the built-in storage section for unattended recording.

The example of FIG. 1 also shows a "RECOMMENDED" button 22 and a "RANKING" button 23. The user operates on the RECOMMENDED button 22 when wishing to view information about the broadcast programs recommended by the EPG provider. The RANKING button 23 is operated on when the user wants to view more information based on reserve counts, ratings and other parameters.

Each of these buttons is arranged to be clicked on by the user manipulating an operation section, not shown. Typically, the user positions a cursor 31 on a desired button and clicks on that button.

When, say, the RECOMMENDED button 22 is clicked in EPG of FIG. 1, the display area 11 is switched illustratively to the screen of FIG. 2. The screen of FIG. 2 shows a number of broadcast program names and explanations associated with these programs. This screen that appears when the RECOMMENDED button 22 is clicked has been prepared in advance by the EPG provider. That is, the criteria for the recommendations are on the side of the EPG provider, and not on the side of users who receive EPG offerings.

In other words, the recommended broadcast program information offered as one of EPG-related services is aimed at a number of users, not at each of them. It has been difficult to provide each individual user with information about recommended programs in a manner that takes into consideration the user's preferences. The same difficulty has also been encountered when other information is to be offered to individual users.

SUMMARY OF THE INVENTION

The present invention has been made in view of the above circumstances and provides an apparatus, a method and a program for providing individual users with pertinent information in a manner that takes their tastes and preferences into account.

According to an embodiment of the present invention, there is provided an information processing apparatus which include:

a first managing part for managing first data about preferences of a user;

a second managing part for managing second data about information;

a retrieving part for retrieving the second data about the information used by the user; and an updating part for updating the first data by use of the second data retrieved by the retrieving part;

wherein, if the second data are found to exist within the first data, then the updating parts update the first data using the second data; and if the second data are not found to exist within the first data, then the updating parts add the second data to the first data.

According to another embodiment of the present invention, there is provided an information processing method for use with an information processing apparatus which include at least storing parts for storing data and controlling parts for performing predetermined processes by use of the data stored in the storing parts, the information processing method including:

a first management step of managing first data about preferences of a user;

a second management step of managing second data about information;

a retrieving step of retrieving the second data about the information used by the user; and an updating step of updating the first data by use of the second data retrieved in the retrieving step;

wherein, if the second data are found to exist within the first data, then the updating step updates the first data using the second data; and wherein, if the second data are not found to exist within the first data, then the updating step adds the second data to the first data.

According to still another embodiment of the present invention, there is provided a program for use with an information processing apparatus which include at least storing parts for storing data and controlling parts for performing predetermined processes by use of the data stored in the storing parts, the program including:

a first management step of managing first data about preferences of a user;

a second management step of managing second data about information;

a retrieving step of retrieving the second data about the information used by the user; and an updating step of updating the first data by use of the second data retrieved in the retrieving step;

wherein, if the second data are found to exist within the first data, then step the updating step updates the first data using the second data; and if the second data are not found to exist within the first data, then the updating step adds the second data to the first data.

According to yet another embodiment of the present invention, there is provided a recording medium which records a program including:

a first management step of managing first data about preferences of a user;

a second management step of managing second data about information;

a retrieving step of retrieving the second data about the information used by the user; and an updating step of updating the first data by use of the second data retrieved in the retrieving step;

wherein, if the second data are found to exist within the first data, then step the updating step updates the first data using the second data; and if the second data are not found to exist within the first data, then the updating step adds the second data to the first data.

Where the information processing apparatus, information processing method, and program according to the present invention are in use, both the data about the user's preferences and the data about separately furnished information are managed. When the user utilizes any item of the information, all factors associated with that information item used by the user are retrieved, and the data about the user's preferences are changed or added with respect to each of the retrieved factors. This arrangement enables the data about the user's preferences to be updated every time the user utilizes any item of the information. In this manner, the user preference data are constantly updated to better reflect the user's current preferences.

More specifically, the inventive information processing apparatus, information processing method, and program may provide information such as information about TV broadcast programs.

The information processing apparatus, information processing method, and program of the present invention may also provide information about, say, TV programs in a manner that takes the user's preferences into consideration. Because each individual user is provided with customized information, the users are more encouraged to access the source of the information than before.

The inventive information processing apparatus, information processing method, and program may also present the user with information together with reasons (e.g., keywords) for presenting that information. The user is thus able to know the keywords according to which the information in question has been selected and presented.

The information processing apparatus, information processing method, and program according to the present invention allow the information providing party to properly control the keywords offered to the user. For example, the information provider may manage keywords which are not fit to be presented to the user but which are suitable for retrieving the information to be offered to the user. By keeping and controlling such sensitive keywords, the information provider can provide the user with more relevant information than before.

Additional features and advantages of the present invention are described in, and will be apparent from, the following Detailed Description of the Invention and the Figures.

BRIEF DESCRIPTION OF THE FIGURES

FIG. 2 is an explanatory view of a conventional recommended-program screen.

FIG. 3 is a schematic view showing a typical configuration of a system to which the present invention is applied.

FIG. 8 is an explanatory view of another typical recommended-program screen.

FIG. 9 is a schematic view indicating a typical internal structure of a server.

FIG. 10 is a function block diagram explaining functions of the server.

FIG. 12 is an explanatory view of an M_CATEGORY database.

FIG. 13 is an explanatory view of an M_PERSON database.

FIG. 14 is an explanatory view of an M_PERSON_CHARACTER database.

FIG. 15 is an explanatory view of an M_VIEW_TYPE database.

FIG. 16 is an explanatory view of an M_KEYWORD database.

FIG. 17 is an explanatory view of an M_KEYWORD_1 database.

FIG. 18 is an explanatory view of an M_KEYWORD_2 database.

FIG. 19 is an explanatory view of an M_AGE database.

FIG. 20 is an explanatory view of an M_GENDER database.

FIG. 21 is an explanatory view of an M_REASON database.

FIG. 24 is an explanatory view of a T_PERSON_TARGET_GENDER database.

FIG. 25 is an explanatory view of a T_PERSON_TARGET_AGE database.

FIG. 26 is an explanatory view of a T_PERSON_VIEW_TYPE database.

FIG. 27 is an explanatory view of a T_PERSON_CHARACTER database.

FIG. 28 is an explanatory view of a T_PRG_VALUE database.

FIG. 29 is another explanatory view of the T_PRG_VALUE database.

FIG. 30 is an explanatory view of a T_UM_VALUE database.

FIG. 31 is a flowchart of steps for creating the T_PRG_VALUE database.

FIG. 47 is an explanatory view of data with which to perform processes related to reason types.

FIG. 48 is an explanatory view of other data with which to perform processes related to reason types.

DETAILED DESCRIPTION OF THE INVENTION

Figure 33:
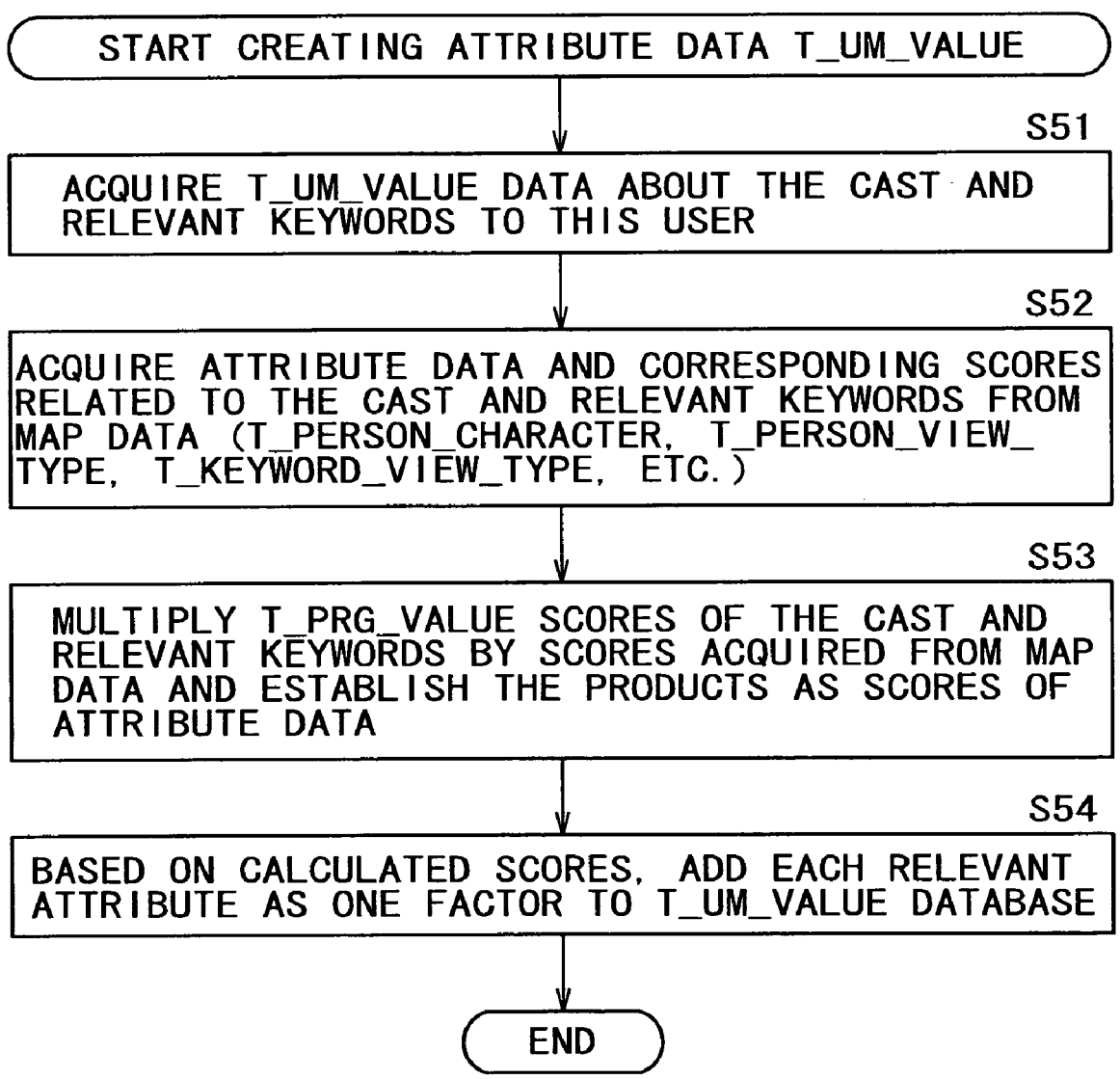
FIG. 33 is a flowchart of steps for creating the T_UM_VALUE database.
Figure 34:
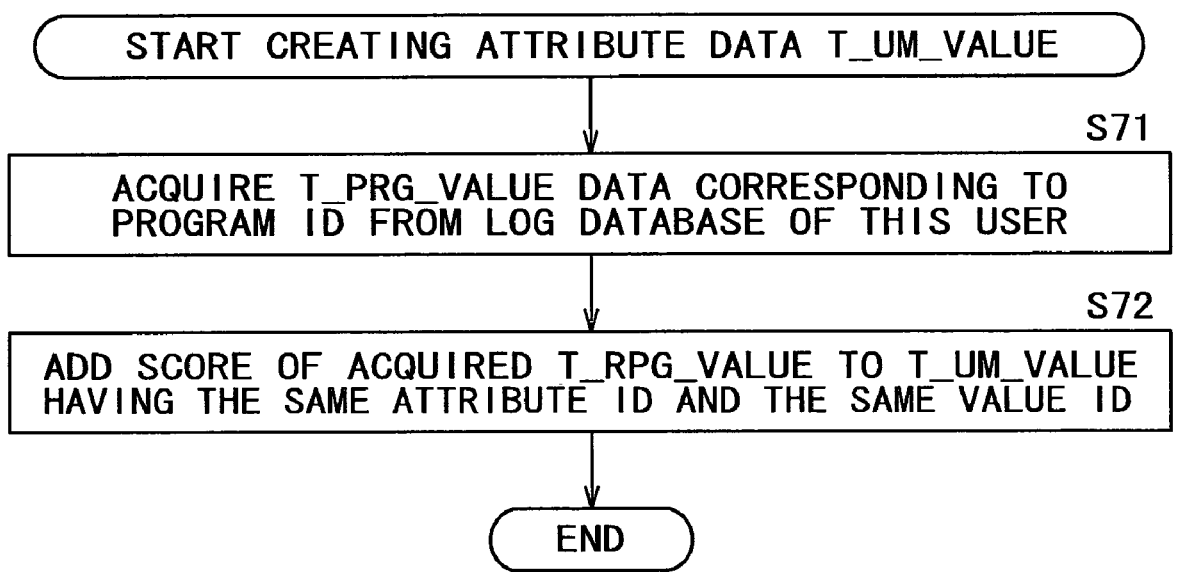
FIG. 34 is a flowchart of other steps for creating the T_UM_VALUE database.

An information processing apparatus of the present invention (e.g., server 52 in FIG. 9) illustratively includes: a first managing part (e.g., target database 252 in FIG. 11) for managing first data (e.g., T_UM_VALUE database 317 in FIG. 30) about preferences of a user; a second managing part (e.g., target database 252 in FIG. 11) for managing second data (e.g., T_PRG_VALUE database 316 in FIG. 29) about information; a retrieving part (e.g., CPU 201 in FIG. 9 for performing steps S51 and 52 in FIG. 33) for retrieving the second data about the information used by the user; and an updating part (e.g., CPU 201 in FIG. 9 for performing steps S53 and S54 in FIG. 33) for updating the first data by use of the second data retrieved by the retrieving part; wherein, if the second data are found to exist within the first data, then the updating part updates the first data using the second data (e.g., by the process of the flowchart in FIG. 33); and wherein, if the second data are not found to exist within the first data, then the updating part adds the second data to the first data (e.g., by the process of the flowchart in FIG. 34).

The preferred embodiments of the present invention will now be described with reference to the accompanying drawings. Whereas an EPG (electronic program guide) system which provides broadcast program information and to which the present invention is applied will be primarily discussed below, other systems handling other kinds of information may also be practiced in a manner that implements the present invention.

The embodiments of the present invention will be discussed in the following order: a typical structure of the system according to the present invention will be described first. EPG data handled by the system will be discussed thereafter. In particular, characteristics of EPG information appearing on user terminals 53-1 through 53-N (FIG. 3) will be explained, followed by a description of data structures used to implement these EPG characteristics. A typical structure of a server 52 (FIG. 3) offering EPG data will also be described in conjunction with the data structures.

FIG. 3 is a schematic view showing a typical configuration of the system to which the present invention is applied. In FIG. 3, a network 51 is constituted by the Internet or a LAN (local area network) enabling connected apparatuses to exchange data therebetween. The server 52 connected to the network 51 is managed by an administrator of a party that creates and provides EPG data (i.e., EPG provider). In response to a request from any one of the user terminals 53-1 through 53-N, the server 52 provides the requested EPG data to the requesting terminal over the network 51.

The user terminals 53-1 through 53-N are each furnished with the capability of receiving TV broadcasts from a broadcast station 54. Each of the user terminals 53-1 through 53-N is illustratively a TV set or a personal computer capable of connecting to the server 52 via the network 51 and of receiving broadcast programs from the broadcast station 54. Alternatively, the user terminals 53-1 through 53-N may each be made up of two terminals: a personal computer capable of connecting to the server 52 over the network 51, and a TV set with the ability to receive broadcast programs from the broadcast station 54. As another alternative, each of the user terminals 53-1 through 53-N may include a recording device for recording broadcast programs.

That is, the user terminals 53-1 through 53-N may each be defined as a terminal formed by one or a number of apparatuses which are at least capable of exchanging data with the server 52 as well as with one another and which have the ability to receive TV programs from the broadcast station 54.

In the description that follows, the user terminals 53-1 through 53-N will be simply referred to as the user terminal 53 if there is no specific need for distinction therebetween. The same generic reference will also apply to any other device or apparatus furnished in a number of units. Furthermore, although only one server 52 and one broadcast station 54 are included in FIG. 3, they are shown merely for purpose of simplification and illustration and do not in any way limit the actual scope or configuration of the system embodying the present invention. Any number of these components may be furnished in carrying out the present invention.

Figure 4:
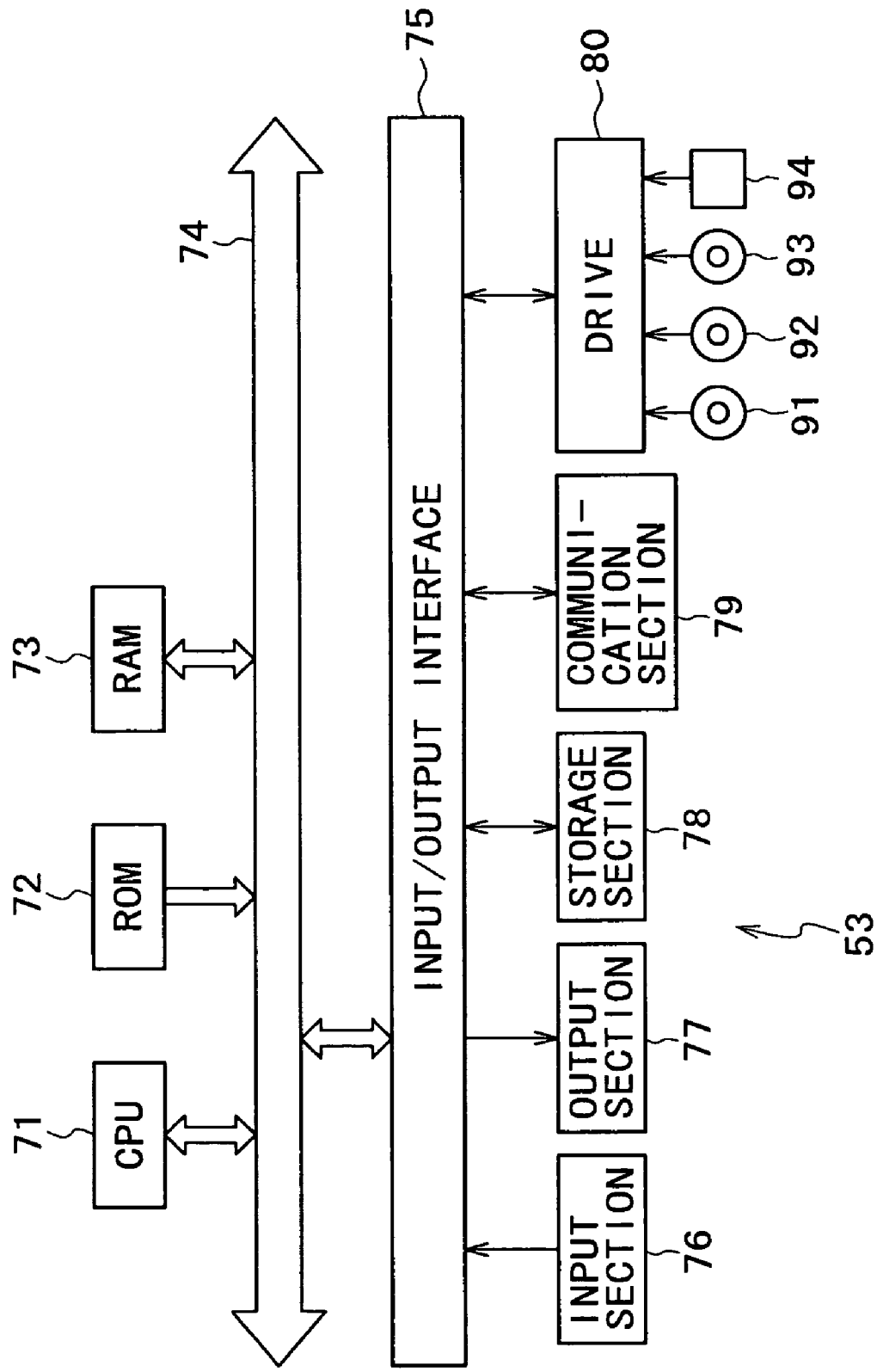
FIG. 4 is a schematic view depicting a typical internal structure of a user terminal.

FIG. 4 is a schematic view depicting a typical internal structure of the user terminal 53. The user terminal 53 is explained here as a single terminal which exchanges data with the server 52 and which receives broadcast programs from the broadcast station 54. This terminal is illustratively a personal computer that may be implemented in the form of a desk-top computer, a laptop computer, a PDA (personal digital assistant), or a mobile phone, for example.

In the user terminal 53, a CPU (central processing unit) 71 performs various processes in keeping with programs held in a ROM (read only memory) 72. A RAM (random access memory) 73 accommodates data and programs that may be needed by the CPU 71 in carrying out its processing. An input/output interface 75 is connected to an input section 76 made up of a keyboard and a mouse. Signals entered into the input section 76 are output through the input/output interface 75 to the CPU 71. The input/output interface 75 is also connected to an output section 77 including a display unit and speakers.

The input/output interface 75 is further connected to a storage section 78 and a communication section 79. The storage section 78 is typically formed by a hard disc drive, and the communication section 79 exchanges data with other devices (e.g., server 52) over the network 51. Although not shown in detail, the communication section 79 includes an antenna and a tuner for receiving and processing broadcast programs from the broadcast station 54. A drive 80 accommodates a recording medium such as a magnetic disc 91, an optical disc 92, a magneto-optical disc 93, or a semiconductor memory 94. The drive 80 is used to write and read data to and from the recording medium loaded therein.

Figure 5:
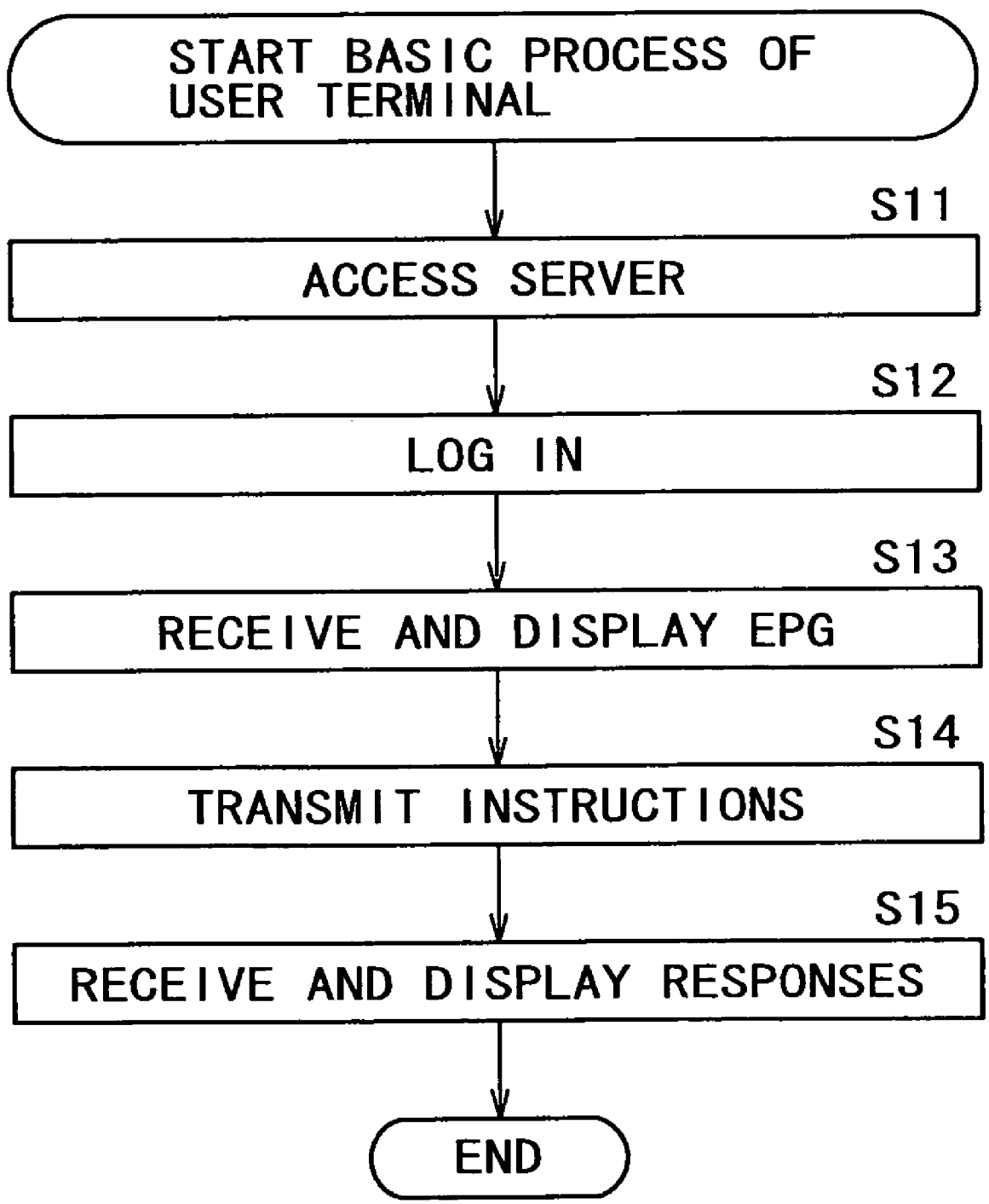
FIG. 5 is a flowchart of steps constituting basic processes performed by the user terminal.

The basic workings of the user_terminal 53 will now be described by referring to the flowchart of FIG. 5. This is an example in which the user terminal 53 acquires and processes EPG data stored and managed by the server 52. In the description that follows, the term "EPG" is assumed to include display-ready EPG data and any data accompanying EPG.

In step S11, the user terminal 53 gains access to the server 52 via the network 51 (FIG. 3). The accessing step is carried out by a suitable browser program getting started to connect to the server 52 by a predetermined method (i.e., dial-up connection or some other suitable scheme selected by the user under contract with an ISP (Internet service provider)).

Upon completion of access to the server 52, the user terminal 53 performs a log-in process in step S12. More specifically, the step is carried out by the user operating the input section 76 to enter a user name and a password. The information thus entered is transmitted to the server 52 through the communication section 79.

When accessed to the user terminal 53 (i.e., accepting a log-in), the server 52 provides initial EPG screen data under its management to the accessing user terminal 53 over the network 51. Obviously, EPG is provided only if the log-in process is normally completed. A predetermined error handling routine is executed in case of an erroneous log-in.

In step S13, the user terminal 53 receives data from the server 52. Based on the data received by the communication section 79, the CPU 71 (FIG. 4) displays an initial EPG screen (described later with reference to FIG. 6) on a display unit 101, part of the output section 77. Viewing the initial screen on the display unit 101, the user operates on a number of buttons carried by the screen (i.e., buttons associated with linked destinations and commands).

After the button operations, step S14 is reached in which data (instructions) corresponding to the operated buttons are transmitted to the server 52. Responses from the server 52 having received the instructions are received in step S15. In step S15, as in step S13, the CPU 71 processes the received data and causes the display unit 101 to display screens accordingly. Steps S14 and S15 are repeated as needed.

Figure 6:
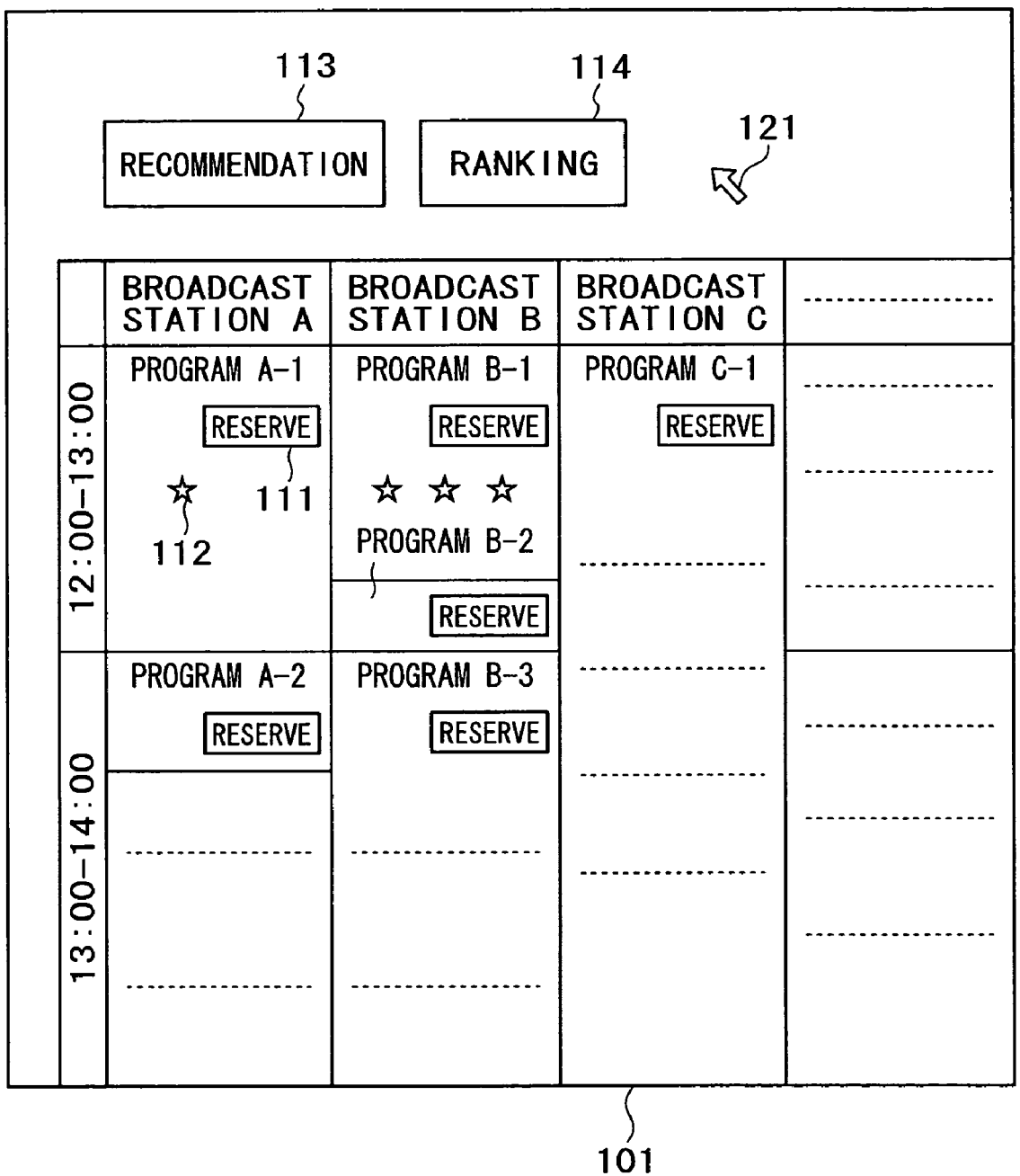
FIG. 6 is an explanatory view of a typical EPG screen.

FIG. 6 shows a typical initial EPG screen displayed on the display unit 101 in step S13. EPG appearing on the display unit 101 in FIG. 6 primarily shows broadcast stations, broadcast times, and broadcast programs in relevant association with one another. For example, the EPG of FIG. 6 shows that a broadcast station A broadcasts a program A-1 in the 12:00-13:00 time zone. A number of broadcast stations, programs to be broadcast by these stations, and time zones in which these programs are to be broadcast are shown related to one another in a manner that allows the user to know at a glance what needs to be known.

As shown in FIG. 6, a display area carrying the indication "PROGRAM A-1" includes a RESERVE button 111. Operating on the RESERVE button 111 reserves the corresponding program for subsequent unattended recording to the storage section 78 (FIG. 4).

Furthermore, the area carrying the indication "PROGRAM A-1" in FIG. 6 includes a recommendation mark 112. The recommendation mark 112 is attached to the programs that are recommended to the accessing user. The recommended programs are programs that are deemed specifically to satisfy the preferences of each user accessing the server. Different programs can be recommended to different users.

In other words, the recommended programs are not common to all users accessing the server 52. The server 52 does not set aside particular programs beforehand for every user. These programs are selected upon access to the server by each user in correspondence with user's preferences. Presenting the accessing user with recommended program information that takes the user's preferences into account is one of the features of the present invention. This feature is implemented by the server 52 performing its processes based on databases, to be described later.

In the example of FIG. 6, the recommendation mark 112 is furnished in the form of stars. Alternatively, the recommendation mark may be of any other shape. The mark may be given as a series of stars so that different numbers of stars may denote different levels of recommendation. In FIG. 6, the program A-1 is accorded a single star as its recommendation mark 112, whereas the program B-1 has three stars. As such, the program B-1 is recommended to this user more strongly than the program A-1.

Data representative of the recommendation marks 112 (numbers of stars) are established by the server 52 based on the preference data on the user in question and are transmitted as part of the initial EPG screen. Alternatively, the recommendation mark data may be established on the basis of both the initial EPG screen data from the server 52 and the user preference data managed by the user terminal 53. The manner of establishing the recommendation mark data varies depending on whether the user preference data (simply called the preference data where appropriate) are managed by the server 52 or by the user terminal 53. In the description that follows, it is assumed that the server 52 manages the preference data.

Figure 1:
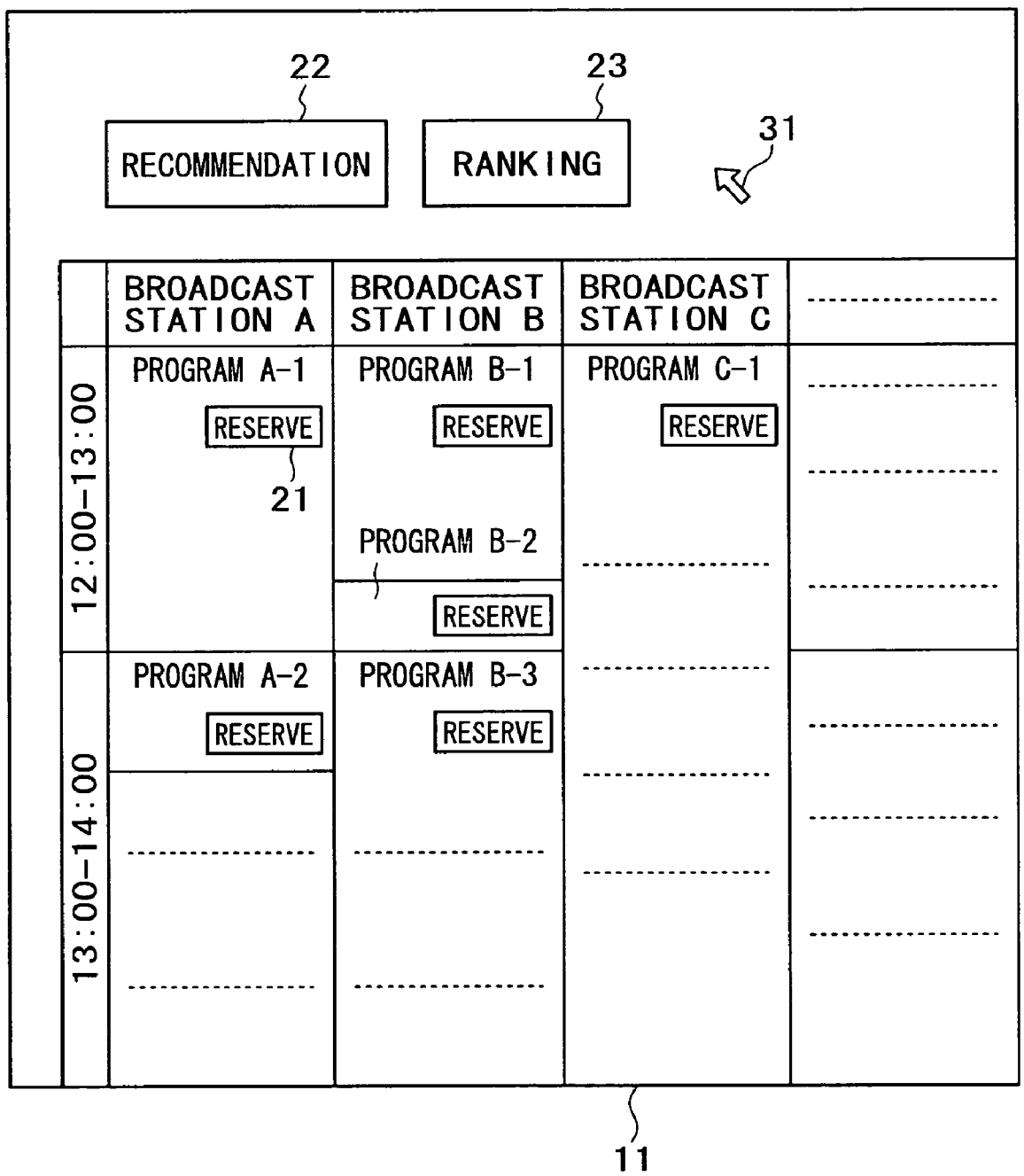
FIG. 1 is an explanatory view of a conventional EPG screen.

That the recommendation marks 112 are attached on the initial EPG screen to the programs deemed to satisfy the user's preferences is based on the assumption that the user is authenticated and identified (through a log-in process) upon access to the server 52 by the user terminal 53. Alternatively, the user may be first offered the initial screen of FIG. 1. The user may then log in to receive the screen of FIG. 6.

The recommendation mark 112 may be always included in the display area which carries each recommended program (detected as a program having cleared predetermined conditions). There may be cases, however, in which the recommendation marks 112 are attached to a number of programs to be broadcast in the same time zone. Generally, the user can only watch one program in one time zone, and one recording apparatus owned by the user can record only one broadcast program in one time zone. As such, even if the recommendation marks 112 are attached to more than two programs in one time zone, the user can only watch two.

If too many programs carry the recommendation marks 112, the impact of the recommendations could be diluted. In an extreme case, if the recommendation marks were attached to all programs (this could, in fact, happen), the marks 112 would effectively loose their significance.

Under the circumstances, certain constraints preferably should be placed on the number of broadcast programs furnished with the recommendation marks 112. For example, it may be determined that a maximum of two programs are to carry the recommendation marks 112 in the same time zone and that EPG is to limit the recommendation marks 112 to a maximum of 20 programs for a day.

The EPG screen in FIG. 6 indicates a RECOMMENDATION button 113 and a RANKING button 114. The RECOMMENDATION button 113 is operated on to get an overview of the recommended programs. The RANKING button 114 is operated on when the user wants to have an overview of the programs recommended by such criteria as unattended recording reservation count and/or by audience rating.

Each of these buttons is operated on by the user manipulating the input section 77 (FIG. 4) illustratively to position a cursor 121 onto the desired button and to click on it.

Figure 7:
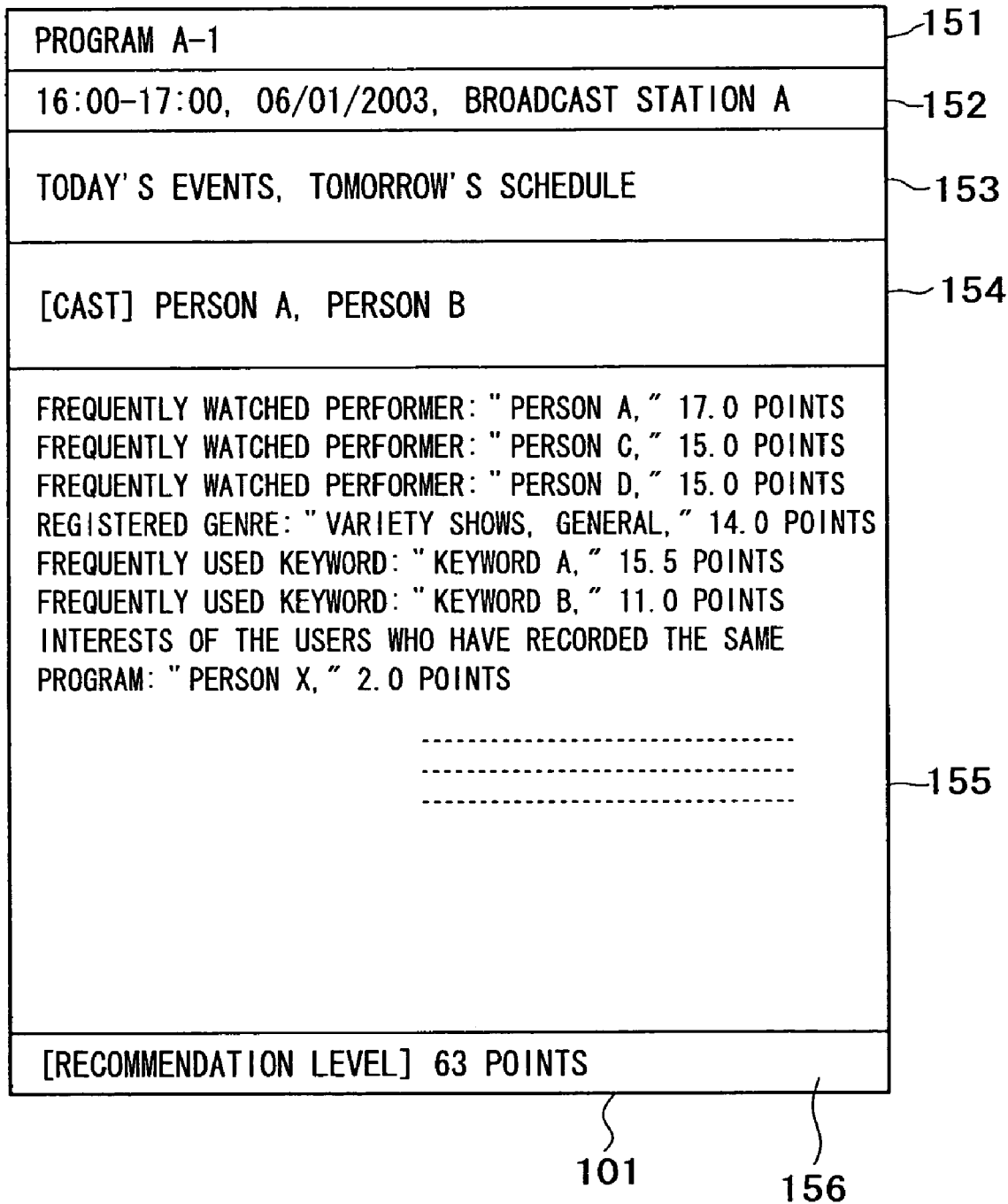
FIG. 7 is an explanatory view of a typical recommended-program screen.

Clicking on the RECOMMENDATION button 113 switches the display unit 101 to the screen such as one shown in FIG. 7. Although the example of FIG. 7 shows only one recommended broadcast program together with its detailed information, a number of recommended programs may actually appear on the screen of the display unit 101 along with their detailed information (this screen is called the recommendation screen hereunder). The recommendation screen includes a program display area 151, a broadcast time display area 152, a summary display area 153, a cast name display area 154, a reason display area 155, and a recommendation level display area 156.

The program display area 151 shows the name of the recommended program. The broadcast time display area 152 indicates the time of day and the date at which the program in question is to be broadcast. The summary display area 153 gives a summary of what is contained in the recommended broadcast program. The cast name display area 154 lists the names of the major performers appearing in the program. The reason display area 155 shows the reasons for recommending the program in question to the user. The recommendation level display area 156 indicates numerically a recommendation level derived in a comprehensive manner from the reasons for the recommendation.

Although the example in FIG. 7 shows the recommendation level display area 156 carrying points, this is not limitative of the present invention. Alternatively, as in the case of the recommendation marks 112 shown in FIG. 6, symbols such as stars (and their count) may be used to represent the level of recommendation.

Getting the reason display area 155 to appear on the recommendation screen such as one in FIG. 7 is another feature of the present invention. This feature allows the user to recognize the reasons for which the program in question is recommended in terms of degrees of match with the user's preferences. Taking a look at these reasons enables the user selectively to watch (and to record) preferred programs that satisfy the user's preferences with more ease than before.

Yet another feature of the present invention is not that the same recommendation screen is offered to all users accessing the server 52 but that a recommendation screen customized to satisfy each accessing user's varying preferences is provided. This feature allows the user to have more confidence in the offered information than before, making it easer for the user to search more confidently for preferred programs while having the impression that an easy-to-use EPG service is being offered. The feature is thus expected to boost the number of users gaining access to the server 52, which should contribute to a substantial rise in membership.

Furthermore, the recommendation screen in FIG. 7 has the reason display area 155 showing a number of categories of information. These categories may include, as indicated in FIG. 7, "frequently watched performer," "registered genre," "frequently used keyword," and "interests of the users who have recorded the same program," to be described later in more detail. The information displayed in the reason display area 155 may be derived illustratively from databases managed by the server 52.

In the example of FIG. 7, a person A is cited as one of the frequently watched performers, with some points (17.0 points in FIG. 7) accorded to this person. These points denote a score given to the person A as a degree of match with the user's preferences in a search for recommended programs provided by the server 52. The higher the score, the more suited the performer is to the user's taste.

More specifically, while the example in FIG. 7 shows simply a count in points (17.0 points) for the person A, this is not limitative of the present invention. Alternatively, the point indication may be accompanied by parenthesized numbers. For example, it is possible to give in this area an indication "17.0 points (8.9, 3.8)," where the first number in the parentheses may stand for a weighted value of the program in question (i.e., T_PRG_VALUE, to be discussed later) and the second number for a weighted value of the user (i.e., T_UM_VALUE, to be described later). The number preceding the parentheses (17.0 points) is a value obtained by multiplying the product of the two weighted values by a predetermined parameter.

In the example of FIG. 7, some users may have trouble with the manner in which, say, three items of information (person A, person B, person C) are presented together with their points in regard to one category of information "frequently watched performer." Whereas the example of FIG. 7 gives a partial display of the detail in the reason display area 155, the entire display could be much more complex, e.g., multiple items of information may be displayed along with their points in distributed fashion on multiple lines regarding each of multiple categories of applicable information. This kind of display requires an inordinately wide reason display area 155. The prolonged enumeration of information does not constitute an easy screen for the user to read. In addition, the indications of points are not deemed to give the user much meaningful information (because it is not considered easy for the user to find significance in the lengthy listing of numbers). In practice, such display of information may not be ultimately useful for the user in searching for preferred programs.

The inconvenience above can be circumvented illustratively by resorting to the recommendation screen of FIG. 8. On the screen shown in FIG. 8, the reason display area 155 shows a number of items of information continuously on a single line for each category of information, with no indication of points added. Unlike in the example of FIG. 7, the same category of information (e.g., "frequently watched performer") will not appear repeatedly in FIG. 8. Because the information is presented in a more compact fashion, it is deemed easier for the user to read the information and to gain more from the presented information than before. This enables the user to search for preferred programs more easily than before.

Any one of the recommendation screens in FIGS. 7 and 8 may be presented to the user. However, these screens are not limitative of the present invention in terms of the way the display is designed and presented. Illustratively, the items in each of the display areas on the screen may be switched in their locations as desired. Other display areas may be added or may replace some of the existing areas. Still, where the present invention is implemented, the screen on which the recommendation screen is displayed (i.e., the initial screen in the examples above) is at least characterized as follows.

Either the recommendation screen alone or the initial screen as well as the recommendation screen are designed in user-friendly fashion presenting information deemed to satisfy the user's preferences. That is, the information is presented in an easy-to-read, easy-to-comprehend manner. This feature is implemented by the server 52 suitably structured to manage its databases. What follows is a description of a typical structure of the server 52, databases managed thereby, and processes to be carried out using these databases.

More specifically, the internal structure of the server 52 will be explained first, followed by a description of the databases. How to create data to be managed with these databases will then be explained, along with the processes to be performed using the created data, with particular emphasis on the processes associated with the recommendation screen.

FIG. 9 is a schematic view indicating a typical internal structure of the server 52. The server 52 may be constituted illustratively by a personal computer. In the server 52, a CPU 201 performs various processes in keeping with programs held in a ROM 202. A RAM 203 accommodates data and programs that may be needed by the CPU 201 in carrying out its processing. An input/output interface 205 is connected to an input section 206 made up of a keyboard and a mouse. Signals entered into the input section 206 are output through the input/output interface 205 to the CPU 201. The input/output interface 205 is also connected to an output section 207 including a display unit and speakers.

The input/output interface 205 is further connected to a storage section 208 and a communication section 209. The storage section 208 is typically formed by a hard disc drive, and the communication section 209 exchanges data with other devices (e.g., user terminal 53) over the network 51. A drive 210 is used to write and read data to and from a recording medium such as a magnetic disc, an optical disc, a magneto-optical disc, or a semiconductor memory loaded in the drive.

As described above, the server 52 is a terminal capable of creating EPG and the recommendation screen to be presented to the user terminal 53. Such capabilities or functions of the server 52 are implemented by the CPU 201 executing relevant programs that are held in the storage section 208 and loaded into the RAM 203 upon program execution. FIG. 10 is a function block diagram explaining the functions of the server 52.

Referring to FIG. 10, a log creation function 231 is the ability of the server 52 to create logs of dates and times of access by the user (through the user terminal 53) as well as logs of information about services received by the accessing server (e.g., unattended recording reservations of certain broadcast programs). The logs thus created are stored into the storage section 208 and managed as log files by the log creation function 231. A user management function 232 is the ability of the server 53 to register new users, delete currently registered users, and handle users who have logged in. The user's operations (i.e., instructions) are managed as needed by the user management function 232.

An information sorting function 233 is the ability of the server 52 to reference a target information meta database and a user model database, to be described later, in order to selectively retrieve from the applicable databases information deemed fit for the accessing (i.e., requesting) user and to present the retrieved information to the user. A service management function 234 is used by a service administrator (i.e., administrator of the server 52 or a data provider providing EPG data to the server 52) in performing editing work such as adding, changing and deleting database entries and related information.

A user model management function 235 allows data to be written to, updated in, and deleted from the user model database either directly by the user or service administrator or as a result of log database mining. The user model management function 235 acquires and manages user preference data. As will be described later in more detail, the preference data are acquired in a number of ways; through a data registration process performed by the user, by learning, or through filtering processes, for example.

An information communication function 236 is the ability of the server 52 to provide sorted information to the user and receive data from the user. A target information meta-data management function 237 allows information to be written to, updated in, and deleted from the target information meta database either directly by the user or service administrator or as a result of the mining of related information from an information database, a master database and other sources. A general service function 238 is the function for carrying out processes which are needed by the server 52 in offering its services but which are not dealt with by any of the above-mentioned functions.

The functions outlined above are incorporated in the server 52. Although these functions are assumed here to be taken up by the server 52 for convenience of explanation, part of the functions may alternatively be taken over by the user terminal 53. As another alternative, part or all of these functions may be placed in a terminal other than the server 52. The server 52 may then exchange data with that terminal to effectively bring about the functions that are supposedly those of the server.

Illustratively, the user terminal 53 may have the log creation function 231 and user model management function 235 (so that the user may manage the functions for managing the user's private information as well as the user preference data). This enables the user terminal 53, not the server 52, to carry out processes which are to be handled by these functions, as will be described later.

Figure 11:
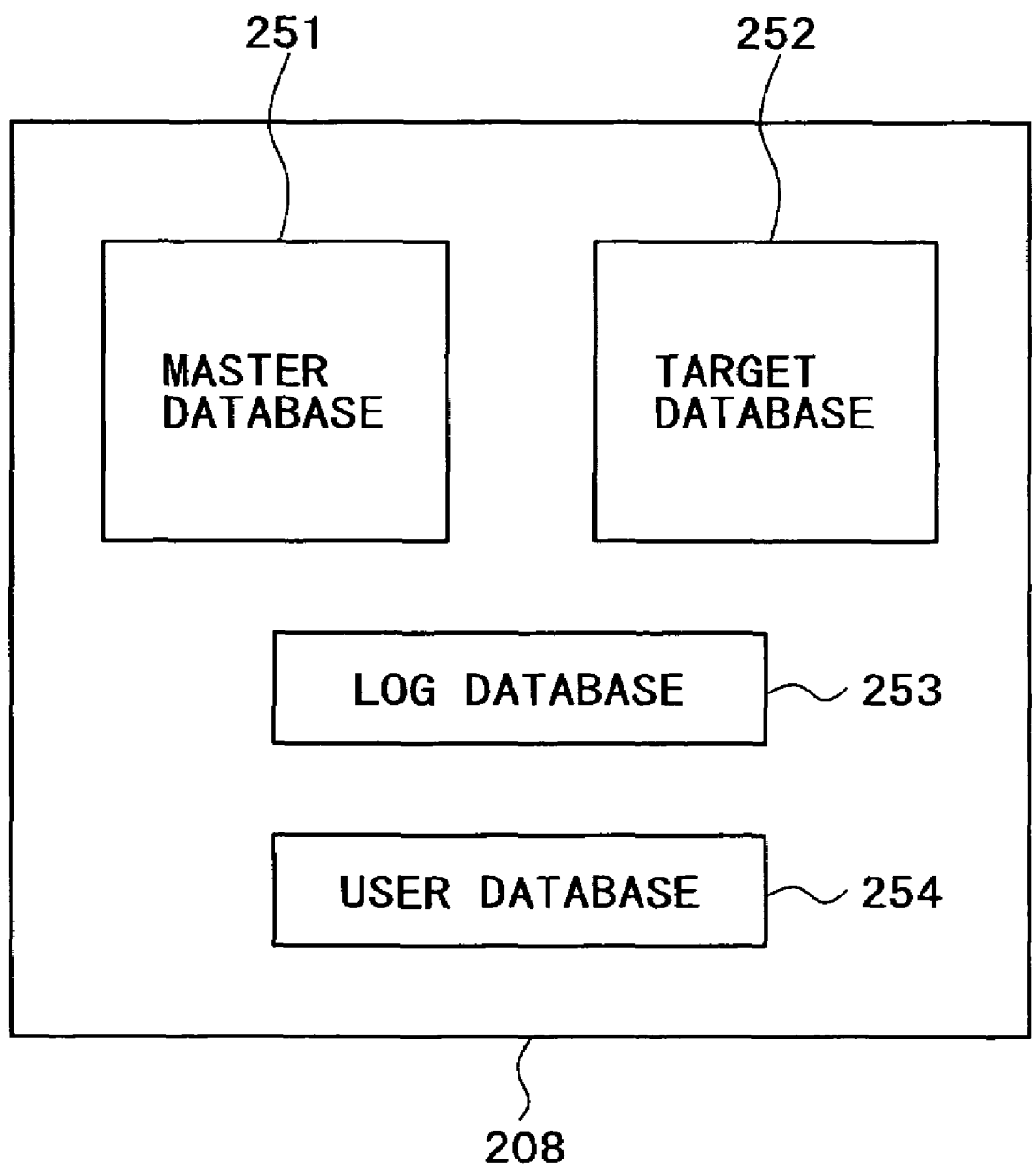
FIG. 11 is an explanatory view of databases held in a storage section.

Databases to be used (i.e., managed) by the above functions will now be described. These database are established in the storage section 208. FIG. 11 is an explanatory view of the databases to be built in the storage section 208. In the example of FIG. 11, the storage section 208 includes a master database 251, a target database 252, a log database 253, and a user database 254.

The master database 251 is made up of a number of databases including a database for creating EPG and a database for managing user-related information (e.g., users' ages). The target database 252 is formed by a number of databases including those used to calculate values for creating the recommendation screen and other displays. The log database 253 is created and managed by the log creation function 231. The user database 254 is a database for managing information about the users who have registered as members.

The master database 251 is composed of databases shown in FIGS. 12 through 21. For purpose of simplification and illustration, only part of the data in the databases are shown in FIGS. 12 through 21.

FIG. 12 shows an M_CATEGORY database 271 that is provided to manage the categories (i.e., genres) of the programs to be broadcast. An attribute ID of "001" is assigned to the M_CATEOGRY database 271. This database manages the registered categories in association with corresponding category ID's for identifying the categories. Illustratively, a category ID of "1000" is assigned to a category "sports" in the M-CATEGORY database 271 of FIG. 12.

FIG. 13 shows an M_PERSON database 272 that is provided to manage persons (presenters, actors, actresses, intellectuals, politicians, etc.,) appearing in the programs to be broadcast. An attribute ID of "002" is assigned to the M_PERSON database 272. This database manages the names of registered persons and the pronunciations (Japanese kana names) of these persons' names in association with corresponding person ID's. Illustratively, a person ID of "0000000001" in the M_PERSON database 272 of FIG. 13 is assigned to a person A whose name is pronounced as "Jinbutsu-ee" (in Japanese).

FIG. 14 shows an M_PERSON_CHARACTER database 273 that is provided to manage the characters of the persons appearing in the programs to be broadcast. An attribute ID of "003" is assigned to the M_PERSON_CHARACTER database 273. This database manages the characters of the persons appearing in the programs in association with corresponding character ID's for identifying the characters. The "character" of a person in this context signifies not only what is generally understood by the word "character" but also what specifically characterizes or represents that person as perceived by the viewer (i.e., user).

Illustratively, the character ID of "001" is associated with a character "presenter-like" in the M_PERSON_CHARACTER database 273 of FIG. 14. Whereas the example in FIG. 14 shows each character ID associated with a single word, each character ID may alternatively be associated with a number of words (similar words). Illustratively, although a character ID of "004" is associated with a character "friendly," that ID may alternatively be shown in conjunction with "friendly, neighborly," or other multiple words that are similar in meaning.

FIG. 15 shows an M_VIEW_TYPE database 274 that is provided to manage what is called a view type (i.e., the kind of preferred programs and the way the preferred programs are watched) of each user. An attribute ID of "004" is assigned to the M_VIEW_TYPE database 274. This database manages the view types of the users in association with corresponding view ID's for identifying these view types. Illustratively, a view ID of "001" is assigned to a view type described as "laughter-seeking type" in the M_VIEW_TYPE database 274 of FIG. 15.

FIG. 16 shows an M_KEYWORD database 275 that is provided to manage the keywords representative of broadcast programs. An attribute ID of "005" is assigned to the M_KEYWORD database 275. This database manages the keywords in association with corresponding keyword ID's for identifying the keywords. The "keyword" in this context signifies not only what is generally understood by this word but also what best characterizes a given program (e.g., program A) using one or a group of words. Illustratively, a keyword ID of "0000000001" is assigned to a keyword "information" in the M_KEYWORD database 275 of FIG. 16.

FIG. 17 shows an M_KEYWORD_1 database 276 that is provided to manage basically the same data as the above-described M_KEYWORD database 275. Compared with the M_KEYWORD database 275 in FIG. 16, the M_KEYWORD_1 database 276 manages an item "Reason" in association with corresponding keywords and keyword ID's. The words listed under the heading "Reason" are the words to be displayed illustratively in the reason display area 155 of the screen in FIG. 8; these are the words presented for the user to read.

The keywords under the heading "Keyword" are for use in such internal processes as matching. The words under the heading "Reason," on the other hand, are the words that were highly ranked during matching and are thus actually presented to the user as the reasons for the recommendation.

For example, a keyword "erotic" having a keyword ID of "0000000006" is fit for use in searches during matching. However, that particular word is not deemed appropriate to use in presenting recommended programs to the user. In such a case, a field of the area corresponding to the word "erotic" is left blank (null) to suppress display of the word under the heading "Reason."

As another example, a keyword "advantageous" having a keyword ID of "0000000008" may be fit to use in searching for preferred programs during matching, but presenting the user merely with the word "advantageous" supposedly explaining the recommended programs could be unhelpful and even incomprehensible to the user. In order to avert such potential inconvenience, an expression "advantageous information" is used under the heading "Reason" replacing the keyword "advantageous." This causes the expression "advantageous information" to be actually presented to the user in the display area while suppressing the keyword "advantageous" from display.

That is, establishing the additional item "Reason" makes it possible to use selectively two kinds of words: words for use in searches during matching, and words that are actually presentable to the user.

FIG. 18 shows an M_KEYWORD_2 database 277 that is provided to manage basically the same data as the above-described M_KEYWORD database 275. Compared with the M_KEYWORD database 275 in FIG. 16, the M_KEYWORD_2 database 277 manages an item "Display" in association with corresponding keywords and keyword ID's. The numerals listed under the heading "Display" are flags that determine whether or not each word listed under the heading "Keyword" should be presented to the user.

In the example of FIG. 18, the flag "1" specifies that the corresponding keyword is to be presented to the user, and the flag "0" designates non-presentation of the keyword to the user. Illustratively, a keyword "information" having a keyword ID of "0000000001" is presented as one reason for recommendation to the user, while a keyword "erotic" having a keyword ID of "0000000006" is not presented as such to the user.

One of the databases shown in FIGS. 16 through 18 need only be managed by the master database 251. For that reason, the same attribute ID of "005" is assigned to the databases given in FIGS. 16 through 18. Unless otherwise noted, the M_KEYWORD database 275 in FIG. 16 is assumed to be managed by the master database 251 for the description that follows.

FIG. 19 shows an M_AGE database 278 that is provided to manage the age groups of users. An attribute ID of "006" is assigned to the M_AGE database 278. This database manages "age names" each representative of each of the registered age groups, "start ages" each indicating the starting age of each age group, and "end ages" each denoting the ending age of each age group, all associated with corresponding age ID's.

Illustratively, an age ID of "001" is associated with an age name "From 0 to 4," with a start age of "0," and with an end age of "4" in the M_AGE database 278 shown in FIG. 19.

FIG. 20 shows an M_GENDER database 279 that is provided to manage the genders of users. An attribute ID of "007" is assigned to the M_GENDER database 279. This database manages the gender types of users in association with corresponding gender ID's each identifying a user's gender. Illustratively, a gender ID of "001" is associated with a gender type "male" in the M_GENDER database 279 shown in FIG. 20.

FIG. 21 shows an M_REASON database 280 that is provided to manage reasons; i.e., the words to be displayed in the reason display area 155 of the screen (FIG. 7 or 9). The M_REASON database 280 manages the words listed as reasons in conjunction with corresponding attribute ID's and value ID's. The attribute ID's are each assigned to a database for identification purposes. Illustratively, the attribute ID of "001" is assigned to the M_CATEGORY database 271 shown in FIG. 12.

The value ID's are ID's to be managed by each of the databases involved. These ID's include category ID's (FIG. 12), person ID's (FIG. 13), character ID's (FIG. 14), view ID's (FIG. 15), keyword ID's (FIG. 16), age ID's (FIG. 19), and gender ID's (FIG. 20). The reasons, as discussed above with reference to FIGS. 17 and 18, are the words to be displayed in the reason display area 155 (FIGS. 7 and 8).

Illustratively, if the attribute ID for the M_REASON database 280 in FIG. 21 is "001," that ID number points to the M_CATEGORY database 271. If the value ID is "1000," the category ID of the M_CATEGORY database 271 is "1000." Furthermore, if the reason represented by the attribute ID of "001" and value ID of "1000" of the M_REASON database 280 is to be offered to the user, the word "sport" listed under the heading "Reason" is actually presented to be user.

The M_REASON database 280 is established by bringing the databases shown separately in FIGS. 12 through 19 (except for the ones in FIGS. 17 and 18) into a single entity so as to control the words to be displayed in the reason display area 155 (FIG. 8). Such control is needed primarily because of the concern for decorum as discussed above. It is not appropriate to present some words as they are to the user. These words should be properly dealt with prior to their presentation to the user.

For example, the word "erotic" was cited above as an inappropriate word to present to the user. That word is managed by the M_KEYWORD database 275 shown in FIG. 16, with the keyword ID of "0000000006" assigned to the word. Because the attribute ID of "005" is given to the M_KEYWORD database 275, reference is made to that field in the M_REASON database 280 of FIG. 21 which is furnished with the attribute ID of "005" and value ID of "0000000006." The reference reveals the absence of an applicable field; i.e., the field has been erased. The absence of the corresponding description in the M_REASON database 280 signifies that the word deemed inappropriate will not be presented to the user.

That is, with control properly exercised over the M_REASON database 280, the controlled absence of the description of specifically selected words translates into their non-presentation to the user.

The word "advantageous" was cited above as another word not appropriate to present to the user. This word is managed in the M_KEYWORD database 275 shown in FIG. 16 and is given the keyword ID of "0000000008." Because the attribute ID of "005" is given to the M_KEYWORD database 275, reference is made to that field in the M_REASON database 280 of FIG. 21 which is furnished with the attribute ID of "005" and value ID of "0000000008." The reference reveals an expression "advantageous information" in the corresponding field. The inclusion of the expression "advantageous information" in the M_REASON database 280 signifies that when the keyword "advantageous" is to be offered to the user, the expression "advantageous information" is actually presented to the user.

That is, the controlled inclusion in the M_REASON database 280 of the words desired to be shown to the user translates into these words being actually presented to the user in place of the corresponding keywords that are not presentable to the user as they are.

Where broadcast programs are recommended to users, there can be diverse reasons or keywords characterizing the highly scored (i.e., matched) programs to be recommended in view of the users' preferences. These keywords may include words suitable only for adults, monosyllabic and unintelligible words, rarely used words, too-common worn-out words, and words incomprehensible as reasons for recommendation. Any of these words will not be fit for use as a reason for recommendation to the user. The inventive scheme permits a high degree of flexibility in presenting the user with alternative words or expressions taking the place of the unpresentable keywords.

Because the M_REASON database 280 is provided to control the display of the reasons for recommendation, it is possible to display indications different from those based on the master databases shown in FIGS. 12 through 20. Illustratively, morphological analyses may derive the reason for recommending "romantic" from all values representing such diverse words as "love," "affection" and "attachment," for subsequent presentation to the user.

When the M_REASON database 280 is managed by the master database 251 for the above type of data control, there is another benefit available in addition to what has been described above; i.e., flexible control over the words to be presented to the user. This additional benefit is described below with reference to FIGS. 22 and 23.

Figure 22:
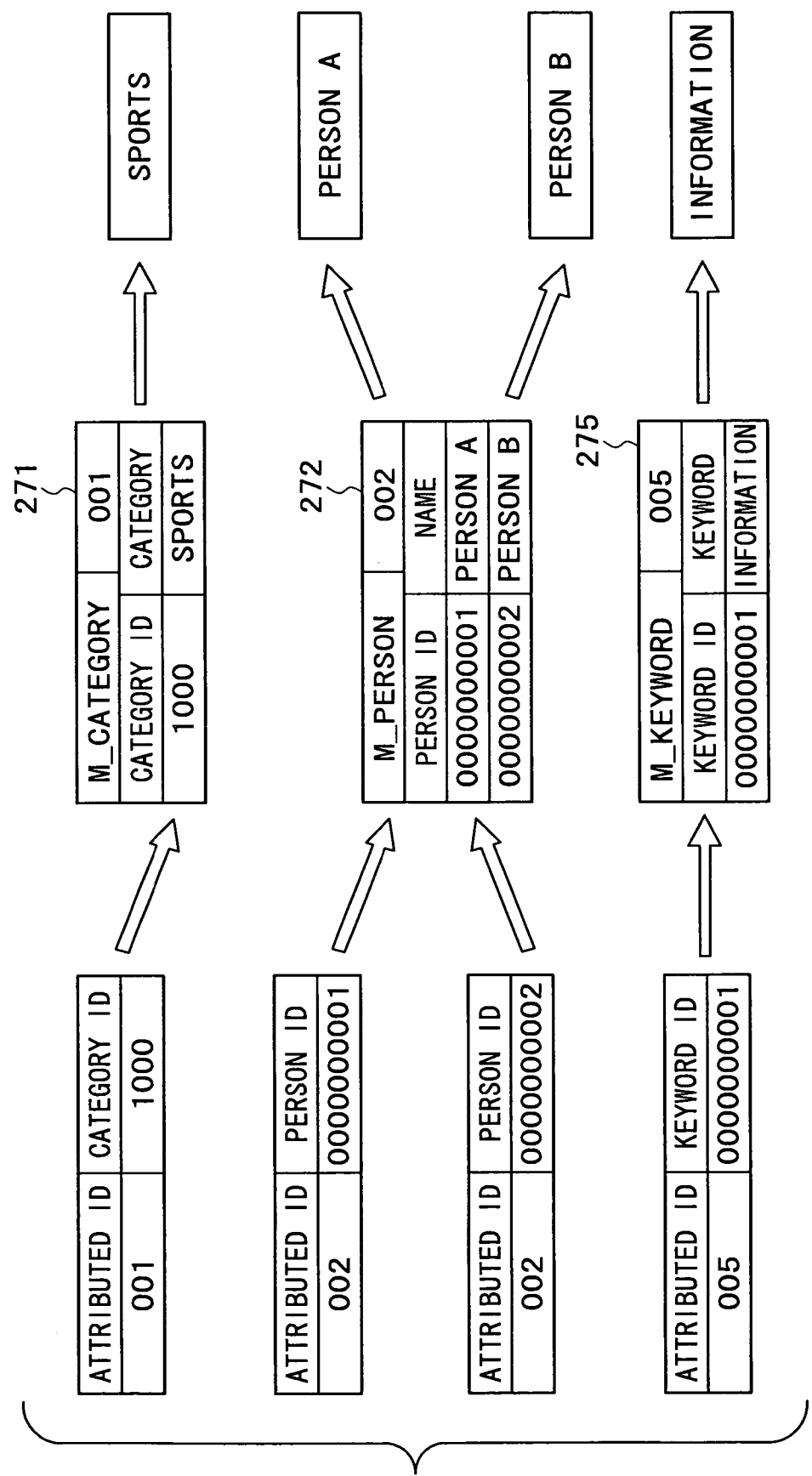
FIG. 22 is an explanatory view of processes for retrieving information from a master database.
Figure 23:
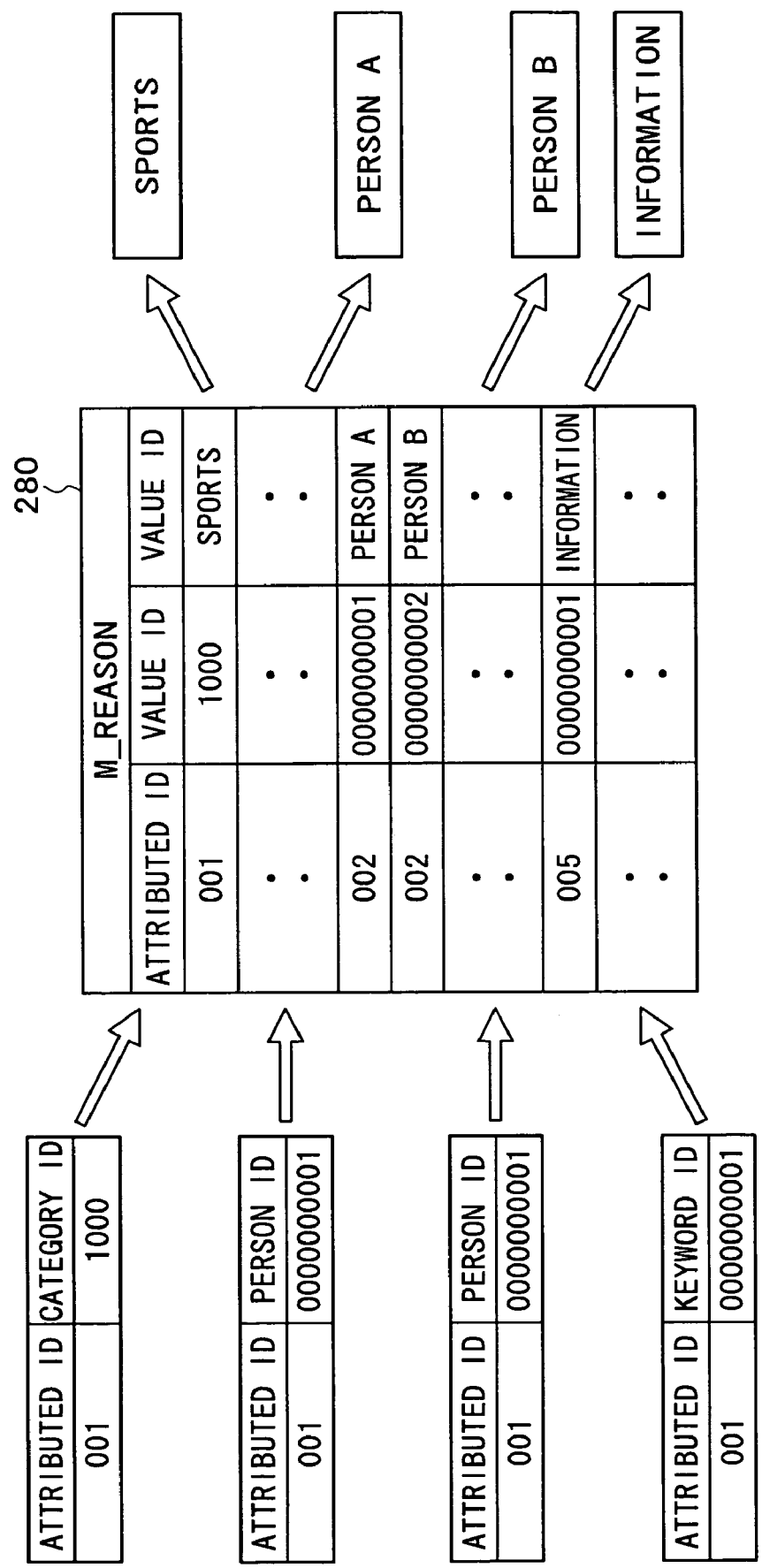
FIG. 23 is an explanatory view of other processes for retrieving information from the master database.

Referring to FIGS. 22 and 23, suppose that the user is to be presented with a word having the attribute ID of "001" and category ID of "1000" (target word A), a word having the attribute ID of "002" and person ID of "0000000001" (target word B), a word having the attribute ID of "002" and person ID of "0000000002" (target word C), and a word having the attribute ID of "005" and keyword ID of "0000000001" (target word D).

On the above assumption, if the M_REASON database 280 is absent and only the databases in FIGS. 12 through 20 (except the ones in FIGS. 17 and 18) exist, then searches are made illustratively as follows. A search is first made for the target word A through the M_CATEGORY database 271 (FIG. 12) having the attribute ID of "001." The search retrieves the word "sport" having the category ID of "1000." Likewise, a search is made for the target word B through the M_PERSON database 272 (FIG. 13). The search retrieves the word "person A" having the person ID of "0000000001."

Similarly, a search is made through the M_PERSON database 272 for the target word C, whereby the word "person B" is retrieved. A search for the target word D through the M_KEYWORD database 275 retrieves the word "information."

As described, the searches for the four target words require referencing three databases.

By contrast, if the M_REASON database 280 is provided, then searches are illustratively made as described below with reference to FIG. 23. The M_REASON database 280 is first referenced to make a search for the target word A. In the M_REASON database 280, the location identified by the attribute ID of "001" and value ID of "1000" is referenced. The reference retrieves the word "sport." In like manner, the M_REASON database 280 is referenced to make searches for the target words B, C and D, whereby the applicable words are retrieved.

In the case above, a single database need only be referenced to search for the four target words.

As described, where the M_REASON database 280 is provided, there is no need to reference a number of databases for searches. Because the M_REASON database 280 alone needs to be referenced, it takes considerably less time to carry out the searches than before. This translates into an appreciably reduced time period from the time the user requests a recommendation screen until the requested recommendation screen is returned to the user. The ability to reduce response time can be a powerful tool for a system required to respond to requests on a real-time basis.

In the manner described, the master database 251 manages data that are needed to create both EPG data and recommendation screens.

The target database 252 (FIG. 11) will now be described. The target database 252 is made up of data for matching users' preferences with broadcast programs in creating recommendation screens and of data for implementing a learning function by which to increase the entries of user preferences in more detail.

FIG. 24 shows a T_PERSON_TARGET_GENDER database 311 that is provided to manage data for numerically scoring varying degrees of popularity of the persons appearing in broadcast programs with regard to users of different genders. Specifically, the T_PERSON_TARGET_GENDER database 311 manages person ID's and gender ID's in association with corresponding scores. The person ID's are the same as those managed by the M_PERSON database 272 shown in FIG. 13. Illustratively, the person ID of "0000000001" represents "person A."

The gender ID's are the same as those managed by the M_GENDER database 279 shown in FIG. 20. Illustratively, the gender ID of "001" denotes "male." Each of the scores represents a weight of the person identified by the corresponding person ID in terms of the popularity varying with the gender of the user. For example, if the person A is known to be popular with males, then the person's score is raised or lowered depending on whether the user in question is male.

High scores are set with the intention of raising the possibility that the corresponding persons are popular enough to be detected during a matching process. Low scores are set with a view to reducing the possibility of the corresponding persons getting picked up during matching. Such low settings are intended illustratively to bypass those persons who may be too popular or too exposed for the user to watch with appreciation. The scores are established by taking into consideration the policy of an EPG administrator, the demographics of users (their genders, their generations, etc.), and the operation loads on the system.

Other target databases may also manage numeric data with regard to other targeted factors. These factors may be given high or low scores by taking into account what has been discussed above.

FIG. 25 shows a T_PERSON_TARGET_AGE database 312 that is provided to manage data for numerically scoring varying degrees of popularity of the persons appearing in broadcast programs with regard to users of different age groups. Specifically, the T_PERSON_TARGET_AGE database 312 manages person ID's and age D's in association with corresponding scores. The person ID's in the database 312 are the same as those managed by the M_PERSON database 272 shown in FIG. 13.

The age ID's in the database 312 are the same as those managed by the M_AGE database 278 shown in FIG. 19. Illustratively, the age ID of "001" represents the age group of "From 0 to 4." Each of the scores represents a weight of the person identified by the corresponding person ID in terms of the popularity varying with the age group of the user. For example, if the person A is known to be popular with people in the age group of "From 0 to 4," then the person's score is raised or lowered depending on whether the user in question belongs to that age group.

FIG. 26 shows a T_PERSON_VIEW_TYPE database 313 that is provided to manage data for numerically scoring varying degrees of popularity of the persons appearing in broadcast programs with regard to users of different view types. Specifically, the T_PERSON_VIEW_TYPE database 313 manages person ID's and view ID's in association with corresponding scores. The person ID's are also the same as those managed by the M_PERSON database 272 shown in FIG. 13.

The view ID's in the database 313 are the same as those managed by the M_VIEW_TYPE database 274 shown in FIG. 15. Illustratively, the view ID of "001" represents "laughter-seeking type." Each of the scores represents a weight of the person identified by the corresponding person ID in terms of the popularity varying with the view type of the user. For example, if the person A is perceived to be popular with people of the laughter-seeking type (e.g., if the person A is frequently called on to appear in vaudevilles), then the person's score is raised or lowered depending on whether the user's view type is the laughter-seeking type.

FIG. 27 shows a T_PERSON_CHARACTER database 314 that is provided to manage data for numerically scoring diverse characters of the persons appearing in broadcast programs. Specifically, the T_PERSON_CHARACTER database 314 manages person ID's and character ID's in association with corresponding scores. The person ID's are also the same as those managed by the M_PERSON database 272 shown in FIG. 13.

The character ID's in the database 314 are the same as those managed by the M_PERSON_CHARACTER database 273 shown in FIG. 14. Illustratively, the character ID of "001" represents a "presenter-like" character. Each of the scores represents a value (weight) of the person identified by the corresponding person ID with respect to the character defined by the corresponding character ID. For example, if the person A is perceived to have the presenter-like character frequently presiding over variety shows and similar programs, that person is scored high or low with respect to the "presenter-like" character.

FIG. 28 shows a T_PRG_VALUE database 315 that is provided to manage specific programs in association with corresponding items. More specifically, the T_PRG_VALUE database 315 manages program ID's, attributes, and value ID's in associated relation to one another. The program ID's are identifiers assigned to broadcast programs for identification purposes.

The attributes are data that identify the databases. Attribute ID's may take the place of the attributes. The value ID's are the same as those managed by the M_REASON database 280 shown in FIG. 24. Illustratively, the attribute ID of "002" (i.e., pointing to "person" as the attribute) and the value ID of "1000" signify "person A." In this manner, the T_PRG_VALUE database 315 is used as the database to associate with one another particular programs, the persons appearing in these programs, and the keywords that characterize the programs.

FIG. 29 shows a T_PRG_VALUE database 316 that is provided to manage weight values for broadcast programs. The T_PRG_VALUE database 316 is a variation of the T_PRG_VALUE database 315 in FIG. 28 supplemented with the entries of related scores. It should be noted that the T_PRG_VALUE database 316 shown in FIG. 29 manages attribute ID's instead of attributes.

Illustratively, a broadcast program having a program ID of "1000000030000029" assigned thereto is given a score of "0.65193365995972070000" for the attribute ID of "001" and value ID of "1000" in the T_PRG_VALUE database 316 shown in FIG. 29.

The values of the scores are used in a scoring process. Because each score value is acquired uniquely from the combination of an attribute ID and a value ID, there is no need to determine which attribute ID-and-value ID combination is related to which word. Still, an example is given here for purpose of explanation. Reference to the M_REASON database 280 in FIG. 21 for the attribute ID of "001" and value ID of "1000" reveals the reason "sports." In this case, the program whose program ID is "1000000030000029" has the score of "0.65193365995972070000" for the factor "sports." Because the T_PRG_VALUE database 316 includes a number of attribute ID's, retrieving their respective factors requires referring to a number of corresponding master databases. If the M_REASON database 280 is provided, the necessary factors can be detected by referencing the M_REASON database 280 only. Since the M_REASON database 280 has no keywords that are inappropriate to present to the user (i.e., they have been deleted), referencing the M_REASON database 280 as needed does not retrieve such nonexistent words. If any of these keywords are necessary for the current processing, relevant master databases other than the M_REASON database 280 will have to be referenced.

FIG. 30 shows a T_UM_VALUE database 317 that is provided to manage user preference data. The T_UM_VALUE database 317 manages member ID's, UM type ID's, attribute ID's, value ID's, and scores in associated relation with one another. The member ID's are identifies assigned to the registered users for identification. Each of the UM type ID's indicates the basis on which the corresponding factor is established. The "basis" in this case may be registration, learning, and filtering.

For example, the attribute ID of "001" and value ID of "1000" on the first line in FIG. 30 point to the factor "sports" in the M_REASON database 280 in FIG. 21. If the user has registered the factor "sports" as one of his or her preferences, then the UM type ID for the preference is set to "1" in the T_UM_VALUE database 317 in FIG. 30.

As another example, the attribute ID of "001" and value ID of "1001" on the second line in FIG. 30 point to the factor "sport: baseball" in the M_REASON database 280 in FIG. 21. If the factor "sport: baseball" has been established as one of the user's preferences following analyses of the broadcast programs frequently watched by the user in question, then the UM type ID for the preference is set to "2" in the T_UM_VALUE database 317 in FIG. 30.

As yet another example, the attribute ID of "002" and value ID of "0000000001" on the third line in FIG. 30 point to the factor "person A" in the M_REASON database 280 in FIG. 21. If the factor "person A" has been established as one of the user's preferences following a filtering process, to be described later, then the UM type ID for the preference is set to "3" in the T_UM_VALUE database 317 in FIG. 30.

With this embodiment of the present invention, as described, the factors used to detect the programs to be recommended to the user are established by three processes: the process of preference registration by the user, the process of learning the user's preferences, and a filtering process. All of these processes are used to determine the user's preferences in more detailed fashion so as to present the user with recommended programs more suitable to his or her taste. Illustratively, if solely the process for registration of preferences by the user is adopted, the user alone cannot register a large number of factors. If up to, say, 30,000 factors were to be registered, only a small fraction of them could be determined by the user as his or her preferences; it is practically impossible (i.e., possible but very tiring) for the user to register all these numerous factors as the user's preferences.

Illustratively, the user may set a broad category such as "sports" (with attribute ID of "001" and value ID of "1000") but may not bother to define further details such as "baseball." However, even if the user designates only the factor "sports," the learning function of the embodiment may determine that the user frequently watches baseball games. In that case, the learning function will add a factor "sport: baseball" (with attribute ID of "001" and value ID of "1001"). The filtering function of the embodiment, to be discussed later, takes care of more factors that have been neither registered by the user nor established by the learning function.

The registration, learning, and filtering processes determine the factors as described. However, it is generally preferable that the factors registered by the user be considered more important than those set by the other processes and that the factors established by the learning process be given more importance than those set by the filtering process. This kind of weighting can be controlled by varying the values of the scores in the T_UM_VALUE database 317 shown in FIG. 30.

The databases explained above with reference to FIGS. 22 through 30 are managed by the target database 252.

How the T_PRG_VALUE database 315 is created will now be described by referring to the flowchart of FIG. 31. The process of the flowchart in FIG. 31 is carried out when EPG data have been prepared; i.e., after each program to be broadcast is determined, the persons (cast) appearing in that program are selected, and other necessary data for preparing EPG are completed. Execution of the steps constituting the flowchart in FIG. 31 is taken over by the target information meta-data management function 237 (FIG. 10) implemented by the CPU 201 (FIG. 9) of the server 52. These steps may alternatively be performed manually by an administrator who also enters necessary data. In this example, it is assumed that the process of FIG. 31 is executed by the CPU 201. The steps in other flowcharts will also be carried out by the CPU 201 (implementing its relevant functions) unless otherwise noted.

In step S31, the CPU 31 acquires data to be added to the T_PRG_VALUE database 315. The data acquired in step S31 are T_PRG_VALUE data corresponding to the factors of the program, such as the cast and keywords relevant to the program. Each of the factors is primarily a piece of information to be displayed in EPG (FIG. 6). This kind of data needed to create an EPG is provided by the party that creates that EPG.

Figure 32:
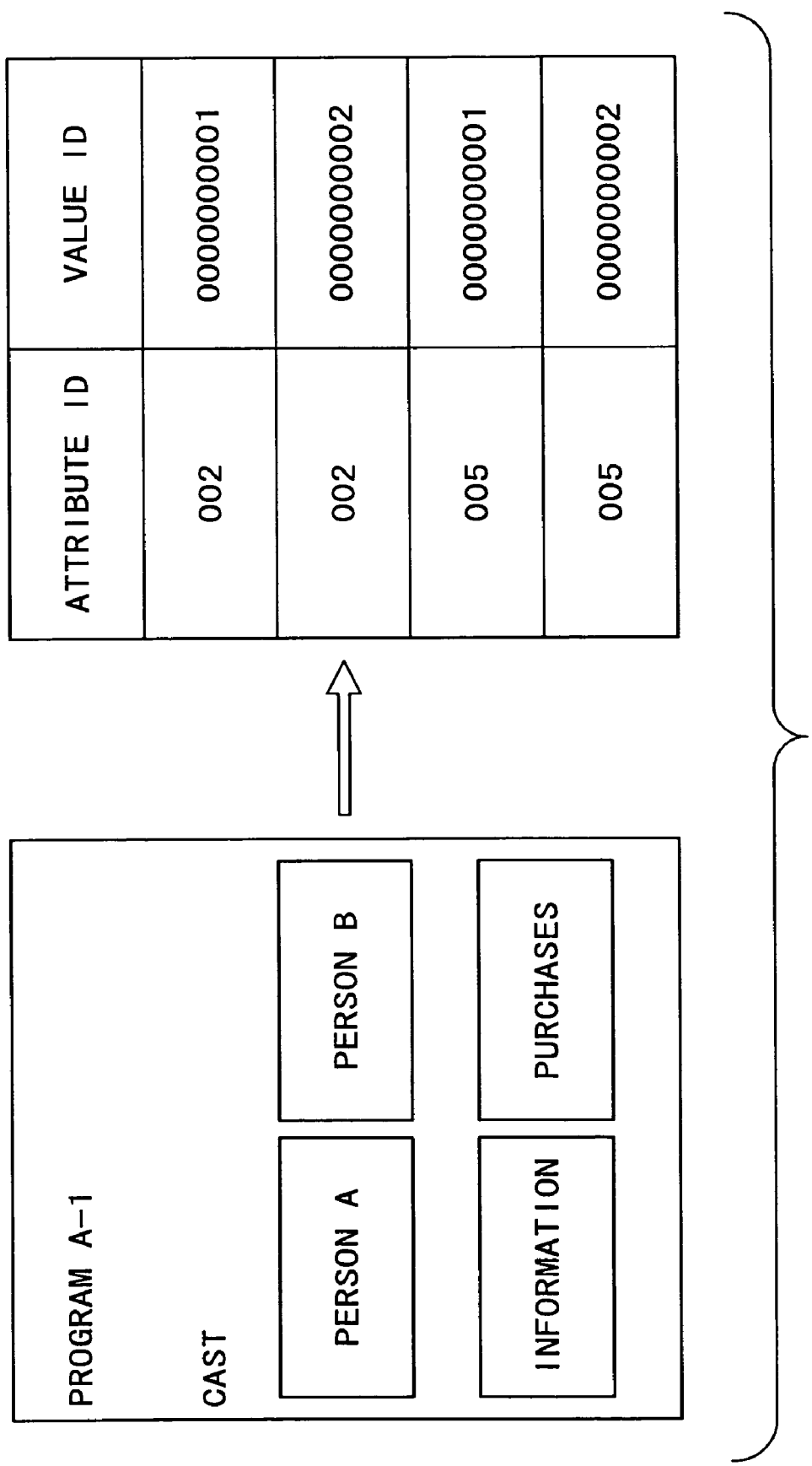
FIG. 32 is an explanatory view of information for display in relation to data about that information.

Suppose now that EPG such as one shown in FIG. 32 is to be offered to the user. The EPG of FIG. 32 indicates a program name "program A-1 " with cast names "person A" and "person B" shown below. Under the cast names are two keywords, "information" and "purchases." To display this type of EPG requires preparing other information. That is, a combination of the attribute ID of "002" and value ID of "0000000001" is needed to display "person A," and similar combinations of attribute ID's and value ID's are needed to display "person B," "information," and "purchases."

The information shown on the right-hand side of FIG. 32 is acquired in step S31. The data involved are derived from the T_PRG_VALUE database 315 shown in FIG. 28. Specifically, the relevant data are retrieved from the T_PRG_VALUE database 315. In step S32, the attribute data related to the factors obtained in step S31 and the scores corresponding to the attribute data are acquired from map data. The map data refer to the databases managed by the target database 252.

In step S33, the T_PRG_VALUE scores of the cast and relevant keywords are multiplied by the scores obtained from the map data acquired in step S32, and the products are established as the scores of the attribute data. In step S34, the scores thus established are each added to and stored in the T_PRG_VALUE database 316 as a factor. Every time a factor is added, that factor is assigned an attribute ID corresponding to its attribute. The factor is also given a value ID for uniquely identifying the attribute defined by the master data about the attribute.

The foregoing description has shown how the T_PRG_VALUE database 316 of FIG. 29 is created.

How the T_UM_VALUE database 317 in FIG. 30 is created will now be described. When the T_UM_VALUE database 317 was discussed above with reference to FIG. 30, the factors of the database 317 were shown to be established by the three processes: registration, learning, and filtering. Below is a description of how each factor is added through the process of registration by the user, with reference to the flowchart of FIG. 33. The steps to create the T_UM_VALUE database 317 are carried out by the user model management function 235, one of the functions implemented by the CPU 201.

In step S51, the CPU 201 acquires data to be added to the T_UM_VALUE database 317. The data acquired in step S51 are composed of T_UM_VALUE data about the factors such as the cast and keywords regarding the preferences of the user (i.e., viewer) currently subject to editing. In step S52, the attribute data related to the factors obtained in step S51 and the scores corresponding to the obtained factors are acquired from the map data.

In step S53, the T_UM_VALUE scores of the cast and relevant keywords are multiplied by the scores obtained from the map data acquired in step S52, and the products are established as the scores of the attribute data. In step S54, the scores thus established are each added to and stored in the T_UM_VALUE database 317 as a factor. Every time a factor is added, that factor is assigned an attribute ID corresponding to its attribute. The factor is also given a value ID for uniquely identifying the attribute defined by the master data about the attribute.

The foregoing description has shown how the T_UM_VALUE database 317 in FIG. 30 is created in part following the process performed by the user to register the factors.

How factors are added to the T_UM_VALUE database 317 by the process of learning will now be described with reference to the flowchart of FIG. 34. In step S71, the data about a particular program viewed (or reserved for unattended recording) by the user are read from the log database 253 (FIG. 11). The log database 253 manages at least member ID's for identifying member users on the one hand, and program ID's for identifying the programs viewed by the users on the other hand, in associated relation with one another.

In step S71, as mentioned, the data about the program viewed by the user are obtained. More specifically, the member ID of the user in question is first acquired. Based on the member ID, the program ID of the program utilized by the user is retrieved from the log database 253. With the program ID obtained, the T_PRG_VALUE database 316 is referenced to search for a T_PRG_VALUE score of each of the factors corresponding to the obtained program ID.

Figure 35:
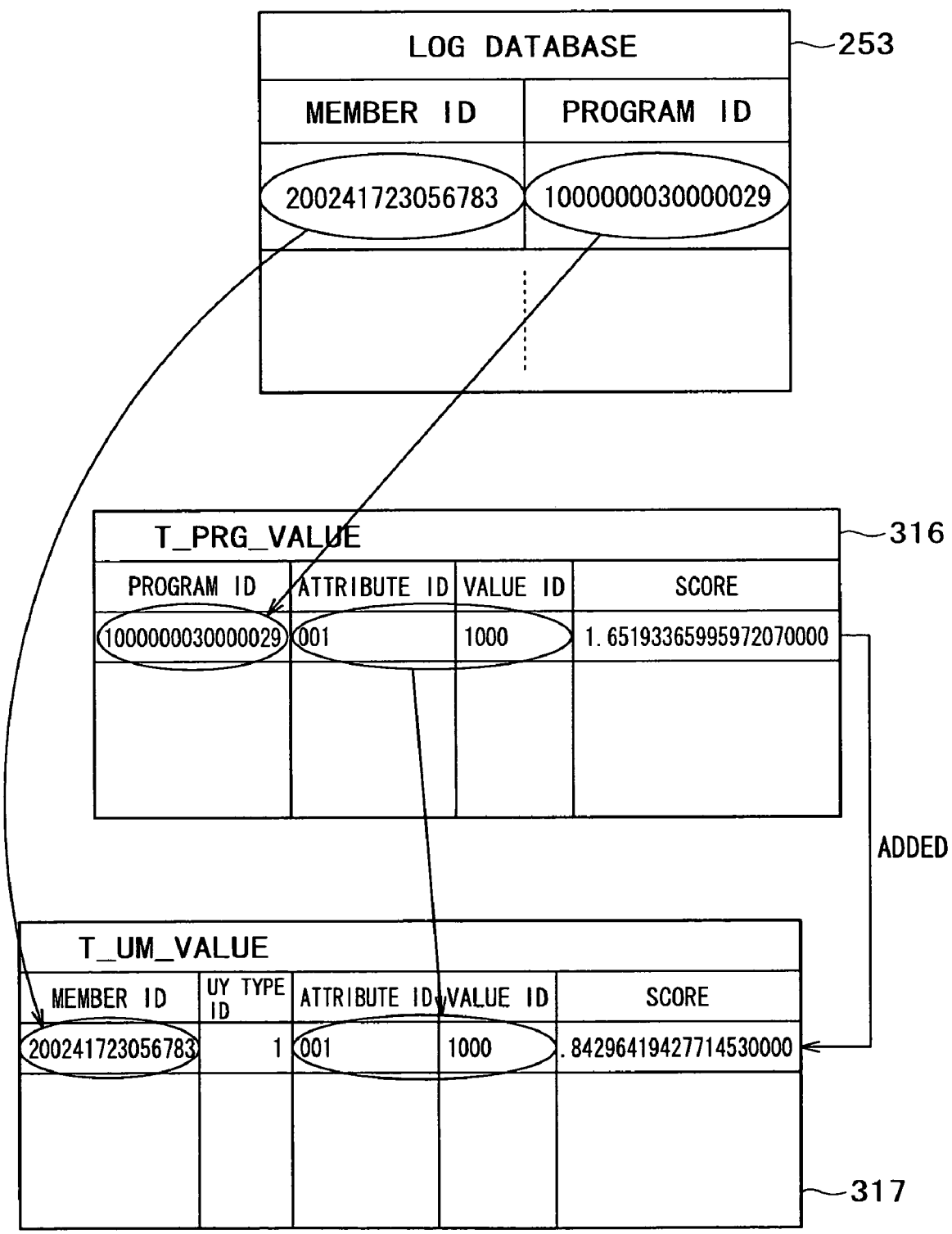
FIG. 35 is an explanatory view of processes for changing a score.

In step S72, the acquired T_PRG_VALUE score is added to a T_UM_VALUE factor having the same attribute ID and the same value ID. This step is described below in more detail with reference to FIG. 35. It is assumed here that the log database 253 contains a member ID of "200241723056783" and a program ID of "1000000030000029." When the data are retrieved from the log database 253, a factor having the same program ID is first read from the T_PRG_VALUE database 316 accordingly. In the example of FIG. 35, the factor having the attribute ID of "001," value ID of "1000," and a score of "1.65193365995972070000" is read from the database 316.

Thereafter, a check is made to determine whether the T_UM_VALUE database 317 contains any factor matching with the retrieved attribute ID and value ID. As shown in FIG. 35, if a matching factor exists, the score of that factor ("0.84296419427714530000" in this example) is retrieved. To the retrieved score is added the score previously read from the T_PRG_VALUE database 316 ("1.65193365995972070000" in this case). Alternatively, the addition may be supplemented by a multiplication of a predetermined value (i.e., by weighting).

As described, every time the user views (or reserves for unattended recording) a program, the scores of the relevant factors are changed in the T_UM_VALUE database 317. That is, the system learns to get a better picture of each user's preferences.

In the example of FIG. 35, the T_UM_VALUE database 317 is shown containing the factor that matches the attribute ID and value ID retrieved from the T_PRG_VALUE database 316. It might happen, however, that the database does not have a matching factor. For example, a "person A" appearing in the program viewed by a user A may not be found in the T_UM_VALUE database 317 corresponding to that user A.

Figure 36:
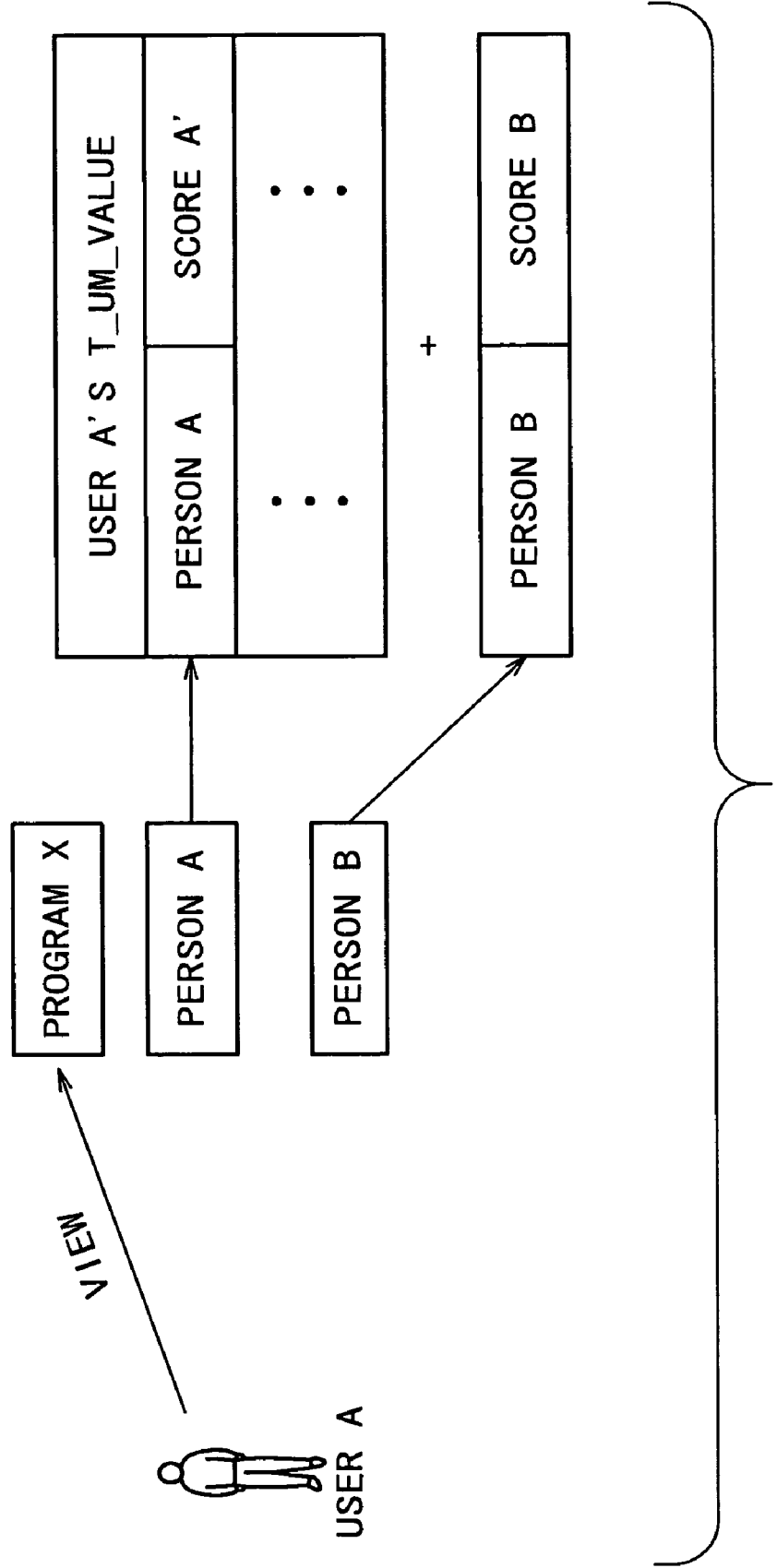
FIG. 36 is an explanatory view of processes for adding factors.

In such a case, a new factor is added to the T_UM_VALUE database 317. How this is accomplished will now be described by referring to FIG. 36.

Suppose that the user A viewed a program X in which the person A and a person B appeared; that the user A has a preference for the person A and has frequently viewed programs in which the person A appeared but has no knowledge of the person B and has never viewed programs in which the person B appeared except the program X. In that case, the T_UM_VALUE database 317 for the user A already has a "score A" relevant to the person A. That score is supplemented with a new value to become a "score A'."

Meanwhile, no factor about the person B exists in the T_UM_VALUE database 317 for the user A. This requires adding to the database a new factor regarding the person B.

While the new factor about the person B appearing in the same program as the person A was shown added to the database 317 in the above example, it is also possible to supplement the database with such factors as the character and the view type of the person A. If the character and view type of the person A already exist in the database, their score values will obviously have to be changed through additions or other manipulations to the existing scores.

Illustratively, it might happen that the program X which was viewed by the user A and in which the person A appeared was a variety show but that the person A usually appears in period dramas. In this case, the character of the person A is related (i.e., mapped) to a factor "period drama." Thus, even if the program X viewed by the user A was a variety show, the above-mentioned process raises the score value of the factor "period drama" associated with the person A so that period dramas may be more likely to be recommended to the user A from the next time onward.

If the person A has an attribute "sturdy," then a person C (not shown) having the same attribute "sturdy" has his or her factor added to the T_UM_VALUE database 317 for the user A. Naturally, if the person A has the attribute "sturdy" and if the T_UM_VALUE database 317 for the user A contains the factor "sturdy" already, the score of that factor is updated.

Although the person A and person B were assumed to appear in the program X above, the same procedure is carried out even if the person A alone appeared in the program X. It might happen that the person A and person B are related (i.e., mapped) to each other by a keyword (attribute) "period drama." In that case, at the time of the viewing by the user of the program X in which only the person A appeared, the person B mapped to the person A is retrieved from the database and the factor of that person B is added to it.

Through the learning process outlined above, either the factors related to the attributes of the program X and those of the person A are added anew to the T_UM_VALUE database 317, or the scores of these factors are updated.

When the user views or reserves programs for unattended recording, the score values involved are updated and new factors are added. The larger the number of samples taken, the more detailed the user preference data become. Using such data makes it possible to search for the recommended programs which are a better fit for the user's taste (i.e., programs preferred by the user).

Figure 37:
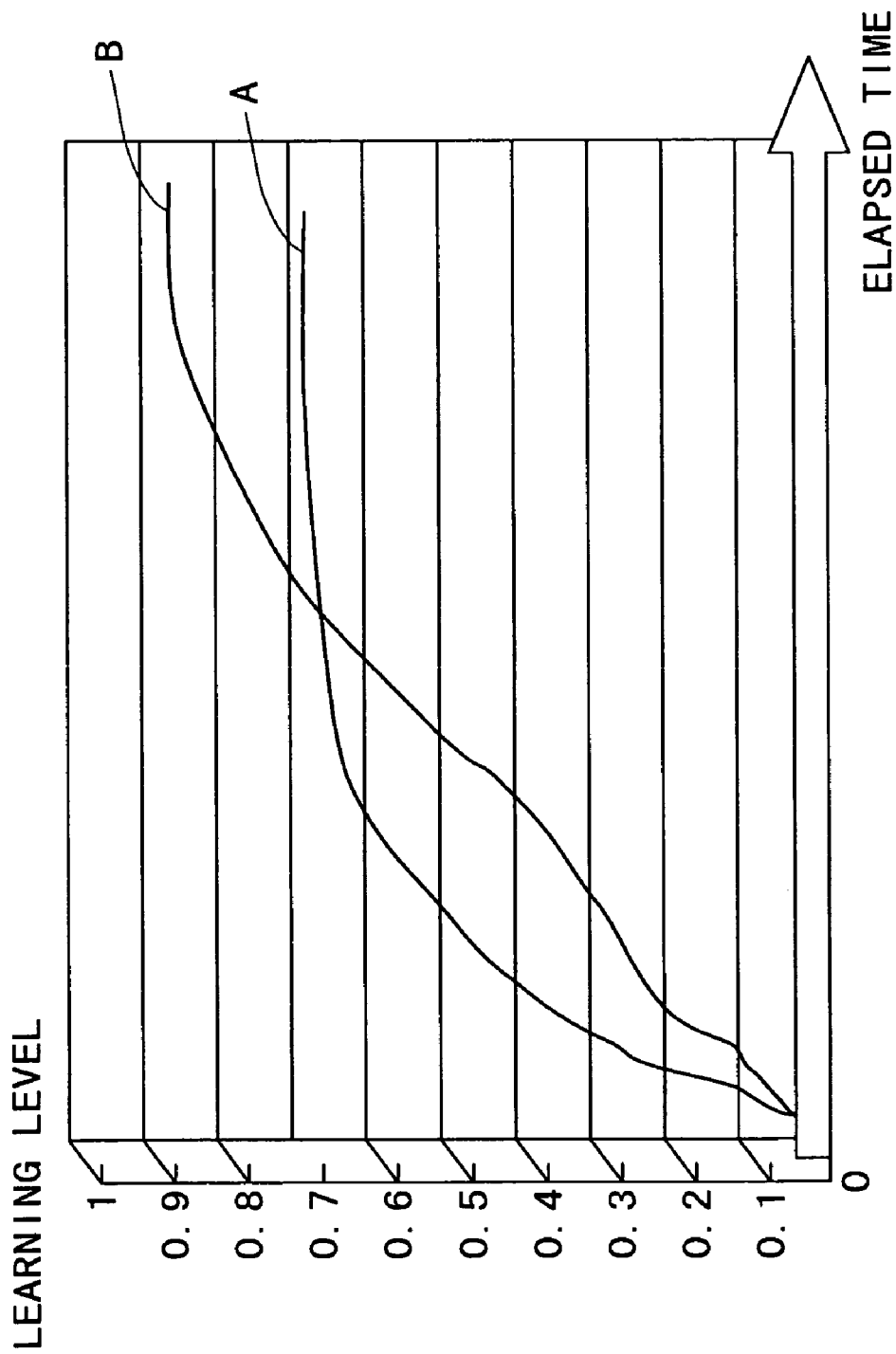
FIG. 37 is a graphical representation comparing two cases, one with a learning process and the other without the learning process.

FIG. 37 gives a graphic representation comparing two cases, one in which the above type of learning was performed and the other in which it was not carried out. Graph A shows the example in which programs were recommended on the basis of attributes, and graph B indicates the example in which programs were recommended based on detailed meta data only. As illustrated in FIG. 37, at an early stage of membership, (i.e., upon elapse of only a short period of time), the effectiveness of learning was more evident if programs were recommended based on attributes (graph A). Later, when a longer period of time elapsed, the effectiveness of learning was more conspicuous if programs were recommended on the basis of detailed meta data only (graph B).

With these results taken into account, the learning process is more effective for newly registered users in enhancing the reliability of their preference data in their early days as members. After a certain period of time (when a predetermined leaning level has been reached), the learning process may be discontinued (or may be reduced in frequency).

In any case, the learning process helps create highly reliable user preference data in the early days of users' membership. This makes it possible to recommend programs that satisfy each user's preferences at much earlier stages than before. When the registered users are more satisfied with recommended programs, they are appreciably less likely to withdraw (resign) from the service.

As mentioned above, there is the process of registration by the user in addition to the process of learning. One objective of these methods is to collect more accurate user preference data. The data to be collected (i.e., factors) concern primarily the kinds of TV broadcast programs and the cast of these programs, whereby the programs fit for each user's taste are selected and recommended.

The collected factors alone could serve the purpose. Preferably, however, information about each user's life style may also be collected and the factors based on such information may be taken into consideration when programs are to be recommended. Lifestyle in this context refers to the user's daily behavior, such as whether or not the user watches TV during the day. This kind of information can touch on users' privacy. To some users, it may not be clear whether such information is relevant to the recommendation of broadcast programs. These users may justifiably feel reluctant to disclose their private information that is seemingly unrelated to the service they are supposed to receive.

One way to collect such information is by resorting to questionnaires and fortune-telling. That is, the information should be collected in such a manner that the users will not notice they are submitting their private information. Each user may be encouraged to register his or her profile as if to play a game. In this manner, it is far easier for the party managing (collecting) the profile (the server 52 and the administrator, in this case) to collect each user's profile which yields the desired information.

The life style information serves as another factor in making searches for recommended programs. This also contributes to picking up broadcast programs that can better satisfy the user's preferences.

Described below is the process of filtering (or mining) performed on the T_UM_VALUE database 317. The filtering process is carried out primarily to display the item "interests of the users who have recorded the same program" in the reason display area 155 on the recommendation screen in FIG. 8. That display is effected under those circumstances and for those reasons which will be described below.

Figure 38:
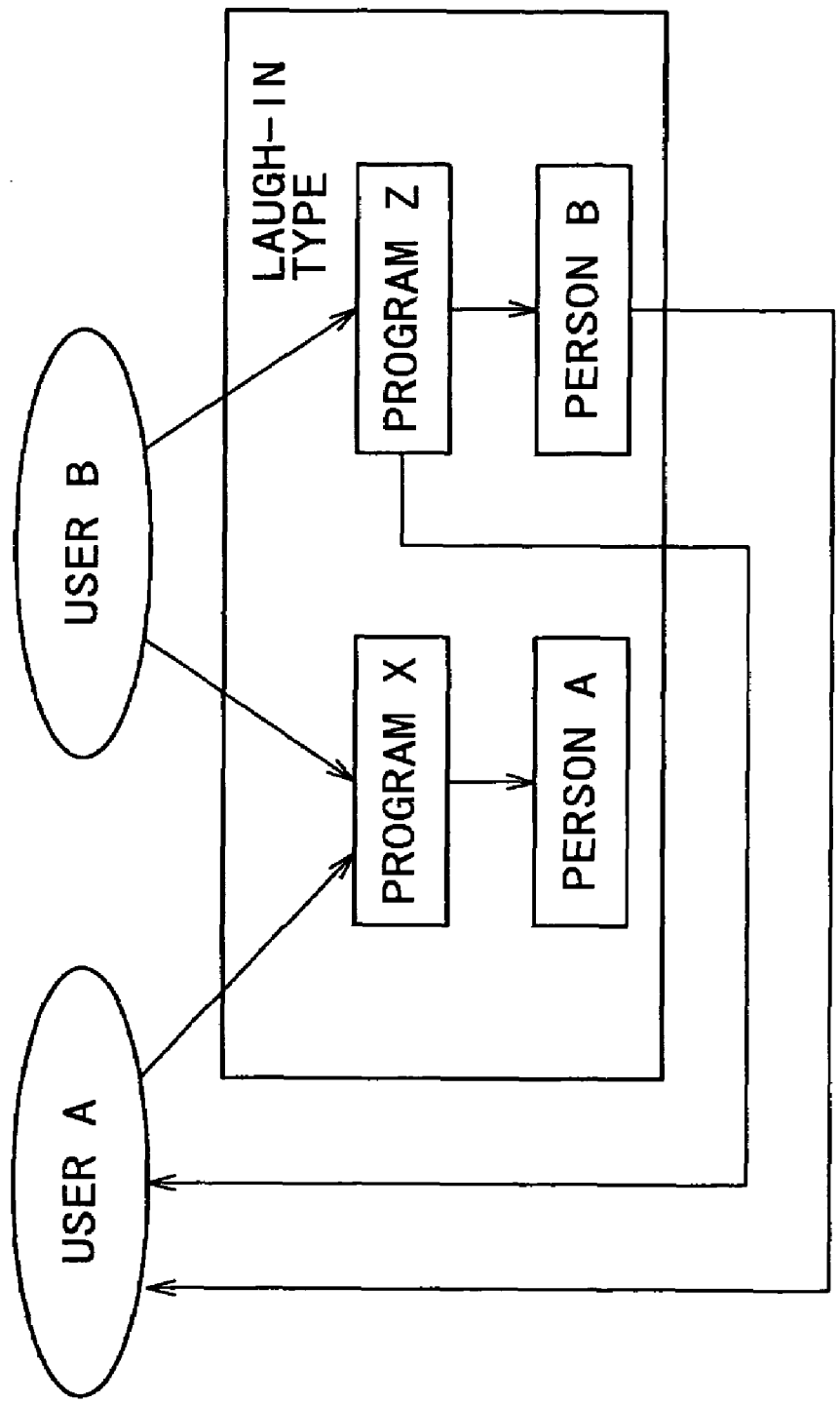
FIG. 38 is a schematic view explaining why a filtering process is carried out.

Referring to FIG. 38, suppose that the user A has reserved a program X for unattended recording and so has the user B. It is then surmised that the user A and user B are both interested in the program X. If the program X happens to be a comedy program, the two users are deemed interested in laugh-in type programs.

Suppose also that the user B has reserved another laugh-in type program Z, and that a person A appears in the program X while a person B appears in the program Z. In such a case, the program Z and the person B are not included in the logs of recording reservations made by the user A or in the user A's preference data (so that the program Z will not be recommended to the user A). However, the user A interested in laugh-in type programs is deemed to love the comedy-type program Z as well as the person B who falls in the category of comedians. In other words, the user A simply does not know the program Z and the person B, both potentially satisfying the user A's preferences.

In that case, the program Z reserved for unattended recording by the user B who has reserved the program X and the person B appearing in the program Z may be recommended to the user A. This enables the user A to recognize the program X and person B, so far unknown to the user A. Presenting each user with such new information useful and significant to the user in question raises the user's confidence in the information provided by the server 52.

In fact, a similar type of processing has already been practiced. For example, if a purchaser A buys a book A at a book-selling website, a book B bought by a purchaser B who purchased the same book A is recommended to the purchaser A. In such a case, the preferences of the purchaser A are not taken into account. The book B is recommended to the purchaser A simply because the purchaser B who bought the book B happened to have purchased the book A before the purchaser A.

Figure 39:
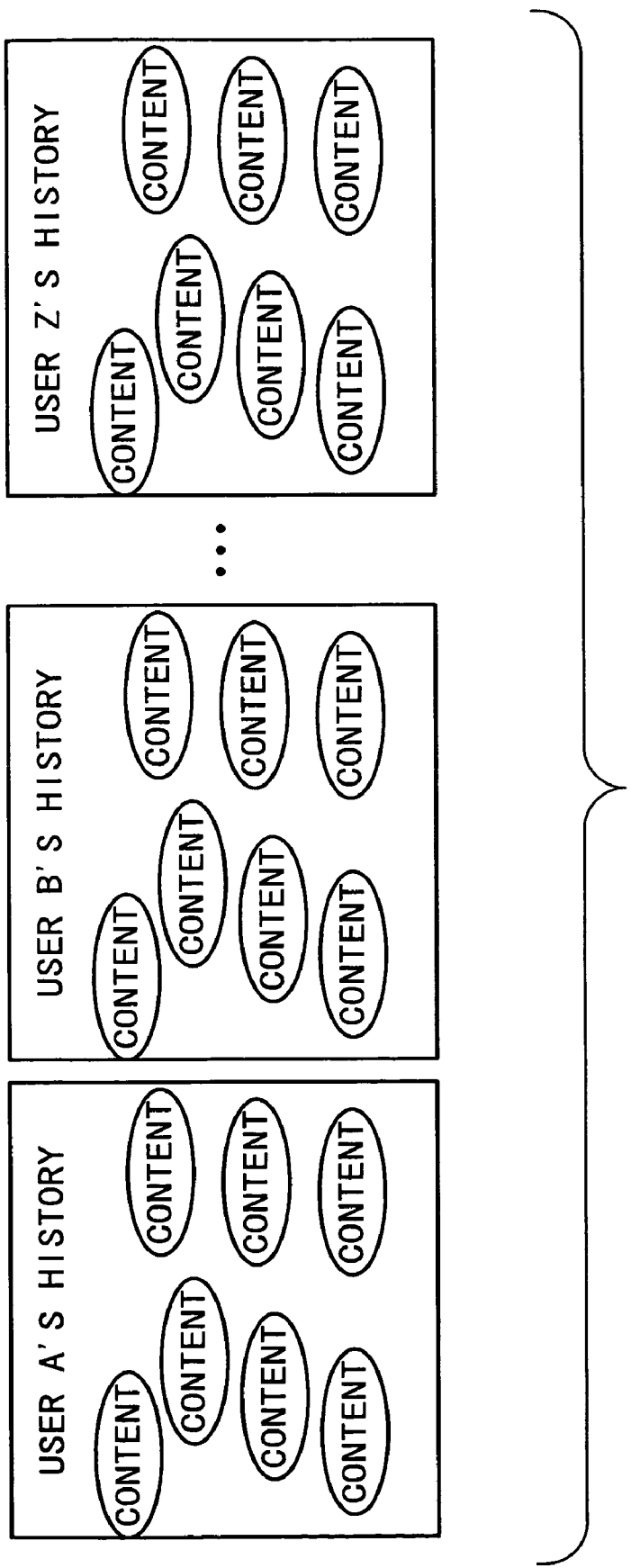
FIG. 39 is an explanatory view of processes for recommending certain content based on other users' histories.

The conventionally practiced recommendation above (one type of filtering) is compared here with the recommendation made by this embodiment of the present invention (another type of filtering), and the difference between the two is explained below. FIG. 39 is an explanatory view showing how the conventional filtering is carried out. It is assumed that histories of users A through Z having viewed programs (i.e., content) are managed as illustrated. On that assumption, if some content is to be recommended to the user A, a user group made up of the users B through Z is searched for the user or users who have frequently viewed the same content as the user A (i.e., a search is made for the user or users having a significantly high degree of similarity to the target user in terms of content use).

Of the items of content used by the user or users having the significantly high degree of similarity, the content yet to be viewed by the user A is then recommended to the user A.

By the conventional method outlined above, one problem is unavoidable: only those kinds of content (i.e., programs)

having been viewed by people with the significantly high degree of similarity to the target user can be recommended to that user.

Figure 40:
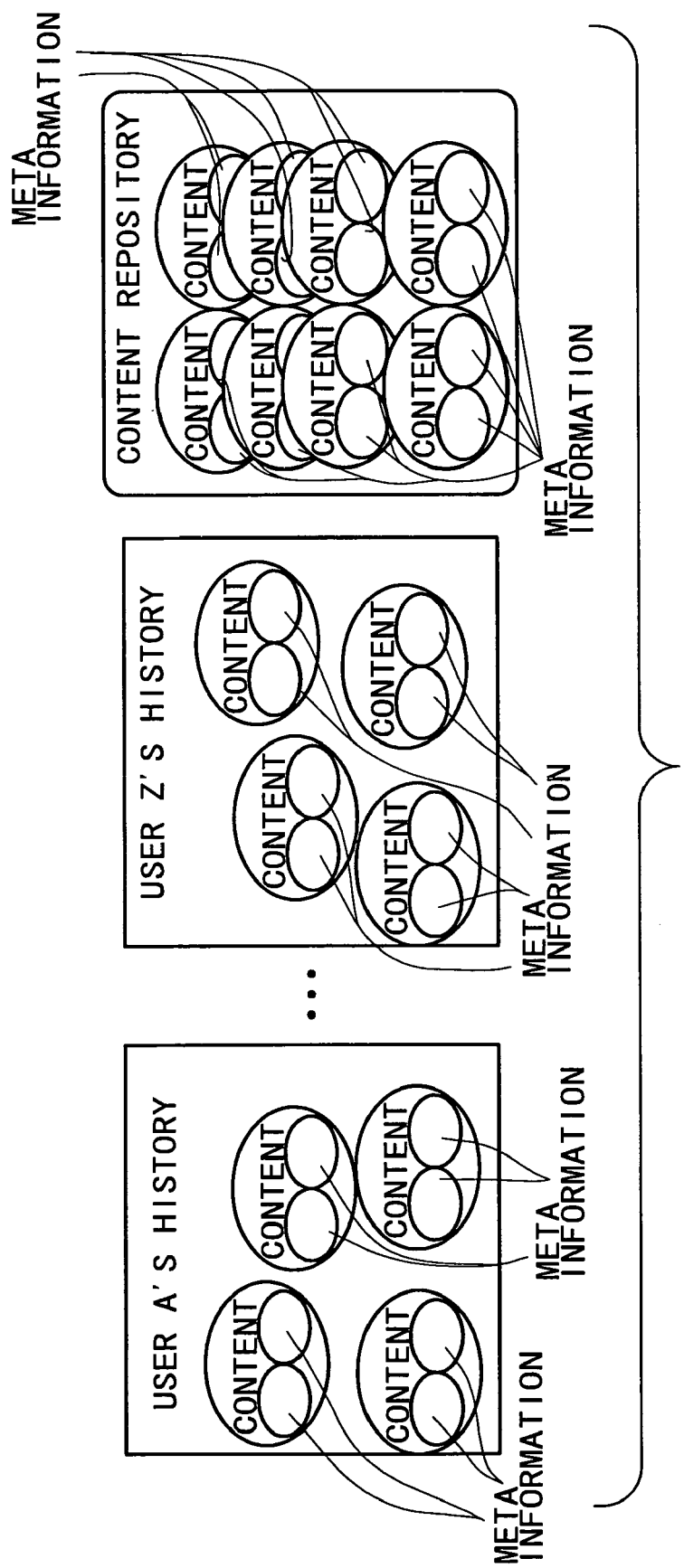
FIG. 40 is an explanatory view of other processes for recommending certain content based on other users' histories.

FIG. 40 is an explanatory view showing how filtering is performed by this embodiment of the present invention. It is assumed that histories of users A through Z having viewed programs (i.e., content) are also managed as illustrated. It should be noted that each history includes meta information about each item of viewed content and that a content repository is provided and placed under management. The content repository in this case refers to the data managed by the target database 252.

On that assumption, if some content is to be recommended to the user A, a user group made up of the users B through Z is searched for the user or users who have frequently used the same meta information (e.g., information containing cast names, keywords, etc.) as the user A. In other words, a search is made for the user or users having a significantly high degree of similarity to the target user in terms of meta information utilization (i.e., in terms of preferences). Through the meta information used by the user or users having the significantly high degree of similarity, a search is made for the information yet to be used or having been used only infrequently by the user A (i.e., persons, keywords, etc., yet to be recognized by the user A). The content (program) associated with the retrieved meta information is then read from the content repository and recommended to the user A.

When relevant information is presented in such manner, it is possible to recommend to the user in more suitable fashion the content that has not been re-used or the content that is offered only for a limited period of time, in addition to the commonly utilized content. Furthermore, using the degrees of similarity with regard to the keywords obtained from recommended content makes it possible to recommend other, hitherto-unrelated content.

The filtering process performed by this embodiment of the present invention will now be described with reference to the flowchart of FIG. 41. In step S91, the degree of similarity between users is calculated using the expressions (1) below:

$$Sim_{xy} = \frac{\sum_v (X_v - X_A) \cdot (Y_v - Y_A)}{\sqrt{\sum_v (X_v - X_A)^2} \cdot \sqrt{(Y_v - Y_A)^2}} \quad (1)$$

where, Xv stands for a user X's evaluation (score) about a value v, and XA denotes a mean value of the user X's scores. Likewise, Yv represents a user Y's score about the value v, and YA stands for a mean value of the user Y's scores. Making calculations using the expression (1) above provides a degree of similarity (T_UM_SIMILARITY) between the user X and the user Y. Relevant values managed by the T_UM_VALUE database 317 are substituted into the expression (1) above.

When the above calculations are completed in step S91, step S92 is reached. In step S92, a predicted vector is calculated. The predicted vector of the user X regarding the value v is computed using the expression (2) below:

$$ExpectX_v = X_A + \frac{\sum_N (N_v - N_A) Sim_{XN}}{\sum_N |Sim_{XN}|} \quad (2)$$

where, XA stands for a mean value of the user X's scores; N denotes the score of a user N having a similarity to the user X with regard to the value v; NA represents a mean value of the user N's scores; and SimXN denotes the value which was calculated in step S91 and which stands for the degree of similarity between the user X and the user N.

The predicted vector thus calculated is stored into the T_UM_VALUE database 317. As discussed above with reference to FIG. 30 showing the T_UM_VALUE database 317, a UM type ID of "3" is illustratively the predicted vector computed by the inventive filtering process.

Alternatively, a database by which to manage the similarities calculated in step S91 may be provided in the storage section 208 (FIG. 11). Although the predicted vector value computed in step S91 was shown placed into the T_UM_VALUE database 317 for storage, this is not limitative of the present invention. Alternatively, the predicted value may be left erased once used after calculation. That is because similarities and predicted vectors basically need to be computed anew every time any one of the registered member users adds new data (to be computed) by viewing or reserving a program for unattended recording.

Under these circumstances, it might be better to calculate and use a predicted value as needed without storing it so that the most recently predicted vector may be used at all times. Thus, if the database for managing similarities is not provided, or if the predicted vector value is not placed into the T_UM_VALUE database 317 for storage, the degree of similarity or the predicted vector may be computed illustratively whenever a recommendation screen is prepared and presented to the user.

Even if similarities and predicted vectors are stored beforehand, not all the stored data need to be recalculated. A degree of similarity and a predicted vector may be calculated only for the user whose log has been created anew (i.e., the calculations will be made based on that user's data only). This appreciably shortens the time required to calculate similarities and predicted vectors and alleviates processing loads on the server 52.

Figure 41:
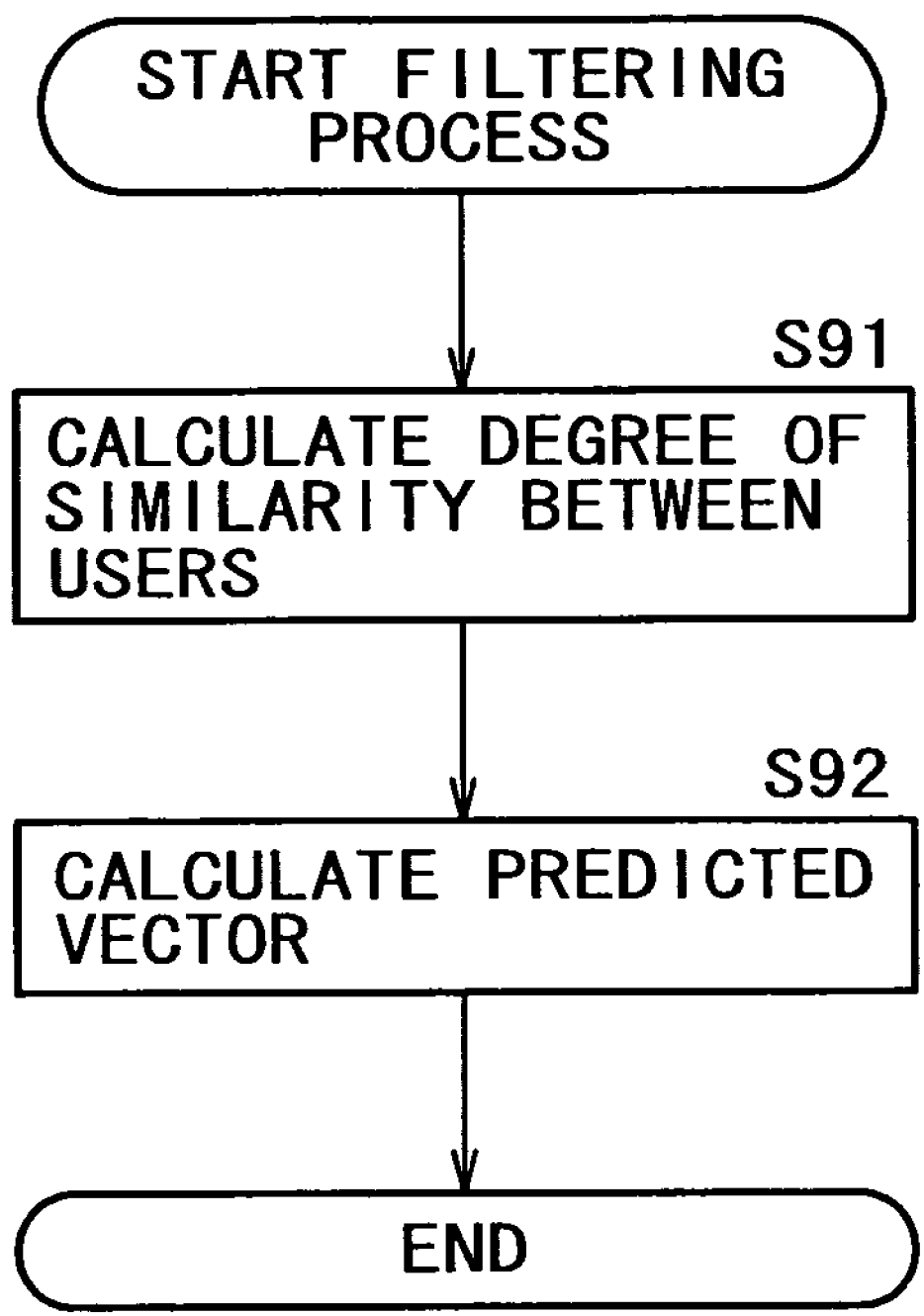
FIG. 41 is a flowchart of steps constituting the filtering process.

It is always possible to compute predicted vectors according to the flowchart of FIG. 41. However, if there were 10,000 members, the processing would involve a minimum of 10,000 calculations multiplied by 10,000. The larger the number of member users, the larger the number of calculations needed to be executed and the greater the loads on the system. This bottleneck can be bypassed by resorting to another filtering process. As discussed below with reference to the flowchart in FIG. 42, this process reduces the burdens on the system while still ensuring adequate filtering (i.e., the process provides about the same effects as when the process in the flowchart of FIG. 41 is executed).

Figure 42:
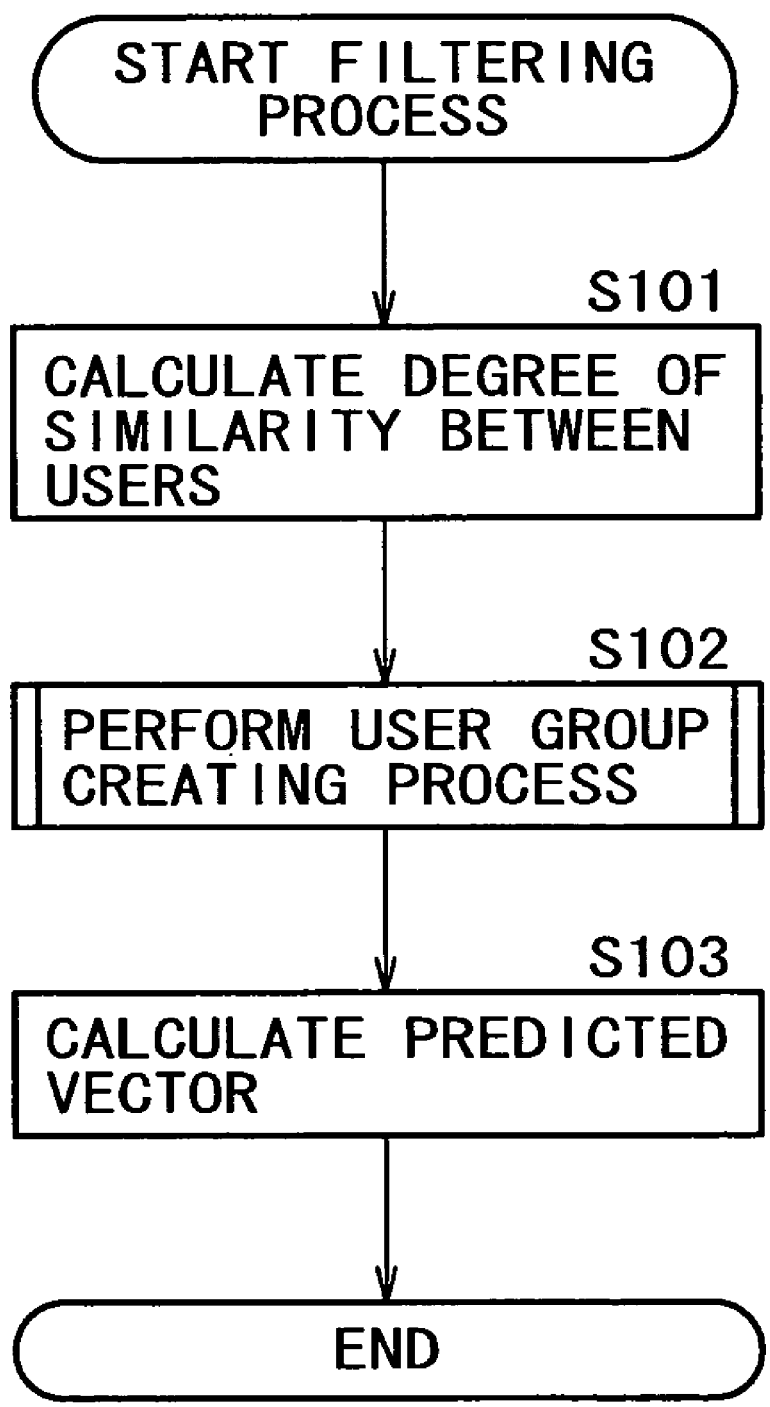
FIG. 42 is a flowchart of other steps constituting the filtering process.
Figure 43:
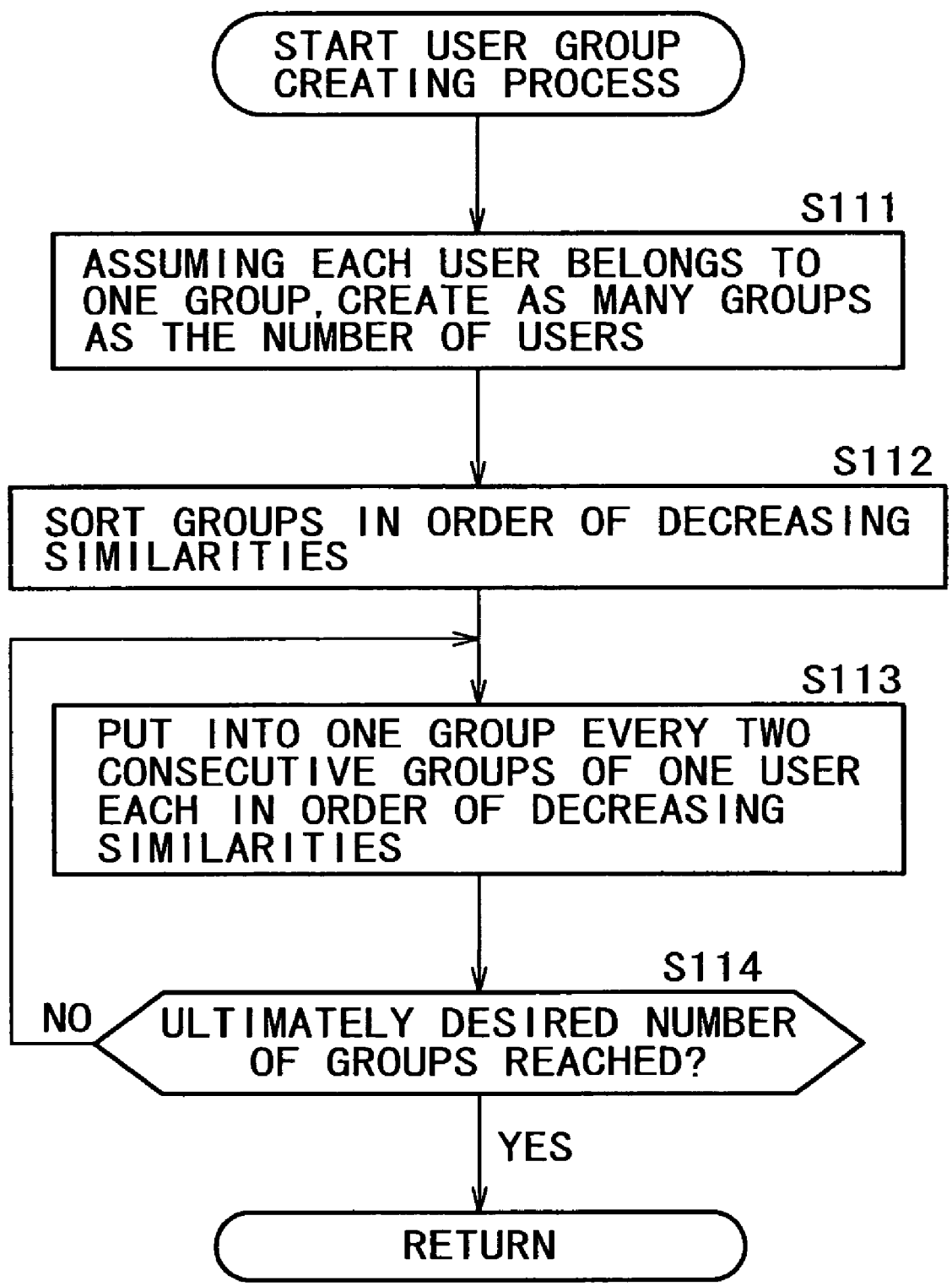
FIG. 43 is a flowchart of steps constituting a user group creating process.

In the flowchart of FIG. 42, the degree of similarity between users is first calculated in step S101. In step S102, a user group creating process is carried out. In step S103, the predicted vector is computed. Compared with the process in the flowchart of FIG. 41, the process of FIG. 42 has an additional step (S102) for executing the user group creating process. How the user group creating process is performed will now be described with reference to the flowchart of FIG. 43. The calculation of the degree of similarity in step S101 is basically the same as that in step S91 (of FIG. 41).

In step S111, as many groups as the number of users are created on the assumption that each user belongs to one group. In other words, as many one-member groups are created as the number of users. For example, if there are 10,000 member users, then 10,000 groups with one member each are created.

In step S112, a similarity database (not shown) is referenced so that the groups are sorted in order of decreasing similarities. The process in step S112 utilizes the degrees of similarity calculated in step S101 (FIG. 42). Where the similarity database is provided, the degrees of similarity computed in step S101 have been stored into that database. The stored similarities are retrieved from the database and used in carrying out step S112. If no similarity database is furnished, then the sorting is repeated every time a degree of similarity is computed in step S101. When the calculation of the degrees of similarity is completed in step S101, the sorting in step S112 is terminated concurrently.

The process in step S111 and the process in step S112 need not be temporally related to each other. For example, the process in step S112 may precede the process in step S111. As another alternative, the process in step S111 and the process in step S112 may be carried out parallelly.

At the end of the processing in step S112, step S113 is reached. In step SI 13, every two consecutive groups of one user each are put into one group in order of decreasing similarities. This step turns every two users of about the same similarity into one group. Illustratively, if 10,000 users constitute 10,000 groups, executing step S113 halves the number of groups to 5,000.

In step S114, a check is made to determine whether the rearranged group count has become equal to or less than an ultimately desired number of groups. Steps S113 and S114 are repeated until the result of the check in step S114 becomes affirmative (i.e., desired group count reached).

Illustratively, if the ultimately desired number of groups is 2,000 or less and if there exist 10,000 groups, the processing takes place as follows: in a first pass of step S13, the initial number of groups is halved into 5,000 (two users constituting one group); in a second pass of step S13, the group count is brought to 2,500 (four users making up one group); and in a third pass of step S13, the number of groups is reduced to 1,250 (eight users forming one group). At this point, the group count comes below 2,000. Thus, in step S114 it is determined that the ultimately desired number of groups is reached, and the user group creating process is brought to an end accordingly.

What is performed in steps S113 and S114 is the process of reducing the number of groups to a predetermined group count or less. The way the process is accomplished is not limited to the repeated halving of the existing number of groups as described above. Alternatively, the total number of users (i.e., the total number of groups created in step S111) may be first divided by the target group count. The resulting quotient may be established as the number of users per group. The users may then be rearranged into groups of the established user count each in order of decreasing similarities.

For example, if there are currently 10,000 groups and if it is desired to reduce the number of groups to 2,000 or less, the number 10,000 is first divided by 2,000. The quotient of "5" thus obtained is established as the number of users per group. The users are then rearranged into groups of five in order of decreasing similarities, whereby 2,000 groups are created.

The groups of users may be created in any suitable manner. The only requirement is that users of significantly high degrees of similarity be grouped together and that the total group count be reduced to a predetermined number or less. The ultimately desired number of groups may be determined typically in consideration of the operation loads on the system.

For each of the groups thus created, a predicted vector is calculated in step S103. The process in step S103 is basically the same as that in step S92 (FIG. 41). What was obtained in step S92 was the predicted vector between the target user and another user (e.g., between the user X and the user Y).

In step S103, by contrast, a predicted vector is obtained between the target group and another group (e.g., between the group X and the group Y). In this case, the predicted vector for the user X is acquired as the predicted vector between the group X to which the user X belongs on the one hand and the group Y on the other hand.

Alternatively, in step S103, a predicted vector may be obtained between the target user and a given group; e.g., between the user X who belongs to the group X on the one hand, and the group Y to which the user X does not belong on the other hand.

In any case, it takes less resources for the system to calculate predicted vectors between groups than between users. The use of the concept of groups for calculation shortens the calculating time and lowers the burdens on the system.

Figure 44:
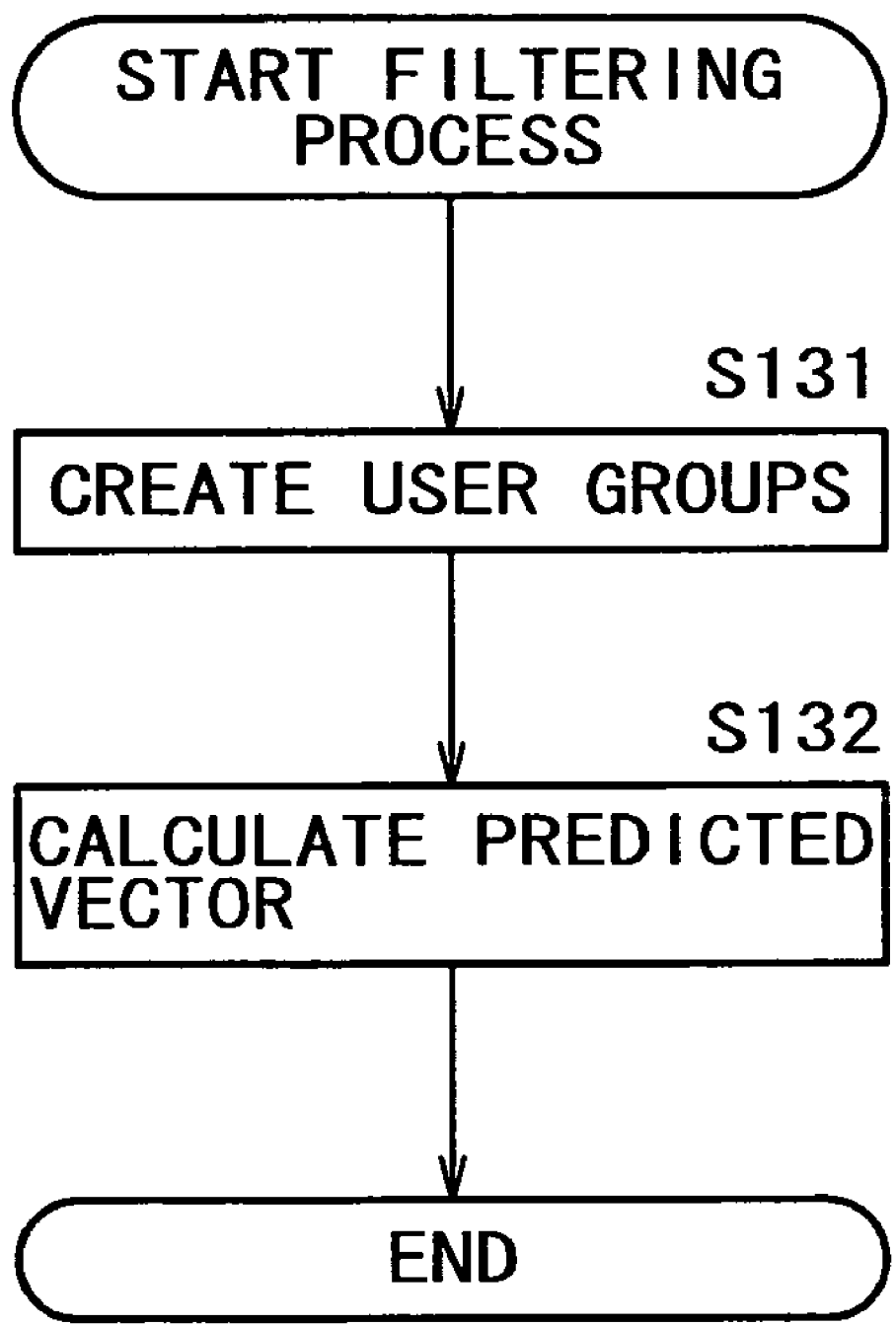
FIG. 44 is a flowchart of other steps constituting the filtering process.

FIG. 44 is a flowchart of steps constituting another filtering process. The process in FIG. 44 also presupposes that users be rearranged into groups. What makes the filtering process of FIG. 44 different from that of FIG. 42 is that degrees of similarity are not utilized. In step S131, user groups are created. The user group creating process in step SI 31 illustratively involves referring to the log database 253 (FIG. 11). That is, the log database is referenced so that users who have recently used the same information are grouped together. The idea is to rearrange the users of similar interests into groups through the filtering process.

In this case, the number of users per group is determined beforehand or is established by any one of the methods discussed above. For example, the total number of users may be divided by a target group count and the quotient may be used as the user count per group. Once the number of users per group is determined, the users are rearranged into groups of the determined user count each. Obviously the grouping process may also be carried out manually by an administrator.

When the grouping (i.e., the user group creating process) is completed, step S132 is reached and a predicted vector is calculated. Calculation of the predicted vector in step S132 is basically the same as in step S103 (FIG. 42) and thus will not be discussed further. In this case, an average of the values about the users belonging to a given group is established as the predicted vector for all the users in that group.

It is possible to carry out the grouping and the predicted vector calculation not when they are necessary but in advance so that the results are placed in storage. If that is the case, not all the stored data need to be recalculated in the grouping or predicted vector calculating step. Instead, only the data about the user for whom a new log has been created may be processed (i.e., the target user's data alone may be processed). This helps shorten the time required to compute predicted vectors and reduce the burdens on the server 52.

The predicted vector may be obtained by resorting to any one of the processes outlined in the flowcharts of FIGS. 41 through 44.

In the filtering process above, only the users with sufficiently high degrees of similarity (SimXN) may be subjected to calculation (i.e., a threshold value of similarity is established so that only the users with the degrees of similarity equal to or higher than the threshold value may be subjected to computation). This also helps reduce the time required to calculate the predicted vector and lower the burdens on the system during calculation.

When the predicted vector is applied to a given user, not all factors of the values yet to be owned by that user need to be written to the T_UM_VALUE database 317. Instead, only a predetermined number of the factors with their values arranged in descending order may be stored into the database. Limiting the factors to be stored in this manner helps economize on the database resources and boost the speed of computations.

If predicted vector information alone is used to recommend programs to a given user, the predicted vector may also be obtained regarding the values already owned by the user, and the acquired vector may be used in searching for recommended programs. The user's current profile (obtained through learning and registration) can thus be projected into the future for recommendation purposes. In other words, the user's profile as the basis for recommendation may be extrapolated from what is currently known.

As described, the information (i.e., data (factors) in the T_UM_VALUE database 317) used to search for the programs to be recommended to the user is created by this embodiment of the present invention in a manner that suitably integrates the processes of registration, learning, and filtering.

What follows is a description of how the programs to be recommended to a given user are searched for and retrieved using the databases thus created (i.e., this is the process of creating a recommendation screen). More specifically, described below with reference to the flowchart of FIG. 45 is how a search is made for the programs to be recorded to a particular user and how information about the programs thus detected is acquired.

Figure 45:
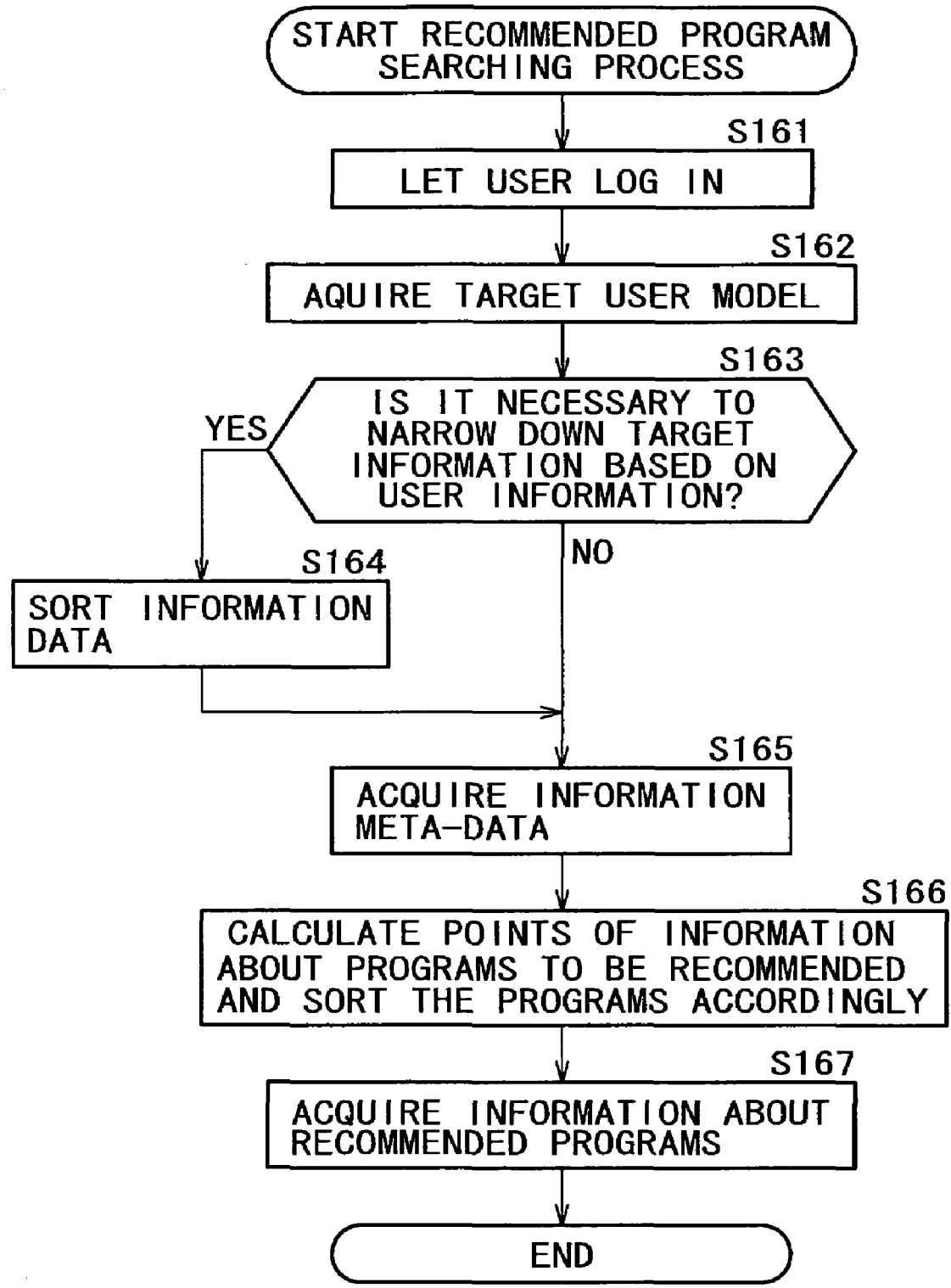
FIG. 45 is a flowchart of steps constituting a recommended program searching process.

In step S161 of FIG. 45, the user proceeds to log in to the system so that the system takes measures necessary for letting the user log in. The log-in process is taken over by the user management function 232 (FIG. 10). Through the user terminal 53 (FIG. 3), the user enters his or her user ID and password for transmission to the server 52. The user ID and password thus transmitted are received under control of the information communication 236 (FIG. 10) of the server 52 before being forwarded to the user management function 232. The user management function 232 checks to see whether the supplied combination of the user's user ID and password is stored in the user database 254.

If the supplied combination of the user ID and password is found to exist in the user database 254, then the log-in process is performed successfully and step S162 is reached. If the log-in process is not carried out normally, step S162 is not reached and error handling is executed. Illustratively, the user requesting the log-in receives a message saying that the attempt to log in has failed, and the process of the flowchart in FIG. 45 is terminated.

In step S162, a target user model is acquired. Acquisition of the target user model signifies retrieval from the T_UM_VALUE database 317 of information about the user who has logged in. After the logged-in user is identified in step S161, the user's member ID is ready to be obtained. The logged-in user's member ID is retrieved from the user database 254, and the data corresponding to the retrieved member ID are read from the T_UM_VALUE database 317.

Steps S162 and the subsequent steps are executed by the information sorting function 233. Besides executing the log-in process as described above, the user management function 232 supplies the information sorting function 233 with the member ID acquired as a result of the log-in process. Using the member ID thus obtained, the information sorting function 233 proceeds to carry out step S162.

While executing step S162, the information sorting function 233 performs step S163 in parallel. In step S163, a check is made to determine whether target information needs to be narrowed down on the basis of user information. The user information in this context refers illustratively to the geographical area where the user is living, the user's authority to view programs, and the user's age and gender. Whether or not the target information needs to be narrowed down is checked illustratively if some programs are not broadcast in a specific region and if the logged-in user (i.e., the user being processed) is found to live in that region. In such a case, the target information needs to be restricted selectively so that only the programs applicable to the region in question are recommended to the user.

It is necessary to narrow down the target information based on the user's authority illustratively to check whether the user is authorized to watch pay-per-view programs. When the user is found authorized to watch pay-per-view programs, another check is made to determine the scope or range of these programs the user is allowed to view according to the user's authority. In addition, it is necessary to narrow down the target information based on the user's age illustratively to make sure that any under-age user who may log in will not be presented with adult-oriented programs.

Furthermore, it is necessary to narrow down the target information according to the user's gender illustratively to ascertain that male-oriented programs will not be recommended to female member users. However, the need to narrow down the target information based on the user's gender has a lower priority than the need to do so according to the other user information. The gender-based narrowing of the target information is thus not mandatory.

If it is found necessary in step S163 to narrow down the target information based on the user information, then step S164 is reached. If it is not found necessary to narrow down the target information, step S164 is skipped and step S165 is reached directly. In step S164, information and data are sorted out. The sorting of information and data is carried out to exclude the programs that cannot be recommended to the user who has logged in. The programs that have not been excluded are subject to the subsequent process of step S165.

If step S164 is skipped and step S165 is reached directly, there is no need to sort out the information and data. In that case, all programs are subject to the process in step S165. In step S165, information meta data about the target programs to be processed are acquired. The information meta data in this case refer to the data managed by the T_PRG_VALUE database 316 (FIG. 29).

After the information meta data about the target programs are acquired in step S165, step S166 is reached. In step S166, points of information about the programs to be recommended are calculated and the programs are sorted out accordingly. Execution of step S166 involves using the scores of the target user model (T_UM_VALUE database 317) obtained in step S162 as well as the scores of the information meta data (T_PRG_VALUE database 316) acquired in step S165. Using these scores, the points are calculated illustratively by vector computations. The programs are then ranked according to the calculated values. The points obtained from the process of step S166 are displayed illustratively in the recommendation level display area 156 on the recommendation screen in FIG. 8.

After the points of the programs are computed so that the programs are ranked in decreasing order of their points as described, step S167 is reached. In step S167, information about the programs to be recommended is obtained. The recommendable programs are formed by a predetermined number (e.g., 10) of the highest-ranked programs. The information about the predetermined number of the recommendable programs is acquired by the information sorting function 233. Specifically, the information sorting function 233 obtains the program ID's of the predetermined number of the highest-ranked programs.

With the program ID's thus acquired, other information about the programs identified thereby is obtained accordingly. Illustratively, person ID's and keyword ID's regarding each of these multiple programs are acquired successively.

Figure 46:
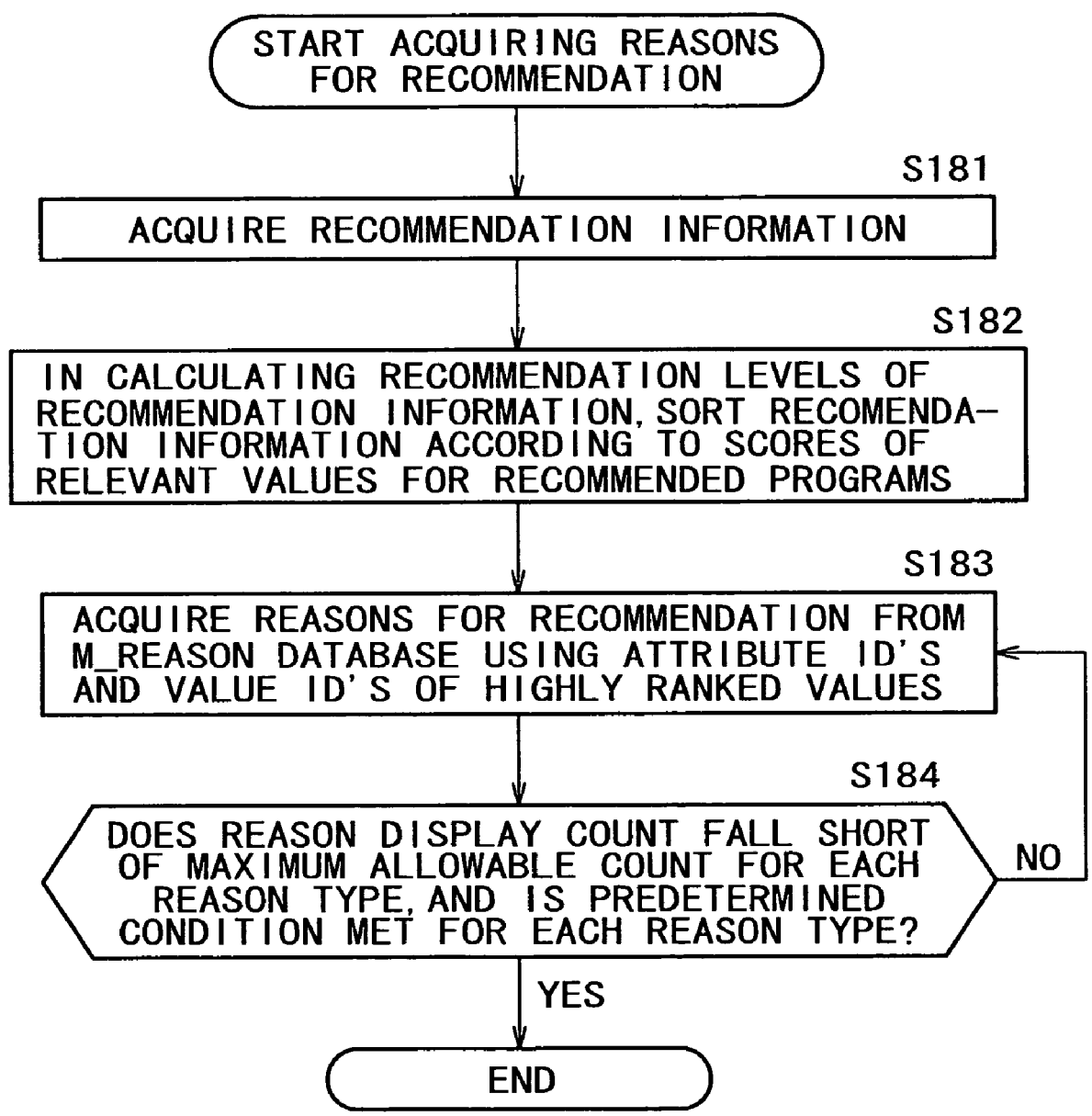
FIG. 46 is a flowchart of steps for acquiring reasons for recommendations.

Described below with reference to the flowchart of FIG. 46 is what takes place after the information about the multiple programs to be recommended to the user has been obtained. In step S181, recommendation information is acquired. This process is, in fact, accomplished in step S167 (FIG. 45). In step S182, recommendation levels of the recommendation information are calculated by having the recommendation information sorted according to the scores of the values (i.e., factors identified by valid ID's) relevant to the recommended programs.

In step S183, reasons for the recommendation are acquired from the M_REASON database 280 (FIG. 21) using the combination of an attribute ID and a value ID associated with the highest-ranked values having been sorted. Illustratively, if the attribute ID of "001" and value ID of "1000" are found associated with the highest-ranked values, then the reason "sports" is obtained.

In step S184, a check is made to determine whether a reason display count falls short of a maximum allowable count for each reason type and whether a predetermined condition for each reason type is met. An explanation of the reason type is in order here. The reason type is provided to limit the number of reasons to be displayed in the reason display area 155 on the recommendation screen in FIG. 8. FIG. 47 shows typical data with which to establish reason types, and FIG. 48 lists typical data for setting the number of reasons that may be displayed for each reason type. The processes of handling the data in FIGS. 47 and 48 so as to control the reason display count are taken over and executed by the information sorting function 233.

Of the data shown in FIG. 47, the first line declares that the subsequent data are provided to specify reason types, and designates the data format for use on the second and subsequent lines. On the second and subsequent lines, "Normal" refers to "UM type." In the explanation of the T_UM_VALUE database 317 shown in FIG. 30, "Normal" means the same as the description "UM type ID=2." That is, "Normal" indicates a factor that has been registered by the learning process. "Prior" means the same as the description "UM type ID=1" in the explanation of the T_UM_VALUE database 317 in FIG. 30. That is, "Prior" indicates a factor that has been registered by the user. "Expected" means the same as the description "UM type ID=3" in the explanation of the T_UM_VALUE database 317 in FIG. 30. That is, "Expected" indicates a factor that has been registered by the filtering process.

The second and subsequent lines carry data in the same format each. That data format is explained below by referring to the second line. The description "Reason Type. Normal. Category=4" is found on the second line. "Reason Type" declares that the data on this line designates a reason type. "Normal" indicates a UM type. "Category=4" indicates that this category belongs to the reason type "4." In short, the second line refers to the reason type being set to "4" for the factors registered by the learning process and having the attribute of "category."

FIG. 48 lists typical data for setting the reason display count for each reason type. The listed data in FIG. 48 are explained below by citing the second line carrying the description "#[0] Registered Keywords, Persons [5 entries max.]." The symbols "#[0]" indicate that data whose reason type is "0" are found on the second line. The statement "Registered Keywords, Persons [5 entries max.]" following "#[0]" specifies that up to five entries of the items representative of "registered keywords, persons" can be displayed in the reason display area 155. In other words, up to five reasons (FIG. 21) whose attribute is "keyword" or "person" are allowed to be displayed in the reason display area 155.

The data shown in FIGS. 47 and 48 provide control over what can be displayed in the reason display area 155 on the recommendation screen in FIG. 8. The data in FIGS. 47 and 48 will be further discussed below in conjunction with the display in the reason display area 155 on the recommendation screen. Suppose now that in step S183 of FIG. 46, the attribute "001" and the value ID "1000" are acquired. A reference to the M_REASON database 280 (FIG. 21) for the combination of the attribute "001" and value ID "1000" reveals the associated word "sports." Thus, the word "sports" is selected as the reason (for recommendation) to be presented to the user.

A reference to the T_UM_VALUE database 317 (FIG. 30) for the combination of the attribute "001" and value ID "1000" detects the UM type ID "1." The UM type ID "1" indicates a "prior" UM type. The attribute ID "001" indicates the attribute of "category" because the attribute ID "001" is assigned to the M_CATEGORY database 271 (FIG. 12). The processing up to this point shows that the word "sports" to be presented to the user as the reason for recommendation is "prior" and "category."

A reference to FIG. 47 reveals that the combination of "prior" and "category" is found on the 12th line. The description on the 12th line shows the reason type to be "1." Referencing the data in FIG. 48 indicates that the statement "Reason Type=1" appears on the fourth and the fifth lines. The statement on the fourth line shows that the display takes place in the field of the item "registered genre." It is also indicated that only one entry of this item can be displayed. As a result, the reason display area 155 gives a display of "Registered Genre: [Sports]."

If the values of "prior," "category," and reason type "1" are acquired in step S183 following the above process, the acquired values are discarded without being processed because the word "sports" has already been assigned. Since the sorting is performed in step S182, the discarded values are always smaller than the previously processed values. Consequently, the highly ranked values are always presented to the user.

The foregoing description has covered steps S183 and S184. Detailed processes such as references to the databases need not take place in the exact order in which they were described above. For example, when the UM type ID is arranged to be determined before the execution of step S183, there is no need to reference again the T_UM_VALUE database 317 in steps S183 and S184. In short, the individual processes need only be carried out in such a manner that they will not overlap with one another. The foregoing description thus does not place any constraints on how the databases to be referenced are selected or when they are referenced.

As described, the data shown in FIGS. 47 and 48 control the check to be carried out in step S184 (FIG. 46). That is, a check is made in step S184 to determine whether the reason display count falls short of a maximum allowable count for each reason type (as stipulated by the data in FIG. 47) and whether a predetermined condition is met for each reason type (as designated by the data in FIGS. 48). Steps S183 and S184 are repeated until the result of the check in step S184 becomes affirmative. Upon completion of step S1 84, the process outlined by the flowchart in FIG. 46 is brought to an end.

At the end of the process in FIG. 46, all data are complete for presenting the recommendation screen to the user. The completed data are then transmitted to the user terminal 53 for screen presentation to the user.

A little more about the process in step S183 is explained here. In step S183, the M_REASON database 280 is referenced. Suppose that an attribute ID of "005" and a value ID of "0000000006" are acquired. This combination of the acquired attribute ID and value ID is found associated with the word "erotic" upon reference to the M_KEYWORD database 275 in FIG. 16. As explained earlier, the word "erotic" is not an appropriate word to present to the user, so that this word is not included in the M_REASON database 280 (FIG. 21).

Even if the combination of the attribute ID "005" and value ID "0000000006" is obtained in step SI 83, there exist no data to be retrieved from the M_REASON database 280 as a reason for recommendation. In such a case, step S184 is arranged to be skipped regarding the next factor (i.e., value) because there is no need to execute step S184. In any case, control is exercised so that any reasons excluded from the M_REASON database 28 will not be presented to the user.

In the foregoing description of the flowchart in FIG. 46, the M_REASON database 280 in FIG. 21 was shown to be referenced. Where the M_REASON database 280 is not provided and there exists instead the M_KEYWORD_1 database 276 shown in FIG. 17, it is still possible to perform basically the same process as that of FIG. 46 if the steps in the flowchart of FIG. 49 are carried out.

Figure 49:
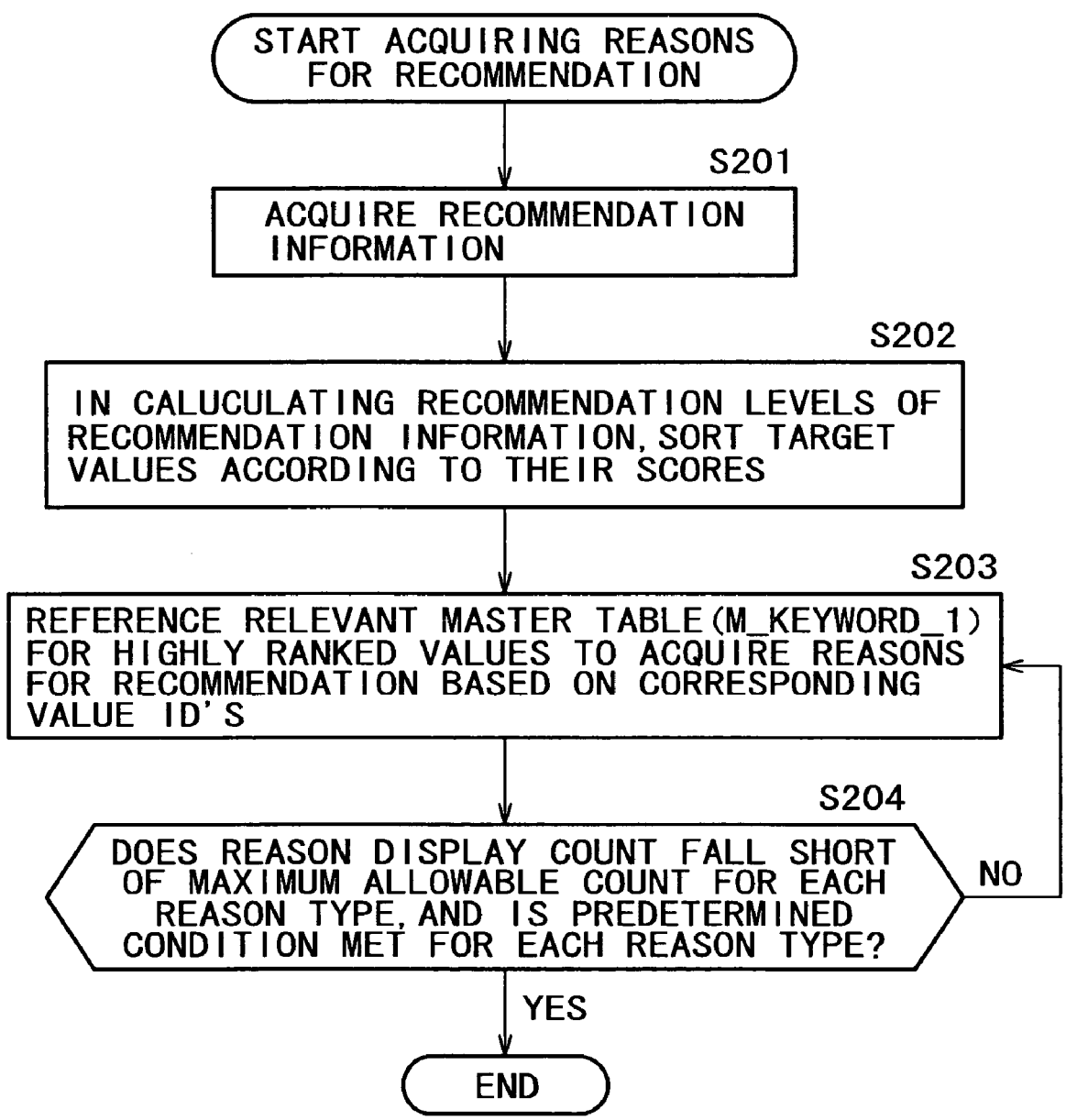
FIG. 49 is a flowchart of other steps for acquiring reasons for recommendations.

In FIG. 49, steps S201, S202 and S204 are basically the same as steps S181, S182 and S184 in FIG. 46 respectively and thus will not be described further. In step S203, the highly ranked value from the sorting is referenced in the applicable master database, whereby the reason corresponding to the applicable value ID is acquired. This step is basically the same as step S183 in FIG. 46, but the database to be referenced is different.

In step S203, the M_KEYWORD_1 database 276 is referenced. For example, if the value ID (i.e., keyword ID in this case) is "0000000008," then the "reason" field in the M_KEYWORD_1 database 276 is referenced and the reason "advantageous information" corresponding to the value ID is retrieved. In another example, if the value ID is "0000000006," the "reason" field in the M_KEYWORD_1 database 276 is referenced but the field is empty (null). Thus no data are retrieved and the process regarding the value ID "0000000006" is terminated, before the next value ID is taken up for processing.

As described, if the M_KEYWORD_1 database 276 is used when the steps of the flowchart in FIG. 49 are performed, the words deemed to be inappropriate for presentation to the user may be either suppressed outright or replaced by other words before being presented to the user.

Figure 50:
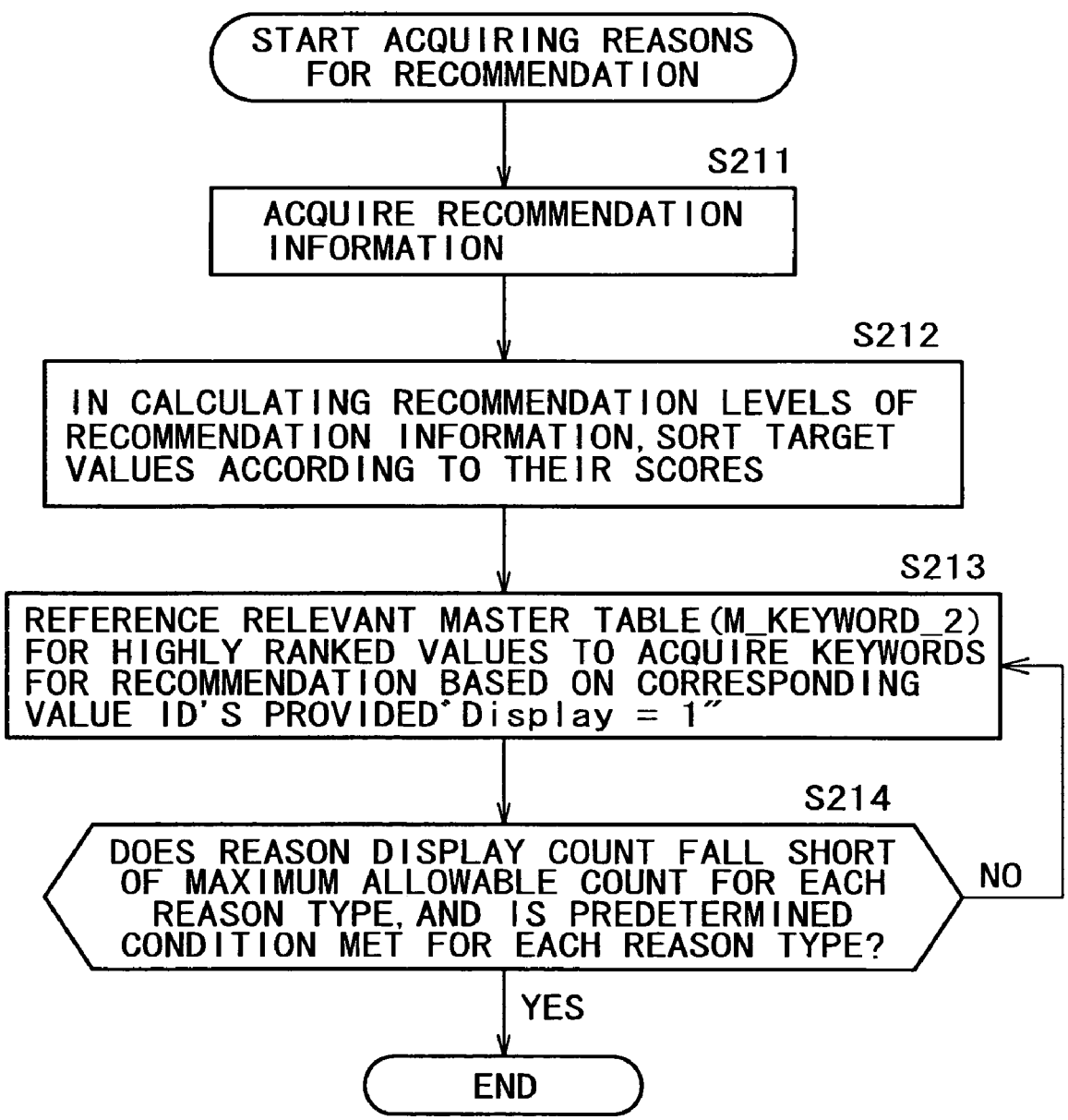
FIG. 50 is a flowchart of other steps for acquiring reasons for recommendations.

If the M_KEYWORD_2 database 277 (FIG. 18) is furnished in place of the M_KEYWORD_1 database 276, then the steps constituting the flowchart of FIG. 50 are carried out. In this case, steps S211, S212 and S214 are basically the same as steps S181, S182 and S184 in FIG. 46 respectively and thus will not be described further.

In step S213, the M_KEYWORD_2 database 277 is referenced. Illustratively, if the value ID (keyword ID in this example) is "0000000001," then the "keyword" and the "display" fields are referenced so that the corresponding keyword "information" is retrieved from the "keyword" field and a value of "1" is read from the "display" field. The value "1" in the "display" field is a flag indicating that the corresponding keyword is allowed to be presented to the user.

For example, if the value ID (i.e., keyword ID) is "0000000008," then the "keyword" and the "display" fields are referenced so that the corresponding keyword "advantageous" is retrieved from the "keyword" field and a value of "0" is read from the "display" field. The value "0" in the "display" field is a flag indicating that the corresponding keyword is not allowed to be presented to the user. When the "display" field is found to contain the value "0," no further processing is required for the current value ID. Control is then passed on to the next value ID to be processed.

As described, if the M_KEYWORD_1 database 276 is used when the steps of the flowchart in FIG. 50 are carried out, the words deemed to be inappropriate for presentation to the user may be suppressed outright. However, where the M_KEYWORD_2 database 277 in FIG. 18 is used for the process, the inappropriate words cannot be replaced by other words before being presented to the user. This processing scheme is thus suitable for a system not required to replace the inappropriate words with other words for presentation to the user.

According to the present invention, as described, it is possible to control suitably the words that are to be presented to the user. Although the above-described embodiment was designed primarily to present the user with recommendation information about broadcast programs, this is not limitative of the present invention. The present invention can also be applied advantageously where information about objects other than broadcast programs is to be recommended to the user. In such cases, the recommendation information can be presented to the user along with the reason or reasons for the recommendation. The user is presented with such information in easy-to-understand words, so that the user can grasp what is presented more easily and have more confidence in the presented information than before.

According to the present invention, the information to be presented to the user is prepared with the user's preferences taken into consideration. This can be achieved by acquiring user preference data using a number of methods for data acquisition, such as registration, learning and filtering carried out in a comprehensively integrated manner. These processes combine to permit more detailed analyses of the preferences of each member user.

The series of steps and processes described above may be executed either by hardware or by software. For the software-based processing to take place, the programs constituting the software may be either incorporated beforehand in dedicated hardware of a computer or installed upon use from a suitable recording medium into a general-purpose personal computer or like equipment capable of executing diverse functions based on the installed programs.

As shown in FIG. 4, the recording medium is offered to users apart from the computer not only as a package medium constituted by the magnetic disc 91 (including flexible discs), optical disc 92 (including CD-ROM (compact disc-read only memory) DVD (digital versatile disc)), magneto-optical disc 93 (including MD (Mini-disc): registered trademark), or semiconductor memory 94, but also in the form of the ROM 72 or the hard disc drive which contains the storage section 78, both accommodating the programs and incorporated beforehand in the computer when offered to the user.

In this specification, the steps which are stored on a suitable recording medium and which describe the programs to be executed by computer represent not only the processes that are carried out in the depicted sequence (i.e., on a time series basis) but also processes that may be performed parallelly or individually.

In this specification, the term "system" refers to an entire configuration made up of a number of component devices.

It should be understood that various changes and modifications to the presently disclosed examples described herein will be apparent to those skilled in the art. Such changes and modifications can be made without departing from the spirit and scope of the teachings of the present invention and without diminishing its intended advantages. It is therefore intended that such changes and modifications be covered by the appended claims.

The invention claimed is:

1. An information processing apparatus comprising:
   a display device;
   a processor; and
   a memory device which stores instructions, which when executed by the processor, cause the processor to operate with the display device to:
   (a) manage:
   (i) first data about preferences of a user by managing a first factor in association with a first numeric value belonging to the user with respect to the first factor;
   (ii) second data about information used by the user by managing a second factor regarding the information in association with a second numeric value belonging to the information with respect to the second factor; and
   (iii) a database which includes:
   (A) a first reason which corresponds to a third data, said third data specifying that the first reason is to be displayed to the user; and
   (B) a second reason which corresponds to a fourth data, said fourth data specifying that the second reason is not to be displayed to the user;
   (b) retrieve the second data about the information used by the user;
   (c) update the first data by use of the retrieved second data;
   (d) if the first factor coinciding with the second factor within the second data are found to exist within the first data:
   (i) calculate a new first value using said first value and said second value; and
   (ii) write the newly calculated first value into the first data;
   (e) if the first factor coinciding with the second factor within the second data are not found to exist within the first data, add the second factor and the second value to the first data;
   (f) create a recommended program based on the first data;
   (g) provide a reason for the recommended program in terms of degree of match with the first data;
   (h) determine, by referencing said database, whether said provided reason for the recommended program corresponds to said first reason;
   (i) in response to said provided reason for the recommended program corresponding to said first reason, display said provided reason;
   (j) determine, by referencing said database, whether said provided reason for the recommended program corresponds to said second reason; and
   (k) in response to said provided reason for the recommended program corresponding to said second reason, suppress display of said provided reason.

2. An information processing method for use with an information processing apparatus, which includes at least storing parts for storing data and controlling parts for performing predetermined processes by use of the data stored in the storing parts, the method comprising:
   managing:
   (a) first data about preferences of a user by managing a first factor in association with a first numeric value belonging to the user with respect to the first factor;
   (b) second data about information used by the user by managing a second factor regarding the information in association with a second numeric value belonging to the information with respect to the second factor; and
   (c) a database which includes:
   (i) a first reason which corresponds to a third data, said third data specifying that the first reason is to be displayed to the user; and
   (ii) a second reason which corresponds to a fourth data, said fourth data specifying that the second reason is not to be displayed to the user;
   retrieving the second data about the information used by the user;
   updating the first data by use of the second data retrieved in the retrieving step;
   if the first factor coinciding with the second factor within the second data are found to exist within the first data:
   (i) calculating a new first value using said first value and said second value; and
   (ii) writing the newly calculated first value into the first data;
   if the first factor coinciding with the second factor within the second data are not found to exist within the first data, adding the second factor and the second value to the first data;
   creating a recommended program based on the first data;
   transmitting the recommended program and a reason for the recommended program in terms of degree of match with the first data;
   determining, by referencing said database, whether said transmitted reason for the recommended program corresponds to said first reason;
   in response to said transmitted reason for the recommended program corresponding to said first reason, displaying said transmitted reason;
   determining, by referencing said database, whether said transmitted reason for the recommended program corresponds to said second reason; and
   in response to said transmitted reason for the recommended program corresponding to said second reason, suppressing display of said provided reason.

3. A program, on a computer readable medium, for use with an information processing apparatus, which includes at least storing parts for storing data and controlling parts for performing predetermined processes by use of the data stored in the storing parts, the program comprising:
   a management step of managing:
   (a) first data about preferences of a user by managing a first factor in association with a first numeric value belong in to the user with respect to the first factor;
   (b) second data about information used by the user by managing a second factor regarding the information in association with a second numeric value belonging to the information with respect to the second factor; and
   (c) a database which includes:
   (i) a first reason which corresponds to a third data, said third data specifying that the first reason is to be displayed to the user; and
   (ii) a second reason which corresponds to a fourth data, said fourth data specifying that the second reason is not to be displayed to the user;
   a retrieving step of retrieving the second data about the information used by the user; an updating step of updating the first data by use of the second data retrieved in the retrieving step;

wherein, if the first factor coinciding with the second factor within the second data are found to exist within the first data:
(a) a new first value is calculated using said first value and said second value; and
(b) the newly calculated value is written into the first data;
wherein, if the first factor coinciding with the second factor within the second data are not found to exist within the first data, the updating step adds the second factor and the second value to the first data;
a recommending step of creating a recommended program based on the first data and for providing a reason for the recommended program in terms of degree of match with the first data;
a first determining step of determining, by referencing a database, whether said provided reason for the recommended program corresponds to said first reason;
in response to said provided reason for the recommended program corresponding to said first reason, a display step of displaying said provided reason;
a second determining step of determining, by referencing said database, whether said provided reason for the recommended program corresponds to said second reason; and
in response to said provided reason for the recommended program corresponding to said second reason, a suppressing step of suppressing display of said provided reason.

4. A recording medium storing a program, the program comprising:
a management step of managing:
(a) first data about preferences of a user by managing in a first factor in association with a first numeric value belonging to the user with respect to the first factor;
(b) second data about information used by the user by managing a second factor regarding the information in association with a second numeric value belonging to the information with respect to the second factor;
(c) a database which includes:
(i) a first reason which corresponds to a third data, said third data specifying that the first reason is to be displayed to the user; and
(ii) a second reason which corresponds to a fourth data, said fourth data specifying that the second reason is not to be displayed to the user;
a retrieving step of retrieving the second data about the information used by the user;
an updating step of updating the first data by use of the second data retrieved in the retrieving step;
wherein, if the first factor coinciding with the second factor within the second data are found to exist within the first data:
(a) a new first value is calculated using said first value and said second value; and
(ii) the newly calculated first value is written into the first data;
wherein, if the first factor coinciding with the second factor within the second data are not found to exist within the first data, the updating step adds the second factor and the second value to the first data;
a recommending step of creating a recommended program based on the first data and for providing a reason for the recommended program in terms of degree of match with the first data;
a first determining step of determining, by referencing a database, whether said provided reason for the recommended program corresponds to said first reason;
in response to said provided reason for the recommended program corresponding to said first reason, a displaying step for displaying said provided reason;
a second determining step of determining, by referencing said database, whether said provided reason for the recommended program corresponds to said second reason; and
in response to said provided reason for the recommended program corresponding to said second reason, a suppressing step of suppressing display of said provided reason.

5. The information processing apparatus of claim 1, wherein when executed by the processor, the plurality of instructions cause said processor to limit a recommendation based on a conflicting time zone.

6. The information processing method of claim 2, which includes limiting a recommendation based on a conflicting time zone.

7. The program, on a computer readable medium of claim 3, wherein the recommending step includes limiting a recommendation based on a conflicting time zone.

8. The recording medium of claim 4, wherein the recommending step includes limiting a recommendation based on a conflicting time zone.

9. The information processing apparatus of claim 1, wherein when executed by the processor, the plurality of instructions cause said processor to limit a number of reasons to a specified number of reasons based on a highest degree of match to the first data.

10. The information processing method of claim 2, which includes limiting a number of reasons to a specified number of reasons based on a highest degree of match to the first data.

11. The program, on a computer readable medium of claim 3, wherein the recommending step includes limiting a number of reasons to a specified number of reasons based on a highest degree of match to the first data.

12. The recording medium of claim 4, wherein the recommending step includes limiting a number of reasons to a specified number of reasons based on a highest degree of match to the first data.

13. The information processing apparatus of claim 1, wherein when executed by the processor, the plurality of instructions cause said processor to acquire the reason for the recommendation from a database using an attribute ID and a value ID associated with a factor used to select the recommended program.

14. The information processing method of claim 2, which includes acquiring the reason for the recommendation from a database using an attribute ID and a value ID associated with a factor used to select the recommended program.

15. The program, on a computer readable medium of claim 3, wherein the recommending step includes acquiring the reason for the recommendation from a database using an attribute ID and a value ID associated with a factor used to select the recommended program.

16. The recording medium of claim 4, wherein the recommending step includes acquiring the reason for the recommendation from a database using an attribute ID and a value ID associated with a factor used to select the recommended program.

17. The information processing apparatus of claim 1, wherein said recommended program is received from a broadcast station which broadcasts a plurality to programs, wherein said broadcasted programs include a limited number of recommendation marks.

18. The information processing apparatus of claim 1, wherein when executed by the processor, the instructions cause the processor to:
(a) in response to said provided reason for the recommended program corresponding to said first reason, display said provided reason based on first flag data; and
(b) in response to said provided reason for the recommended program corresponding to said second reason, suppress display of said provided reason based on second flag data.

* * * * *